US012596341B2

(12) United States Patent
Sharif-Askary

(10) Patent No.: US 12,596,341 B2
(45) Date of Patent: Apr. 7, 2026

(54) OPERATION LOOP FORMATION FOR ADAPTIVE POWER GRID MANAGEMENT

(71) Applicant: GE VERNOVA INFRASTRUCTURE TECHNOLOGY LLC, Greenville, SC (US)

(72) Inventor: Jamshid Sharif-Askary, Melbourne, FL (US)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 271 days.

(21) Appl. No.: 18/131,770

(22) Filed: Apr. 6, 2023

(65) Prior Publication Data

US 2024/0337998 A1     Oct. 10, 2024

(51) Int. Cl.
G05B 19/042          (2006.01)

(52) U.S. Cl.
CPC .... G05B 19/042 (2013.01); G05B 2219/2639 (2013.01)

(58) Field of Classification Search
None
See application file for complete search history.

(56) References Cited

U.S. PATENT DOCUMENTS

| | | | |
|---|---|---|---|
| 5,649,190 | A | 7/1997 | Sharif-Askary |
| 8,589,198 | B2 | 11/2013 | Mcmullin |
| 9,842,372 | B2 * | 12/2017 | Kaufman ............... G06Q 50/06 |
| 9,915,375 | B1 | 3/2018 | Anderson |
| 11,099,537 | B2 | 8/2021 | Spalt |
| 11,605,144 | B1 * | 3/2023 | Miller .............. G06Q 10/06311 |
| 2008/0040263 | A1 | 2/2008 | Pollack |
| 2011/0204720 | A1 | 8/2011 | Ruiz |
| 2012/0130767 | A1 * | 5/2012 | McMullin ........ G06Q 10/06312 |
| | | | 705/7.22 |
| 2013/0085614 | A1 | 4/2013 | Wenzel |
| 2014/0277794 | A1 * | 9/2014 | Kaufman ............... G06Q 10/06 |
| | | | 700/291 |
| 2016/0072287 | A1 | 3/2016 | Jia |
| 2017/0371632 | A1 | 12/2017 | Bullis |
| 2018/0164959 | A1 | 6/2018 | Gupta |
| 2018/0165983 | A1 | 6/2018 | Ragozzino |
| 2018/0262525 | A1 * | 9/2018 | Yan ........................ G06N 20/00 |

(Continued)

FOREIGN PATENT DOCUMENTS

| | | | | |
|---|---|---|---|---|
| CN | 113346528 | A * | 9/2021 | ............... C25B 1/04 |
| CN | 116260245 | A * | 6/2023 | ........ H02J 13/00002 |

(Continued)

*Primary Examiner* — Philip Wang
(74) *Attorney, Agent, or Firm* — Fitch, Even, Tabin & Flannery LLP

(57)          ABSTRACT

A system for adaptive power grid management includes a formation construct module configured to receive a formation plan and a logistics list comprising a plurality of assets for executing an operation loop in the formation plan, retrieve a matching schema based on comparing the tasks of the operation loop and the logistics list with the plurality of meta objects in the historical meta object database, construct meta objects for plurality of assets based on the matching schema and the formation plan, and cause the plurality of the network of devices to execute the formation plan based on meta objects assigned to the plurality of assets of the network of devices.

20 Claims, 37 Drawing Sheets

(56)     References Cited

U.S. PATENT DOCUMENTS

| | | | | |
|---|---|---|---|---|
| 2019/0081478 | A1 | 3/2019 | Vinot | |
| 2020/0026340 | A1 | 1/2020 | Muller | |
| 2020/0409323 | A1 | 12/2020 | Spalt | |
| 2021/0003974 | A1 | 1/2021 | Yang | |
| 2021/0133650 | A1 | 5/2021 | Cella | |
| 2021/0143639 | A1 | 5/2021 | Duan | |
| 2021/0210959 | A1* | 7/2021 | Sohani | F03D 9/257 |
| 2021/0326231 | A1 | 10/2021 | Hicks | |
| 2022/0414556 | A1* | 12/2022 | Seabloom | H02J 13/00001 |
| 2023/0040886 | A1 | 2/2023 | Lee | |
| 2023/0360547 | A1* | 11/2023 | Brockers | G06V 10/82 |
| 2023/0408985 | A1* | 12/2023 | Nordh | G05B 17/02 |
| 2024/0070352 | A1 | 2/2024 | He | |
| 2024/0144052 | A1* | 5/2024 | Zhou | G06N 5/04 |
| 2024/0337997 | A1 | 10/2024 | Sharif-Askary | |
| 2024/0337998 | A1* | 10/2024 | Sharif-Askary | G05B 19/042 |
| 2024/0337999 | A1 | 10/2024 | Sharif-Askary | |
| 2024/0338781 | A1 | 10/2024 | Sharif-Askary | |
| 2024/0339835 | A1 | 10/2024 | Sharif-Askary | |
| 2024/0429716 | A1 | 12/2024 | Sharif-Askary | |

FOREIGN PATENT DOCUMENTS

| | | |
|---|---|---|
| JP | 2021170329 | 10/2021 |
| WO | 2024170055 | 8/2024 |

* cited by examiner

FIG. 10A

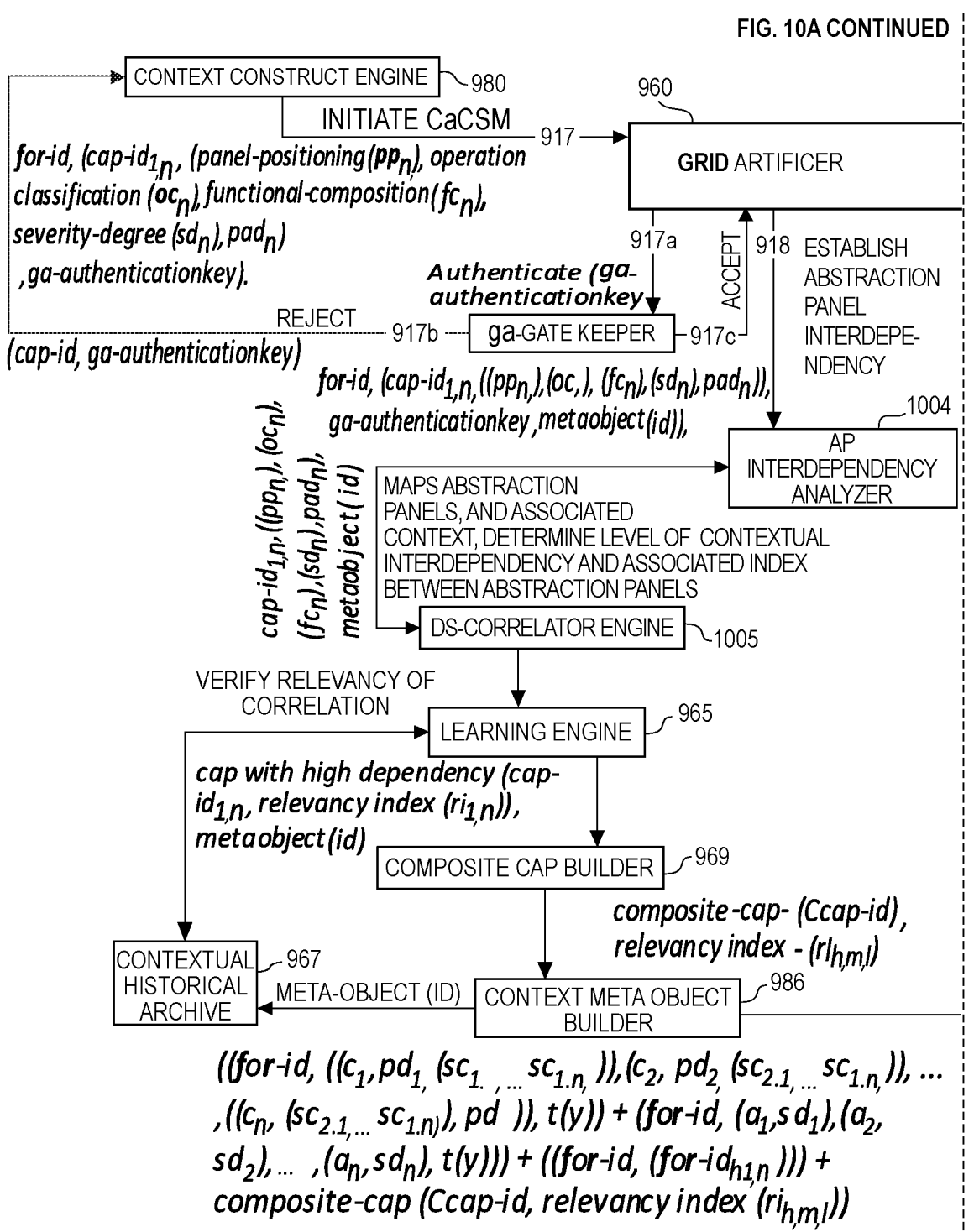

CONTEXT CONSTRUCT ENGINE ─980

960

INITIATE CaCSM ──917─→

GRID ARTIFICER

*for-id, (cap-id$_{1n}$, (panel-positioning(pp$_n$), operation classification (oc$_n$), functional-composition(fc$_n$), severity-degree (sd$_n$), pad$_n$) ,ga-authenticationkey).*

917a

ACCEPT

918 ESTABLISH ABSTRACTION PANEL INTERDEPE-NDENCY

*Authenticate (ga-authenticationkey*

REJECT ──── 917b ──── ga-GATE KEEPER ─917c┘

*(cap-id, ga-authenticationkey)*

*for-id, (cap-id$_{1,n}$,((pp$_n$),(oc,), (fc$_n$),(sd$_n$),pad$_n$)), ga-authenticationkey,metaobject(id)),*

1004

*cap-id$_{1,n}$,((pp$_n$,),(oc$_n$), (fc$_n$),(sd$_n$),pad$_n$), metaobject( id)*

AP INTERDEPENDENCY ANALYZER

MAPS ABSTRACTION PANELS, AND ASSOCIATED CONTEXT, DETERMINE LEVEL OF CONTEXTUAL INTERDEPENDENCY AND ASSOCIATED INDEX BETWEEN ABSTRACTION PANELS

DS-CORRELATOR ENGINE ─1005

VERIFY RELEVANCY OF CORRELATION

LEARNING ENGINE ─965

*cap with high dependency (cap-id$_{1,n}$, relevancy index (ri$_{1,n}$)), metaobject(id)*

COMPOSITE CAP BUILDER ─969

*composite-cap- (Ccap-id), relevancy index - (rl$_{h,m}$)*

CONTEXTUAL HISTORICAL ARCHIVE ─967

META-OBJECT (ID)

CONTEXT META OBJECT BUILDER ─986

*((for-id, ((c$_1$,pd$_1$, (sc$_{1.}$, ,... sc$_{1.n}$ )),(c$_2$, pd$_2$, (sc$_{2.1,...}$ sc$_{1.n}$)), ... ,((c$_n$, (sc$_{2.1,...}$ sc$_{1.n}$)), pd )), t(y)) + (for-id, (a$_1$,s d$_1$),(a$_2$, sd$_2$),... ,(a$_n$,sd$_n$), t(y))) + ((for-id, (for-id$_{h1,n}$ ))) + composite-cap (Ccap-id, relevancy index (ri$_{h,m}$))*

FIG. 12

Figure 12:
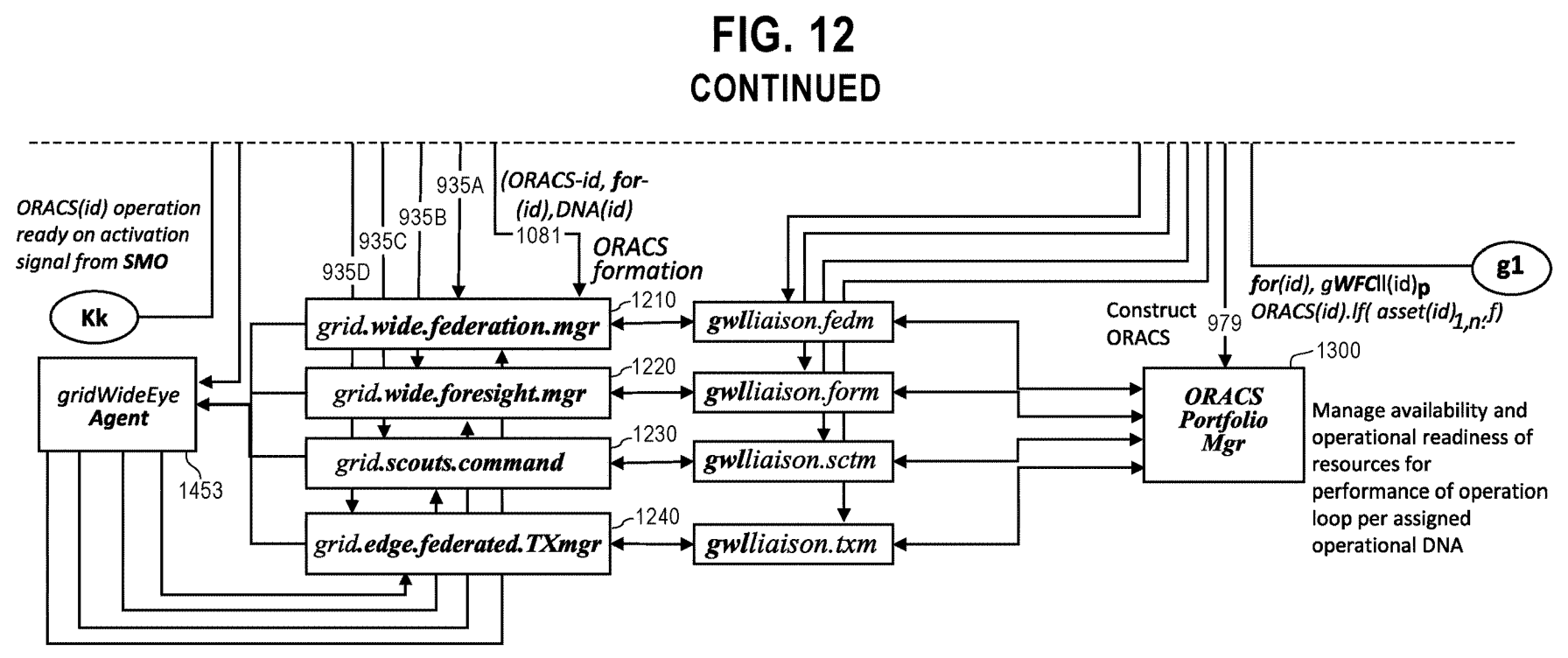

FIG. 12
CONTINUED g1 for(id), gWFCll(id)p
ORACS(id).lf( asset(id)₁,n:f)

1300

Manage availability and operational readiness of resources for performance of operation loop per assigned operational DNA ORACS Portfolio Mgr Construct ORACS    979 gwlliaison.fedm gwlliaison.form gwlliaison.sctm gwlliaison.txm 1210    grid.wide.federation.mgr 1220    grid.wide.foresight.mgr 1230    grid.scouts.command 1240    grid.edge.federated.TXmgr (ORACS-id, for-(id),DNA(id))

(id),DNA(id)

1081

ORACS formation

935A

935B

935C

935D

ORACS(id) operation ready on activation signal from SMO

Kk gridWideEye Agent

*for(id), gWFCIf(id)p*

G gWide.logistician

*1288*
clf Historical Archive

Asset acquisition request,
asset *(1,n)p.(ac, aa)*

*1283*
ORACS-id
Portfolio Mgr.

*1284*
ORACS-id
portfolio DB

967B

*1282*
Marketplace operator

967A

*gWFCIf(id)p(asset-id (assetClass(id, n), asset.attributes(ol(id),
mo(#), ver(#), os(types), hw(types))*

968C

*1272*
**gwPortfolio
Custodian**

*1274*
gridWid asset
portfolio DB
gwapd

969B

*1288*
clf Historical
Archive

969C

FIG. 15
CONTINUED for(id), gWFClff(id)$_p$,, ORACS(id)$_p$.lf clf Historical Archive

999

1288

1000 corTempl(id)

1212

Parse gWFClff(id)$_p$, extract critical assets and associated asset function types and associated asset type attributes in relation ORSCS operation asset.formation processor

1001 gWFClff(id)$_p$

ORACS(id)$_p$.lff(id)

1001A for(id), gWFClff(id)$_p$,, ORACS(id)$_p$.lf(p)

K1

Calibrated oracs O-int (o,r,a,c,s) for each state in operation Loop)

Run provisional ORACS operation loop in simulation mode - validate oracs operability 1002C-1

Learning Engine

1216

1216

1215

1002C

Calibrate oracs interdependency

Validated state oracs

1006

ORACS(id)$_p$.lff(id)$_{or}$ clf Historical Archive

1007

1288

Simulation Engine

1007A

1009A

1002D

ORACS(id)$_p$.lf(id)$_{or}$

1008

1002E

Simulation Scenarios Historical Archive

PoVf.id — 1274 gw asset portfolio DB
gwapd

1460

1101

1113A gWE meta-object Historical Archive

UI/UX Patterns archive

1114B

1472 — 1110

Learning Engine retrieve most relevant pattern associated with PoVf.id

PoVf.id

1113

1114

PoVf.id (beat matched View.pattern)

(View.pattern)

1112

PoVf.id (View.pattern)

PoVf.id(contents, View.pattern)

PoVf.id(contents, View.pattern)

1117 controlPoVf.id ntrolConstructModule

1117B adminPoVf.id adminConstructModule

1116A parse PoVf.id contents and patterns. retrieve oracs(id) aft – create operation action list within oracs(id) operation in relation to oracs(id).aft. construct controlPoVf.id, (oracs.id, aft)

1117A

Pars, analyze PoVf.id contents. identify participating apps within PoVf. Create contextual collaboration links among apps (collab.l(id)(Apps_{1,n})). Construct adminPoVf (id), (collab.l(id)(Apps_{1,n}))

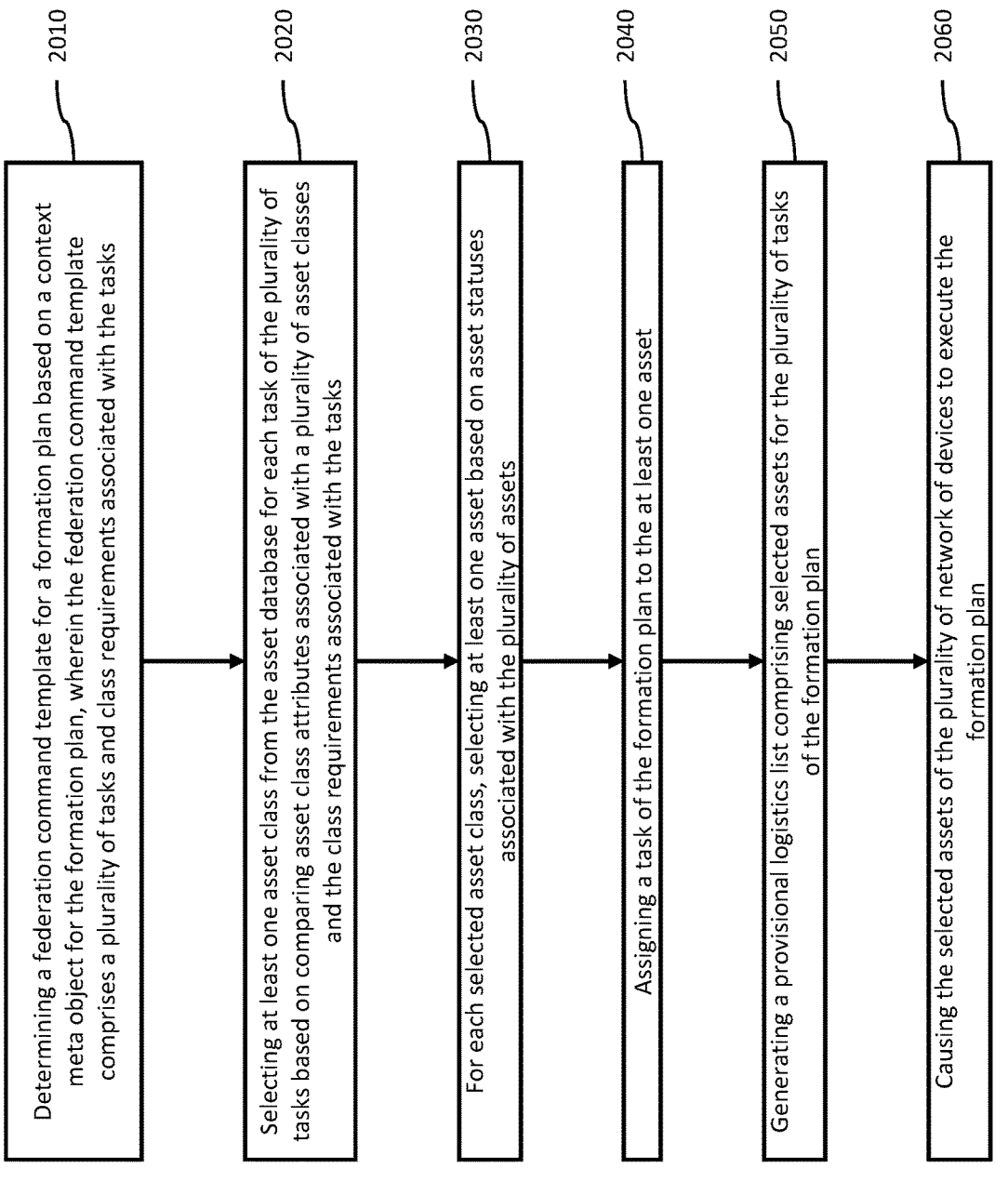

2010

Determining a federation command template for a formation plan based on a context meta object for the formation plan, wherein the federation command template comprises a plurality of tasks and class requirements associated with the tasks

2020

Selecting at least one asset class from the asset database for each task of the plurality of tasks based on comparing asset class attributes associated with a plurality of asset classes and the class requirements associated with the tasks

2030

For each selected asset class, selecting at least one asset based on asset statuses associated with the plurality of assets

2040

Assigning a task of the formation plan to the at least one asset

2050

Generating a provisional logistics list comprising selected assets for the plurality of tasks of the formation plan

2060

Causing the selected assets of the plurality of network of devices to execute the formation plan

*FIG. 20*

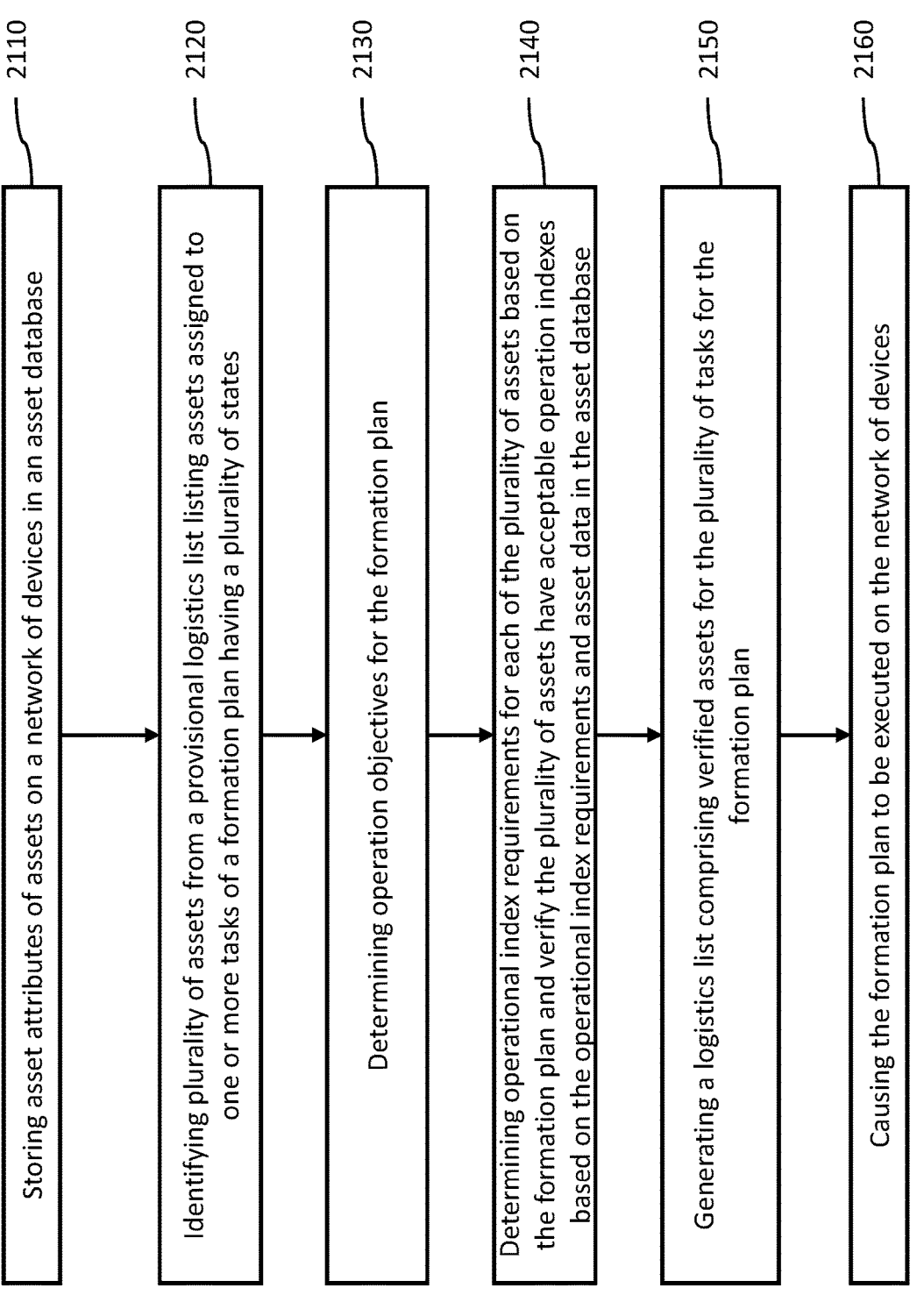

2110

Storing asset attributes of assets on a network of devices in an asset database

2120

Identifying plurality of assets from a provisional logistics list listing assets assigned to one or more tasks of a formation plan having a plurality of states

2130

Determining operation objectives for the formation plan

2140

Determining operational index requirements for each of the plurality of assets based on the formation plan and verify the plurality of assets have acceptable operation indexes based on the operational index requirements and asset data in the asset database

2150

Generating a logistics list comprising verified assets for the plurality of tasks for the formation plan

2160

Causing the formation plan to be executed on the network of devices

*FIG. 21*

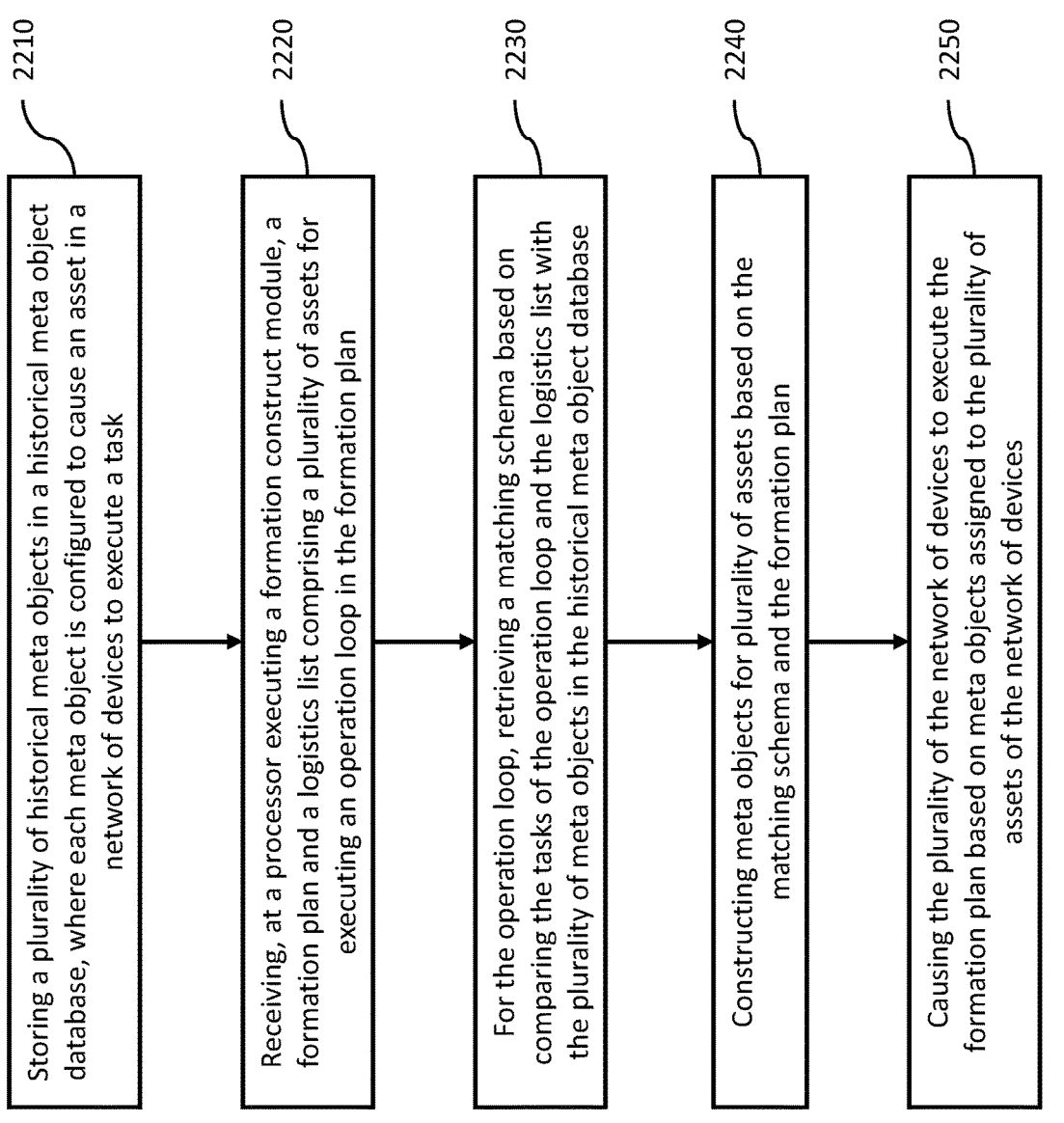

2210

Storing a plurality of historical meta objects in a historical meta object database, where each meta object is configured to cause an asset in a network of devices to execute a task

2220

Receiving, at a processor executing a formation construct module, a formation plan and a logistics list comprising a plurality of assets for executing an operation loop in the formation plan

2230

For the operation loop, retrieving a matching schema based on comparing the tasks of the operation loop and the logistics list with the plurality of meta objects in the historical meta object database

2240

Constructing meta objects for plurality of assets based on the matching schema and the formation plan

2250

Causing the plurality of the network of devices to execute the formation plan based on meta objects assigned to the plurality of assets of the network of devices

*FIG. 22*

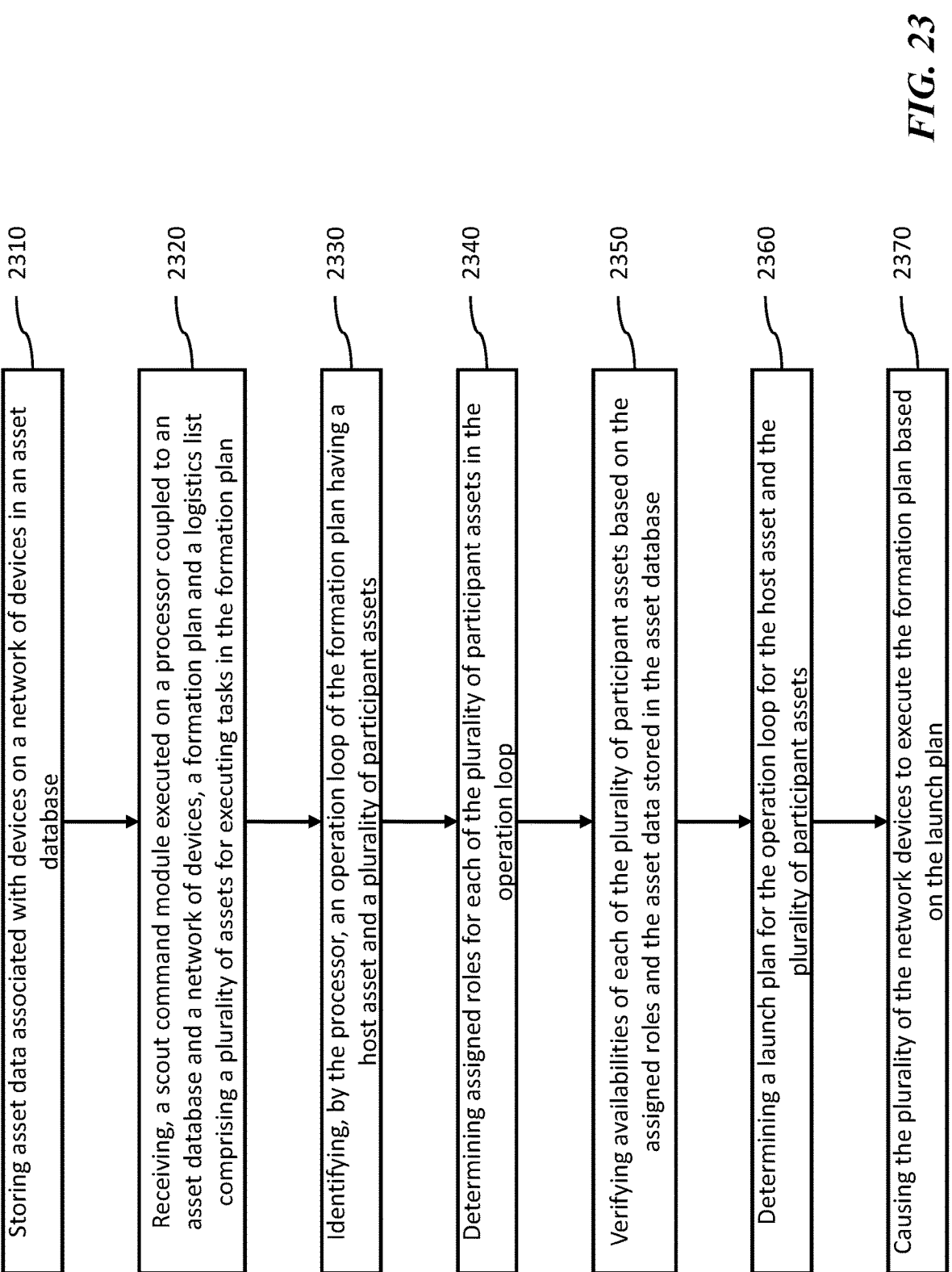

2310 — Storing asset data associated with devices on a network of devices in an asset database 2320 — Receiving, a scout command module executed on a processor coupled to an asset database and a network of devices, a formation plan and a logistics list comprising a plurality of assets for executing tasks in the formation plan 2330 — Identifying, by the processor, an operation loop of the formation plan having a host asset and a plurality of participant assets 2340 — Determining assigned roles for each of the plurality of participant assets in the operation loop 2350 — Verifying availabilities of each of the plurality of participant assets based on the assigned roles and the asset data stored in the asset database 2360 — Determining a launch plan for the operation loop for the host asset and the plurality of participant assets 2370 — Causing the plurality of the network devices to execute the formation plan based on the launch plan

*FIG. 23*

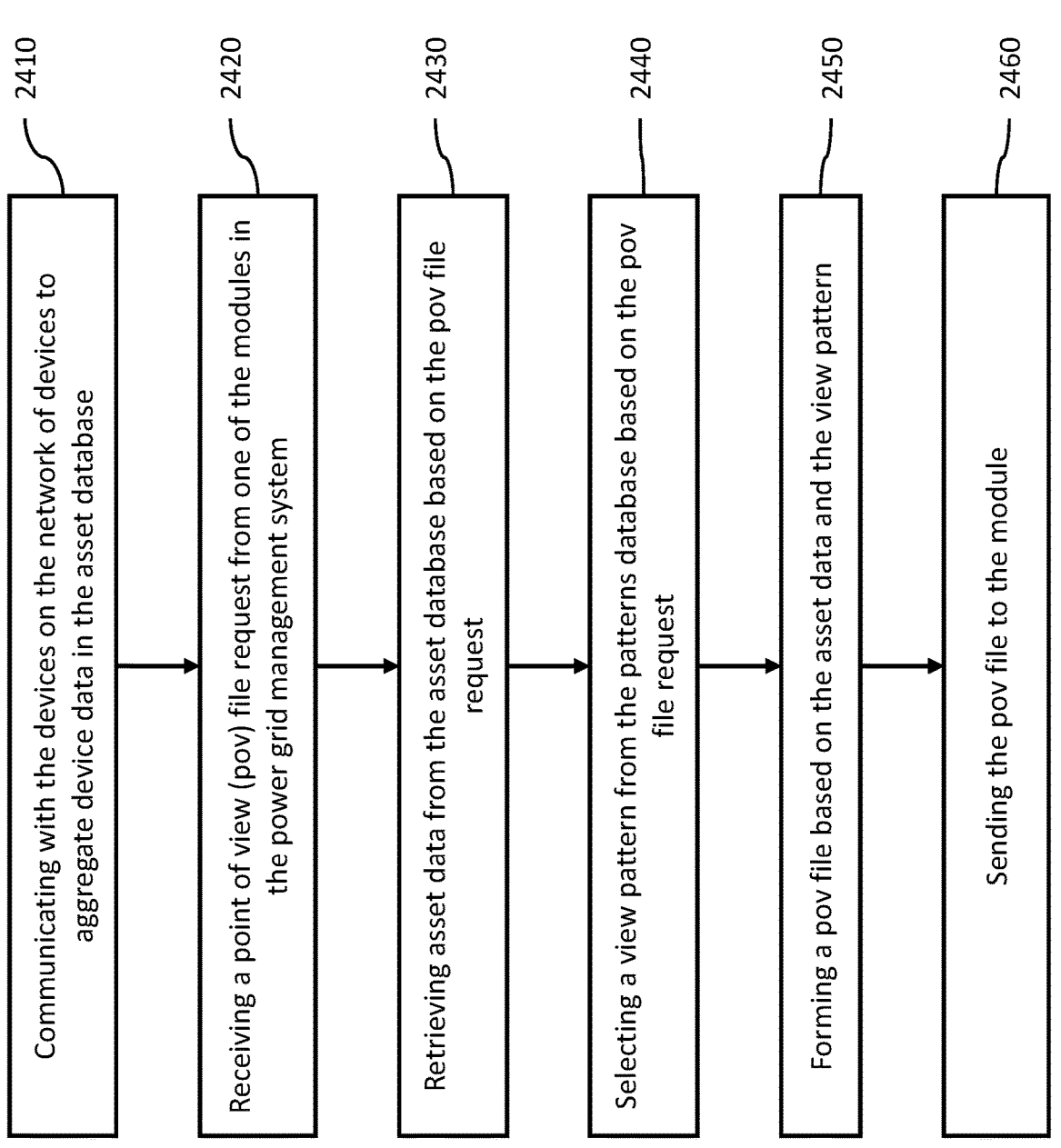

2410 — Communicating with the devices on the network of devices to aggregate device data in the asset database 2420 — Receiving a point of view (pov) file request from one of the modules in the power grid management system 2430 — Retrieving asset data from the asset database based on the pov file request 2440 — Selecting a view pattern from the patterns database based on the pov file request 2450 — Forming a pov file based on the asset data and the view pattern 2460 — Sending the pov file to the module

*FIG. 24*

OPERATION LOOP FORMATION FOR ADAPTIVE POWER GRID MANAGEMENT

TECHNICAL FIELD

This invention relates generally to the management of a network of devices.

BACKGROUND

Geographically distributed complex device networks, such as power grids, are often especially susceptible to various conditions that could lead to service interruptions due to the sheer number of components in the network. External causes such as weather and sabotage and internal causes such as device aging and malfunction can be difficult to identify, troubleshoot, and rectify in a timely manner.

BRIEF DESCRIPTION OF THE DRAWINGS

Disclosed herein are embodiments of systems and methods for providing adaptive device network management. This description includes drawings, wherein:

FIGS. 12, 13A, 13B, 14, 15, 16, 17, 18, and 19 comprises additional flow diagrams of modules of a network management system in accordance with some embodiments.

FIG. 20 is a flowchart of an example method for adaptive power grid management with a logistician module in accordance with some embodiment.

FIG. 21 is a flowchart of an example method for managing a power grid with a portfolio manager module in accordance with some embodiment.

FIG. 22 is a flowchart of an example method for adaptive power grid management with a formation construct module in accordance with some embodiment.

FIG. 23 is a flowchart of an example method for managing an adaptive power grid with a scout command module in accordance with some embodiment.

FIG. 24 is a flowchart of an example method for adaptive power grid management with a data management module in accordance with some embodiment.

Figure 1:
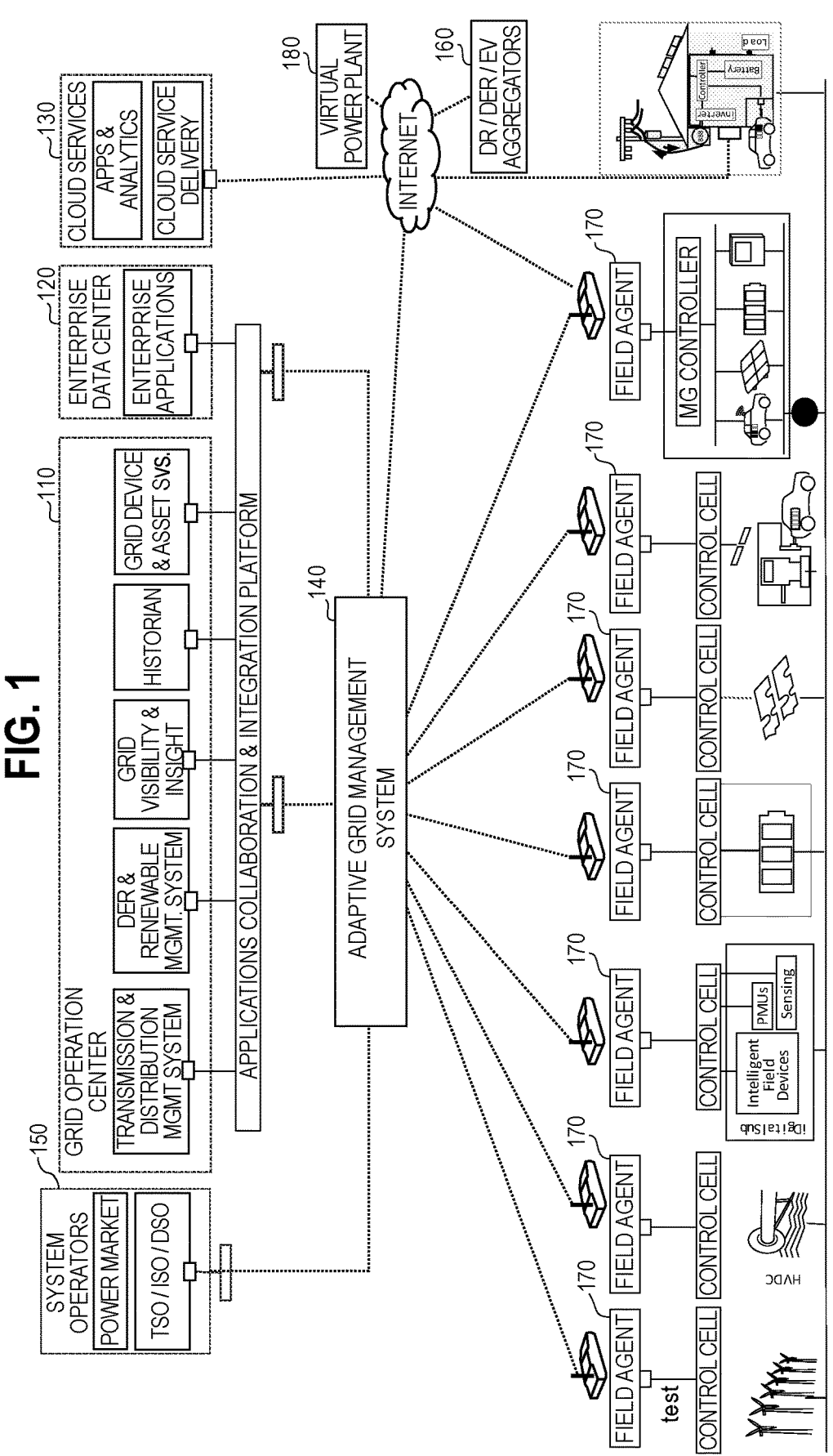
FIG. 1 comprises a system diagram of a power grid system in accordance with some embodiments.

Elements in the figures are illustrated for simplicity and clarity and have not necessarily been drawn to scale. For example, the dimensions and/or relative positioning of some of the elements in the figures may be exaggerated relative to other elements to help improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein for adaptively managing a network of devices.

This application is related to PCT/US22/46851 titled: Adaptive Power Grid Management System file Oct. 17, 2022, and concurrently filed US Applications titled: Logistician Module for Adaptive Power Grid Management (Ser. No. 18/131,743), Asset Portfolio Manager For Adaptive Power Grid Management (Ser. No. 18/131,758), Scout Command for Adaptive Power Grid Management (Ser. No. 18/131,781), and Data Management for Adaptive Power Grid Management (Ser. No. 18/131,790), all of which are incorporated herein in their entirety.

In some embodiments, an adaptive power grid management system is provided. The system comprises a network device database, a network adapter, and a processor. The processor is configured to train a context model with a machine learning algorithm using historical device signals and historical context information associated with a network of devices, receive signals from the network of devices, determine, context data associate with a current condition of the network of devices based on the context model, determine a formation plan based on the context data, the formation plan comprises tasks to be carried out by one or more devices in the network of devices, configure one or more scout applications based on the formation plan and device information stored in the network device database, and cause, via the network adapter, the one or more scout applications to be executed by the one or more devices in the network of devices.

In some embodiments, an operating cell device for power grid management is provided. The device comprises a network adapter configured to communicate with a device network management system and a processor coupled to the network adapter, the processor is configured to receive, via the network adapter and from a server, a scout application with an associated role assignment, authenticate the scout application and automatically execute the scout application upon authentication, and communicate, via the network adapter, with the device network management system or a plurality of devices in a network based on the role assignment of the scout application.

Referring now to FIG. 1, a power grid with an adaptive grid management system is shown. The power grid includes a grid operation data center 110, an enterprise data center 120, cloud services 130, an adaptive grid management system 140, and a plurality of field agent devices 170 each configured to monitor and/or control a control cell coupled to a power grid component and/or subsystem.

The grid operation data center 110 may comprise a transmission and distribution management system, a distributed energy resource (DER) and renewable management system, a grid visibility and insight system, a historian system, and a grid devices and asset services system communicating over an applications collaboration and integration platform. The components of the grid operation data center 110 may communicate with the enterprise data center 120 and system operators 150 over a network to perform their respective functions. The enterprise data center 120 generally comprises enterprise applications for enterprise-level management. System operators 150 may include external systems such as systems associated with the power market, an electric power transmission system operator (TSO), an independent system operator (ISO), and a distributed system operator (DSO). The adaptive grid management system 140 may aggregate data from the system operators 150, the grid operation data center 110, and the enterprise data center 120. In some embodiments, the adaptive grid management system 140 may further aggregate data from cloud services 130 (including cloud applications and analytics and cloud service delivery), virtual power plants 180, and demand response/distributed energy response/electric vehicle (DR/DER/EV) aggregators 160 that aggregate power usage information.

The adaptive grid management system 140 is generally configured to aggregate data from devices and components of the network to detect alert conditions and determine a grid formation plan in response to the alert condition. In some embodiments, the grid formation plan is determined based on an artificial intelligence (AI) machine learning (ML) algorithm that compares the context data associated with an alert condition with historical context patterns to determine a formation to affect the formation of the grid. The adaptive grid management system 140 may further be configured to form and deploy scout applications to be executed on operating cells such as the field agent devices 170 to carry out the formation plan. In some embodiments, the adaptive grid management system 140 is further configured to receive additional data from the scout applications executed at the field agent devices 170 and generate new formation plans based on updated information from the power grid.

In some embodiments, the adaptive grid management system 140 may automatically and contextually adapt the grid to a new self-defined optimize operational formation in response to the changing power system operating conditions. Operating conditions may include physical stress, environmental hazards, social unrest, sabotage, pandemics, and shelter-in-place operating conditions. In some embodiments, the adaptive grid management system 140 includes a self-forming multi-dimensional, contextual, and cognitive state machine that is configured for driving the formation and operation of the self-acting grid. In some embodiments, the adaptive grid management system 140 includes a self-learning decision support system referred to as the grid-wide-mind module that is configured to provide dynamic, condition-based context data and contextual construct in support of the grid artificer module. In some embodiments, the adaptive grid management system 140 includes a system-wide federated alerts correlation processing engine with unique assigned ownership and colorization utilizing grid-wide-mind distributed contextual sensing in support of the grid-wide-mind module. In some embodiments, the adaptive grid management system 140 includes a grid-wide federation command module functioning as a role-based command coordinator and executor, operating as grid-wide federation manager, grid foresight manager, and scouts command. The adaptive grid management system 140 according to some embodiments are described in further detail with reference to FIGS. 2-7 herein.

A field agent device 170 comprises a processor-based device configured to communicate with the adaptive grid management system 140 and other field agent devices 170 over a network such as a secured private network, a virtual private network, a wireless network, a power lines communication (PLC) network, and/or the Internet. In some embodiments, the field agent devices 170 may be geographically distributed and each associated with a component or sub-system of the power grid such as a windfarm, a digital substation, a solar farm, a power bank, an electric vehicle (EV) charging station, a 21339 controller, and the like. In some embodiments, the field agent device 170 may have a data connection with the control cell of the associated component of the network and be configured to exchange data, send requests, and/or change the configuration of the network component via the control cell. In some embodiments, a field agent device 170 may be a user interface device (e.g. portable computer, mobile phone) configured to provide instructions to human operators via a user interface (UI) based on an executed scout application. In some embodiments, the field agent device 170 is configured to execute one or more scout applications received from the adaptive grid management system 140 or from another field agent device to carry out functions specified by the scout application. In some embodiments, a field agent device 170 may be configured to operate for an extended period of time (e.g. hours, days) based on the directives of the scout application without communicating with the adaptive grid management system. In some embodiments, a group of field agent devices 170 may form a federation based on roles assigned to the scout applications executed on the devices. In some embodiments, a field agent device 170 executing a scout application serving as the scout master of a federation may be configured to coordinate task executions and/or issue commands to other field agent devices 170 in the federation. In some embodiments, a field agent device 170 may be configured to cause a copy of an executed scout application to be installed and executed on another field agent device 170. In some embodiments, a field agent device 170 may be configured to automatically terminate the scout application after the completion of one or more tasks or after a set period of time.

In some embodiments, a field agent device 170 executing one or more scout applications may be referred to as an operating cell of the adaptive grid management system 140. In some embodiments, the adaptive grid management system 140 is configured to provide adaptive formation of the grid into geographically dispersed fit-for-purpose self-forming operating cells in response to dynamic grid internal and external imperatives. In some embodiments, each operating cell or federation of cells may be self-managed and can operate autonomously to achieve its assigned objectives. In some embodiments, an operating cell may further merge with other operating cells to create larger cells or join a federation to collectively achieve multiple assigned objectives. In some embodiments, operating cells under stress (e.g. physical threat, cyber threat, insufficient processing power, memory, power supply, network connection stability, etc.) can transfer authority to another cell. In some embodiments, the adaptive grid management system 140 may be configured to provide dynamic formation of lateral access fit-for-purpose distributed control in support of shelter-in-place and other emergency response operations. In some embodiments, the adaptive grid management system 140 may define a federated transaction processing enabling the transfer of authority and autonomous operation in relation to a plurality of operating cells in response to commands or stress conditions. In some embodiments, the adaptive grid management system 140 provides operation and lifecycle management of scout applications in support of self-acting grid adaptive formation, grid formation, grid foresight, and optimization. In some embodiments, the system further includes a grid-wide-eye module for providing grid-wide observability and foresight with an extended line of sight and condition-based point of view in support of grid formation.

In some embodiments, the adaptive grid management system 140 and the field agent devices 170 are added to an existing power grid with one or more of the components shown in FIG. 1. Conventionally, components of the grid operation data center 110 may communicate with the services and control cells of the power grid based on a plurality of individually defined messaging formats and/or protocols such that the components of the grid operation data center 110 are required to each be configured to communicate with each type of control cell the grid operation center supports. In some embodiments, the adaptive grid management system 140 and the field agent devices 170 may serve as intermediaries that unify the communications between the components of the grid operation data center 110 and the various controllers in the system. In some embodiments, while each field agent may be configured to communicate with the associated controller, the communications between the field agent devices 170 and the adaptive grid management system 140 and/or the grid operation data center 110 may be based on a uniform messaging format and/or protocol.

Figure 2:
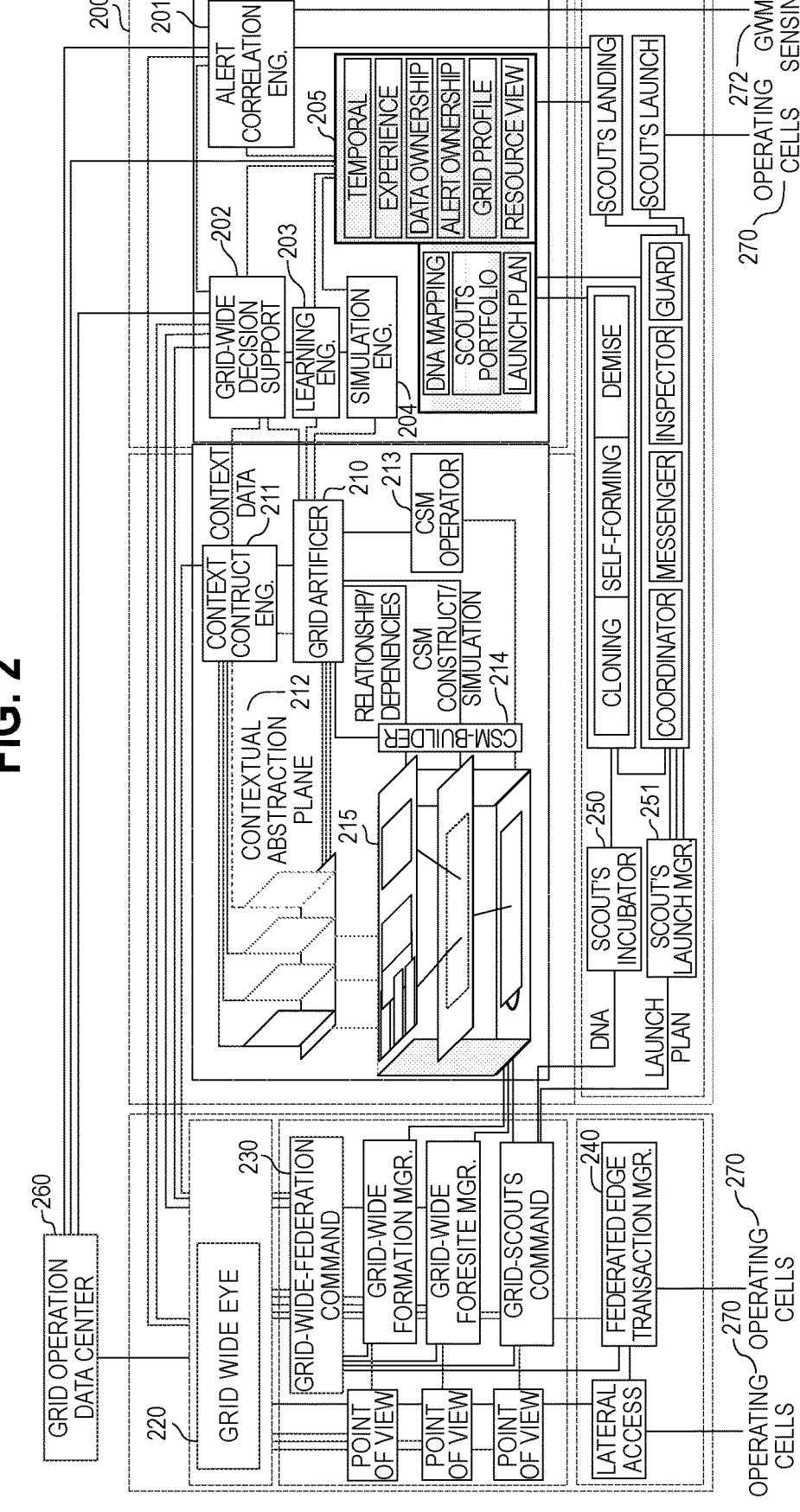
FIG. 2 comprises a block diagram of an adaptive grid management system in accordance with some embodiments.

Next referring to FIG. 2, an adaptive grid management system according to some embodiments is shown. In some embodiments, the adaptive grid management system 200 may comprise one or more processor-based devices executing computer-readable instructions stored on a computer-readable memory storage device. In some embodiments, the adaptive grid management system may be implemented with distributed and/or redundant server architecture on a plurality of networked processor-based devices. In some embodiments, the components of the adaptive grid management system 200 shown may comprise software and/or hardware modules.

In some embodiments, the adaptive grid management system 200 provides a self-acting grid that contextually adapts to new operational formations in response to changing power system operating conditions. Operating conditions may include physical stress, environmental hazards, social unrest, sabotage, pandemics, and shelter-in-place operating conditions. In some embodiments, the adaptive grid management system 200 includes an alert correlation engine 201 based on unique assigned ownership and colorization utilizing distributed contextual sensing 272. In some embodiments, the adaptive grid management system 200 includes a decision support module 202 that utilizes a machine-learning algorithm to provide dynamic, condition-based context data and contextual construct in support of a grid artificer module 210. In some embodiments, the adaptive grid management system 200 includes a self-forming grid artificer module 210 configured to drive self-acting grid formation and operation to maintain grid physical and operational stability in response to system stress and changing operating conditions. In some embodiments, the adaptive grid management system 200 includes cognitive state machine ("CSM") operator 213 for operating a self-forming multi-dimensional, contextual, and cognitive state machine to drive the formation and operation of the self-acting grid. In some embodiments, the adaptive grid management system 200 includes a grid federation command module 230 functioning as a role-based command coordinator and executor, operating as grid-wide federation manager, grid foresight manager, and scouts command.

In some embodiments, the adaptive grid management system 200 is configured to provide adaptive formation of the grid into geographically dispersed fit-for-purpose self-forming operating cells 270 in response to dynamic grid internal and external imperatives. In some embodiments, each operating cell 270 may be self-managed and may operate autonomously to achieve its assigned objectives. The operating cells 270 may further merge with other operating cells to create larger cells or join a federation to achieve multiple assigned objectives. In some embodiments, operating cells 270 under stress can transfer authority to another cell. In some embodiments, the system is configured to provide dynamic formation of lateral access fit-for-purpose distributed control in support of shelter-in-place and other emergency response operations. In some embodiments, the system may define a federated transaction processing enabling the transfer of authority and autonomous operation in relation to a plurality of operating cells in response to command or stress conditions.

The alert correlation engine 201 is configured to retrieve data from the grid operation data center 260 and other data sources, such as contextual sensing 272, for alert condition detection. The alert correlation engine 201 may include an alert coordination manager module for coordinating geographically dispersed alert acquisition processors. In some embodiments, the alert coordination manager module is configured to coordinate the processing and transformation of relevant system-wide alerts with unique system-wide assigned alert ownership. In some embodiments, the alert coordination manager further manages the ingestion and storage of relevant alerts to provide a dynamic and holistic view of the grid and its condition. The stored information may be used for historical recreation, pattern recognition, and situational coordination. In some embodiments, the stored information is used to train an alerts and/or context model using a machine learning algorithm such as a deep neural network algorithm. The trained model may be configured to detect alerts and/or determine context information associated with the current condition of the grid by the alert correlation engine 201.

The alert correlation engine 201 receives signals from an alert coordination manager and/or a grid operation data center 260, analyzes the signal, and detects for an abnormal condition that is out of an acceptable band. If an abnormal condition is detected, the alert correlation engine 201 may generate an action stress frame comprising a unique ID and signal attributes that activates the alert correlation processing. In some embodiments, the alert correlation engine 201 initiates a pattern recognition analysis based on the unique ID of the stress frame and generates a pattern plate colorized based on the best-matched corresponding source, severity degree, and/or potential area of impact. In some embodiments, the alert correlation processing engine, upon receiving the analysis results of the pattern plate, activates an action stress frame constructor module to construct an action stress frame comprising a stress frame ID, pattern plates, and an associated time. In some embodiments, the alert correlation processing engine further creates a record in the learning engine 203 based on the lesson learned from the analysis. The alert correlation engine 201 may then send the action stress frame through a grid gatekeeper module to the decision support module 202 of the grid-wide-mind module. In some embodiments, the grid gatekeeper module is generally configured to provide authentication and security verifications for communications between the grid-wide-mind module and the grid artificer module.

The decision support module 202 is configured to validate the action stress frames through a grid-shaping analysis engine. In some embodiments, the grid-shaping analysis engine is configured to analyze an action stress frame through interactions with the learning engine 203 and send analysis results and context data to a context data builder. In some embodiments, the context data builder performs correlation analysis on the results received from the grid shaping analysis engine and determines the associated vital attribute with a value range. The context data builder may further create a context data ID and final vital attributes with associated severity degree (e.g. (for-id, $(a_1,sd_1)(a_2, sd_2), \ldots (a_n, sd_n), t_i$). The decision support module 202 then sends the "for-id, (attributes), t(x)" as context data to a grid artificer module 210 thru the grid gatekeeper module.

The grid management database 205 stores temporal data, experience data, data ownership, alert ownership, grid profile, resource view data, application portfolio data, DNA mapping information, scouts portfolio data, and launch plans for use by the alert correlation engine 201, the decision support module 202, the learning engine 203, and/or the simulation engine 204.

The grid artificer module 210 comprises a context construct engine 211, a contextual abstraction plane database, 212 a CSM operator 213, a CSM builder 214, and a Contextual and Cognitive State Machine (CaCSM) 215. In some embodiments, the grid artificer module 210 may validate the context data identifier and the request received from the decision support module 202. In some embodiments, the grid artificer module 210 validates "for-id, (attributes)" by extracting a historical pattern for "for-id, (attributes)" to create an activation key ("ga-authenticationkey"), and initiates grid formation upon validation.

In some embodiments, when misalignment is detected by the artificer module 210, the artificer module 210 may send the context data ID, context data, and a time (tx1) to the decision support module 202 and request a correctness analysis. In response, the decision support module 202 may check with the alert correlation engine 201 for system condition variance between t(x) and t(x1) and perform a correctness analysis. If the confidence degree from the correctness analysis is within an acceptable range, the decision support module 202 sends an adjusted (for-id, (attributes), t(x), gwm-verificationkey, ga-authenticationkey) to the artificer module 210 thru a gatekeeper module. If the confidence degree is outside of an acceptable range due to changes in system condition, the decision support module 202 sends a new context data comprising (for-id, (attributes), t(x2), gwm-verificationkey, ga-authenticationkey-x) to the grid artificer module 210. In some embodiments, when the grid artificer module 210 identifies an authentication mismatch, validation steps may be reinitiated. In some embodiments, the artificer module 210 may send the authentication key ("ga-authenticationkey") to the federation command module 230, the federation manager, the foresight manager, the scouts command, and/or a self-acting operator. In some embodiments, the artificer module 210 then sends the context data (e.g. for-id, $(a_1,sd_1)(a_2, sd_2), \ldots (a_n, sd_n)$, t(y)) to the context construct engine 211.

The context construct engine 211 is configured to use context data from the artificer module 210 to initiate context construction. The context construct engine 211 may send a request to the learning engine 203 to exact patterns and context associated with the received context data (e.g. for-id). In some embodiments, the context construct engine 211 may initiate context building by mapping to context patterns that are best matched with (for-id, (a1,sd1)(a2, sd2), . . . (an, sdn), t(y)) per attribute (a1,n and sd1,n). On the best-matched context pattern, the context construct engine 211 constructs a contextual abstraction panel (e.g. subcontext data), each panel representing a separate problem domain perspective and relative dimension. In some embodiments, each panel may be assigned a "cap-id" and include panel positioning, operation classification, functional composition, and a severity index. The context construct engine 211 may then notify the artificer module 210 on the completion of the construct and send the context abstraction plane data (cap-id, abstraction panels attribute, ga-authenticationkey) to the artificer module 210.

In some embodiments, the grid artificer module 210, in response to receiving a signal (cap-id, abstraction panels attribute, ga-authenticationkey) from context construct engine 211, verifies the ga-authentication key and the corresponding "for-id, (attributes)" and activates a CSM entry creation. In some embodiments, the grid artificer module 210, using data from the decision support module 202, maps abstraction panels and the associated context, and determines the level of contextual interdependency and associated index between abstraction panels. In some embodiments, the grid artificer module 210 then determines the most relevant abstraction panel contexts in relation to "for-id, (attributes)" and marks the abstraction panel contexts based on the degree of relevancy (e.g. high (most probable root cause), medium, and low). The grid artificer module 210 then creates a new composite ID (for-id, primary-context-id, attributes, ga-authenticationkey) and activates the cognitive state machine builder (CSM-builder) 214. In some embodiments, the CSM builder 214, extracts the context ID with the highest relevancy index and (for-id, context-id, relevancy-index-high, attributes, ga-authenticationkey) from the signal received from the grid artificer module 210 and sends the exacted information to the learning engine 203. The learning engine 203 then extracts the context ID and the most closely matched patterns CSM (number of states, initial states, trigger, self-forming trigger, final state with corresponding performance index)—(for-id, primary-context-id, attributes, ga-authenticationkey) and sends the data to the CSM-builder. In some embodiments, the CSM utilizes the template from the learning engine 203 and constructs a draft CSM entry. With the creation of a new draft CSM entry by the CSM-builder, the grid artificer module 210 activates the simulation engine 204 for the validation of the CSM. If the simulation engine 204 returns a satisfactory result, the grid artificer module 210 then sends a signal with authenticated simulation result to the CSM builder 214 to authorize the CSM builder 214 to move the CSM entry to production. The CSM builder 214 then updates the draft CSM entry with simulation results, creates the final blueprint, and sends the final blueprint with associated for-ID to learning engine 203. The CSM builder 214 further sends the final blueprint, the authenticated key, and an initiate command to the CSM operator 213. In some embodiments, the CSM operator 213 is configured to authenticate the signal from the CSM builder, on verification, verify that blueprint mapped to the CSM entry, activate self-forming capabilities in relevant cell(s), and send a signal to the federation.

The grid-wide-eye module 220 is configured to provided observability and foresight with an extended line of sight and condition-based point of view in support of grid formation. In some embodiments, the grid-wide-eye module 220 is configured to provide information to the alerts engine, including the alert correlation engine 201, an action stress frame constructor module, and the decision support module 202. In some embodiments, the adaptive grid management system 200 includes system-wide distributed contextual sensing 272 with embedded adaptive self-describing semantics and an embedded method for self-adjusting positioning coordination. In some embodiments, the adaptive grid management system 200 includes alert acquisition processors with built-in semantics deployed across the grid and configured with self-adjusting positioning.

The federation command module 230 is a role-based coordinator, functioning as grid formation manager, grid foresight manager. and scout coordinator. In some embodiments, a foresight manager creates an operation plan and optimizes the formation strategy based on signals from the artificer module 210. The foresight manager may further interact with the decision support module 202 to simulate the formation plan via the simulation engine 204 and derive operational functional attributes. In some embodiments, based on the simulation result, the foresight manager may optimize the formation plan, create a manifest template, define operating cell DNA type, and log the manifest in a CSM cell with the corresponding DNA matches. In some embodiments, if an operating cell does not exist, federation command module 230 may request the CSM operator 213 to create a new operating cell. In some embodiments, upon completion of CSM state cell formation, the CSM operator 213 may set the cell as incubation ready for scouts command module to initiate scout inception, training, and deployment preparation. Upon the completion of incubation via the scout incubator 250, the CSM operator 213 updates the cell with a ready-to-deploy flag and assigns DNA.

In some embodiments, in response to a request from the grid foresight manager, the grid federation command module 230 may initiate the definition and coordination of a plurality of distributed operating cells 270. In some embodiments, the federation command module 230 may designate each cell as a virtual, physical, or hybrid base operation plan. In some embodiments, a cell is assigned operational DNA, defining operation characteristics of the cell. In some embodiments, a cell may have knowledge of other cells, their locality, and DNA types. In some embodiments, a cell may operate autonomously for an extended period of time. In some embodiments, a cell may be configured to determine to merge with another cell to create a larger cell with more operating power based on detecting associated triggering conditions. In some embodiments, a federation of a plurality of cells can form based on commands from the command hub and the cells may be configured to create a new federation or join an existing federation of cells. In some embodiments, each federation of cells may include a federation command hub that inherits relevant intelligence from the grid-wide-mind module of the adaptive grid management system 200. In some embodiments, a federation may be managed by a scout master cell assigned by the command hub coordinator and the cells in the federation may be configured to receive commands to be managed by the scout master.

The scout command module comprises a scout incubator 250 and a scout launch manager 251 operating based on commands received from the artificer module 210. In some embodiments, a scout application may be assigned the role of a scout messenger for providing optimized ingestion, transformation, and storage of relevant data in motion. In some embodiments, a messenger scout application may be automatically configured by the system to be adaptive to the locality, people, assets, and applications. In some embodiments, a scout application may be assigned the role of a scout coordinator that is automatically configured by the adaptive grid management system 200 to provide coordination and management of operating cells for the duration of the assigned mission according to the mission plan. In some embodiments, a scout application may be assigned the role of a scout inspector that is automatically configured by the system to observe cell behavior in relation to interactions, asset/device performance, people interaction, historical recreation, pattern recognition, and machine learning, and provide the collected information to the decision support system. In some embodiments, the scout application may be assigned the role of a guard that is automatically configured by the system to provide cell defense against physical threats, cyber threats, and functional misalignments. In some embodiments, a scout application executed on an operating cell may be configured to clone itself to another operating cell in response to a trigger condition. In some embodiments, a scout application may be configured to change its configuration and/or tasks (i.e. self-form) after deployment in response to trigger conditions. In some embodiments, a scout application may be configured to self-terminate (i.e. demise) in response to a trigger condition or after a set period of time.

In some embodiments, the adaptive grid management system 200 may provide operation and lifecycle management of scout applications in support of the adaptive formation of the grid. In some embodiments, the scouts command module may be configured to retrieve assignments and directives from the CSM and map a received DNA description to a scout roster. In some embodiments, upon receiving a directive from the CSM, the scouts command module may retrieve the associated assignment from CSM operator 213. Based on the assigned DNA description, the scouts command module maps the DNA to scouts in the scouts roster, if a match is found and the matched scout is in an idle state, the scouts command module may update the DNA, upload mission plan, and designate responsibility tag and level of alterity to the matched scout. If the matched scout is not in an idle state, the scouts command module may initiate a cloning process to replicate the scout, update the DNA, upload the mission plan, designate the responsibility tag, and level of alterity at the cloned scout application. If no existing scout matches the received DNA, the system may initiate a new scout incubation and training process and notify the CSM operator 213 to initiate cell creation. The new scout application may be deployed upon completion of incubation and training. In some embodiments, the scout command module may further manage assigned advance controllability and assign objective function in relation to local grid morphing at the cells via the federated edge transaction manager 240.

The block diagram of FIG. 2 is provided as an example configuration of an adaptive grid management system. In some embodiments, one or more modules may be combined in the functionality with another module or split into multiple modules. In some embodiments, additional modules not illustrated in FIG. 2 may be included to perform the functions described herein.

In some embodiments, the systems and methods described herein are configured to increase grid reliability, stability, and resiliency to changing power system conditions both when operating under normal and abnormal conditions. In some embodiments, the system provides dynamic grid observability and situational awareness with an extended line of sight and condition-based point of view that allows for faster response times to dynamic system conditions. In some embodiments, the system increase grid abnormal condition predictivity based on historical re-creation, pattern recognition, and machine learning for operation optimization. In some embodiments, the system provides grid assistance health management that monitors, analyzes, and predicts failure. In some embodiments, the system provides de-centralized control applications and distributed computing to avoid the vulnerabilities of centralized command and associated latencies. In some embodiments, the system enables a morphing grid with flexible integration and interoperability of diverse field devices, controllers, and communication paths at the edge. In some embodiments, the system further provides ecosystem value creation by allowing for seamless interaction and collaboration between applications, assets, and people across different system domains. In some embodiments, the system may include E2E secure connectivity such that the flows of information between disparate entities across multiple network domains are secured. In some embodiments, the system provides full lifecycle device management, requiring minimum manual intervention. In some embodiments, the system provides optimized ingestion, transformation, and storage of relevant data in motion to fulfill grid functions and future anticipated needs.

In some embodiments, the systems and methods described herein provide a complex mission-critical machine that can transmute to new formations in response to system stress, abnormal conditions, environmental hazards, pandemics, and shelter in place operating conditions with minimum manual intervention, utilizing a grid-wide artificial intelligence (AI)-based decision support system.

Figure 3:
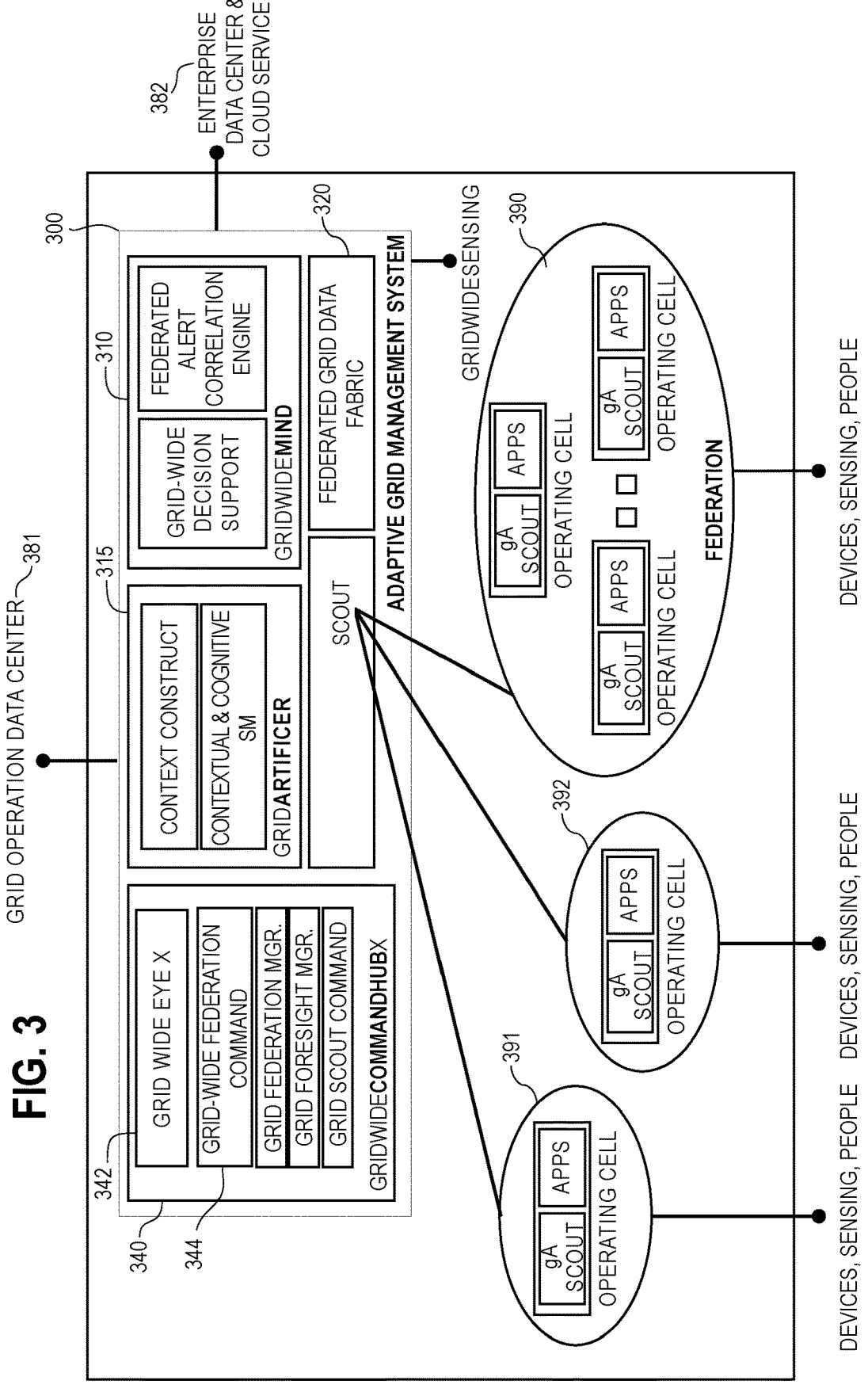
FIG. 3 comprises a block diagram of the adaptive grid management system and operating cells in accordance with some embodiments.

Next referring to FIG. 3, an adaptive grid management system according to some embodiments is shown. In some embodiments, the adaptive grid management system 300 may comprise one or more processor-based devices executing computer-readable instruction stored on a memory storage device. In some embodiments, the adaptive grid management system 300 may be implemented with distributed and/or redundant server architecture on a plurality of networked processor-based devices. In some embodiments, the modules of the adaptive grid management system 300 may comprise software and/or hardware modules.

The adaptive grid management system 300 comprises a grid-wide-mind module 310, a grid artificer module 315, a grid-wide command hub 340, and federated grid data fabric 320. The grid-wide-mind module 310 comprises a federation alert correlation engine and a decision support module. In some embodiments, the federation alert correlation engine is configured to detect alert conditions based on data from a variety of sources including the grid operation data center 381 and enterprise data center and cloud services 382. In some embodiments, the decision support module is configured to generate context data based on the alert detected by the alert correlation engine. In some embodiments, context data may be referred to as frame of reference ("for") data and may comprise alert type and vital attributes with severity degrees. In some embodiments, context data may be determined based on ML-based pattern recognition and matching using a context model trained on historical data. In some embodiments, the grid-wide-mind module 310 may comprise the alert correlation engine 201, the decision support module 202, the learning engine 203, and the simulation engine 204 described with reference to FIG. 2.

In some embodiments, the grid artificer module 315 may be configured to validate the context data from the grid-wide-mind module 310 and determine a formation plan via the context construction engine and a contextual and cognitive state machine. In some embodiments, the context construct engine is configured to extract patterns and context associated with the received context data and separate the context construct into abstraction panels representing separate problems. The grid artificer module 315 then matches each abstraction plane with historical constructs to determine a target grid formation and a formation plan for achieving the target formation through a cognitive state machine. In some embodiments, the grid artificer module 315 may comprise the grid artificer module 210, the context construct engine 211, the CSM operator 213, and the CSM builder 214 described with reference to FIG. 2.

The grid-wide command hub 340 comprises a grid-wide-eye module 342 and a grid-wide federation command module 344. The grid-wide-eye module 342 is configured to aggregate data from grid operation data center 381, the enterprise data center and cloud services 382, and operating cells, and organize data into points of view for various components of the adaptive grid management system 300. In some embodiments, the grid-wide-eye module 342 may comprise the grid-wide-eye module 220 described with reference to FIG. 2.

The grid-wide federation command module 344 may include a federation manager module, a foresight manager module, and a scout command module. The foresight manager creates an operation plan and optimizes the formation strategy based on signals from the grid-wide-mind module. The grid federation manager initiates the definition and coordination of the plurality of distributed operating cells. The scout command is configured to incubate and launch scout applications for execution at operating cells 391 and 392 and cells in the federation 390. The federated grid data fabric 320 may comprise a grid management system database providing data for use by the grid-wide-mind module 310 and the grid-wide federation command module 344. In some embodiments, the grid-wide federation command module 344 may comprise the federation command module 230 described with reference to FIG. 2.

The operating cells 391-395 each comprise a scout application executing on a device in the grid. In some embodiments, the device may be a physical field agent device or a virtual field agent device executed as a software component of another device. In some embodiments, operating cells may form a scout federation 390 that shares communication and command. In some embodiments, one of the operating cells in the federation 390 may be designated as the scout master of the scout federation 390 and be configured to coordinate the task executions of cells in the federation 390 to achieve a common objective. In some embodiments, each of the operating cells may be assigned a role (e.g. coordinator, messenger, inspector, guard) by the adaptive grid management system 300 according to the characteristics of the executed scout application. The operating cells may then communicate with other operating cells and the adaptive grid management system 300 based on the assigned role. In some embodiments, each operating cell 391 may be associated with devices, sensors, or people. In some embodiments, an operating cell may be configured to provide instructions, collect data, relay messages, affect configurations, and provide security protection according to the scout application's assigned tasks.

Figure 4:
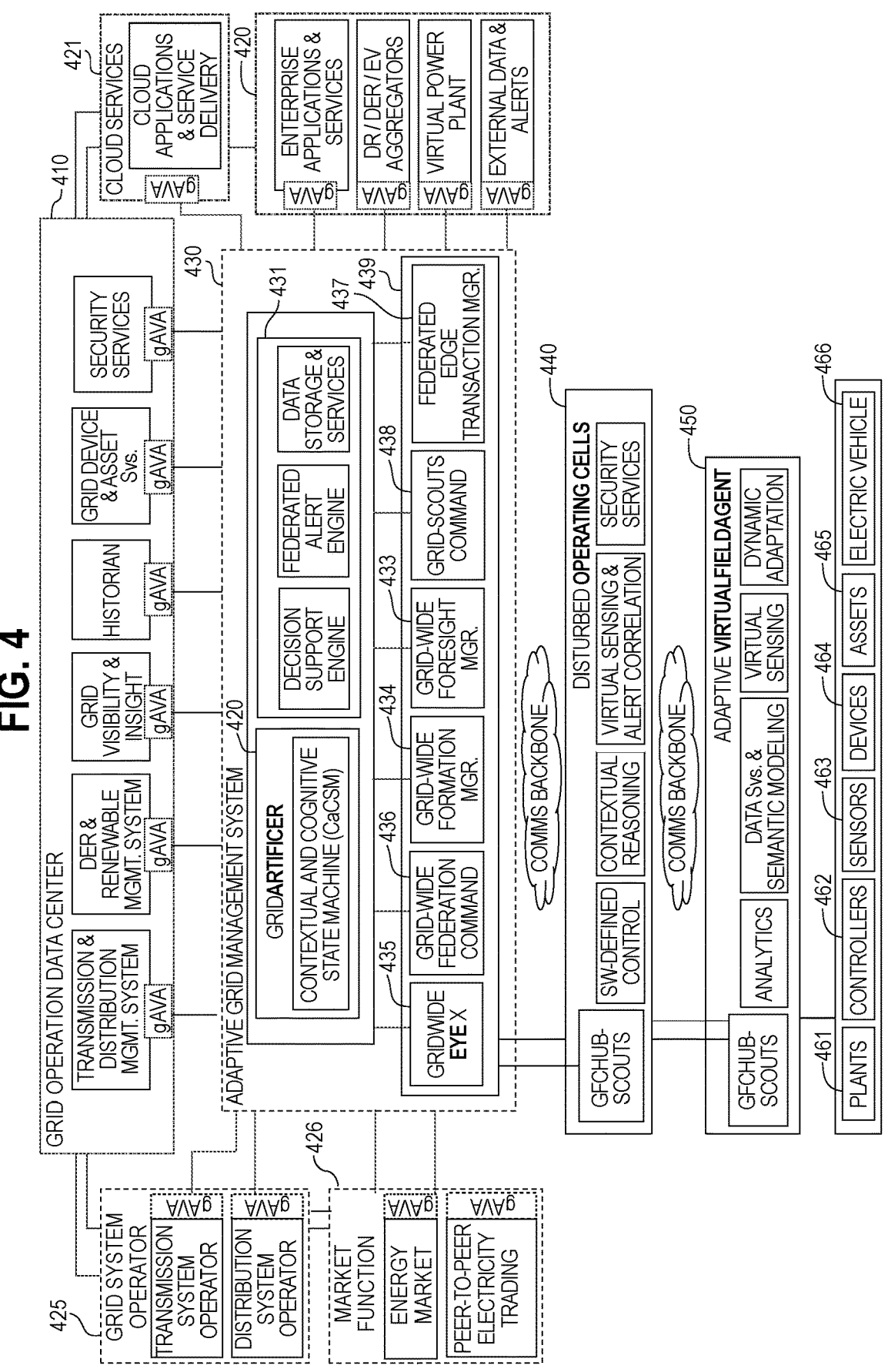
FIG. 4 comprises a block diagram of a power grid system in accordance with some embodiments.

Next referring to FIG. 4, an adaptive grid management system according to some embodiments is shown. In some embodiments, the adaptive grid management system 430 may comprise one or more processor-based devices executing computer-readable instruction stored on a memory storage device. In some embodiments, the adaptive grid management system 430 may be implemented with distributed and/or redundant server architecture on a plurality of networked processor-based devices. In some embodiments, the modules of the adaptive grid management system 430 may comprise software and/or hardware modules.

The adaptive grid management system 430 is coupled to a grid operation data center 410, cloud services 421, an enterprise data center 420, grid system operators 425, and market function systems 426. The grid operation data center 410 may comprise a transmission and distribution management system, a DER and renewable management system, a grid visibility and insight system, a historian system, a grid device and asset services system, and security services system. Cloud services 421 may comprise cloud applications and service delivery. The enterprise data center may comprise enterprise applications and services, DR/DER/EV aggregators, virtual power plant systems, and other external data and alerts. The grid system operators 425 may comprise transmission system operators and distribution system operators. The market function systems 426 may comprise energy market systems and peer-to-peer electricity trading systems. In some embodiments, one or more components of the grid operation data center 410, the cloud services 421, the enterprise data center 420, the grid system operators 425, and the market function systems 426 includes a grid artificer virtual agent ("gAVA") that allows the components to exchange data and commands with the adaptive grid management system 430. In some embodiments, the gAVA may standardize the communication messaging format of protocol between the components.

The adaptive grid management system 430 includes a grid-wide-mind module 431, a grid artificer module 432, and a grid-wide command hub. The grid-wide-mind module 431 comprises a decision support engine, a federated alert engine, and data storage and services. The grid-wide-mind module 431 is configured to detect alert conditions in the grid, determine context data based on ML pattern recognition and matching, and simulate a formation plan for execution based on current grid conditions. In some embodiments, the grid-wide-mind module 431 comprises the decision support module 202, the learning engine 203, the simulation engine 204, and the alert correlation engine 201 described with reference to FIG. 2. The grid artificer module 432 includes a contextual and cognitive state machine (CSM) for executing a formation plan determine based on context information received from the grid-wide-mind module. In some embodiments, the grid artificer module comprises the grid artificer module 210 described with reference to FIG. 2

The grid-wide command hub 439 comprises a grid-wide-eye module 435, a grid-wide federation command module 436, a grid-wide formation manager 434, a grid-wide foresight manager 433, a scouts command 438, and a federated edge transaction manager 437. The grid-wide-eye module 435 is configured to aggregate data from grid operation data center 410, the enterprise data center 420, cloud services 421, grid system operators 425, and market function systems 426, and operating cells and organize data into points of view for use by various components of the adaptive grid management system 430.

In some embodiments, the grid-wide federation command module 436 is configured to initiate the definition and coordination of a plurality of distributed operating cells. The grid-wide formation manager 434 is configured to define and coordinate the formation of the grid through the operating cells. The foresight manager 433 is configured to create an operation plan and optimize formation strategy based on signals from the grid-wide-mind module 431. The scout command 438 is configured to incubate and launch scout applications for execution at operating cells. The federated edge transaction manager 437 is configured to assigned advance controllability and objective function in relation to local grid morphing at the cells.

An operating cell of the adaptive grid management system 430 may comprise a distributed operating cell 440 executing a scout application. The distributed operating cell 440 may comprise a processor-based device having a control circuit executing computer-readable instructions stored on a memory storage device. In some embodiments, the distributed operating cell 440 is configured to communicate with one or more field agent devices based on the directives of the scout applications running on and role assignments associated with the field agent devices. The distributed operating cell 440 may execute software-defined control, contextual reasoning, virtual sensing, alert collection, and security services. In some embodiments, the security services may be configured to provide cyber security to the distributed operating cell 440 and verify and validate scout applications before execution. In some embodiments, the distributed operating cell further comprises a data fabric storing data for decision making at the distributed operating cell 440. In some embodiments, the distributed operating cell 440 may be configured to coordinate the installation and execution of scout applications at a plurality of field agent devices. In some embodiments, the distributed operating cell 440 may be configured to performs its functions and make decisions based on the scout application and the stored data without communicating with the adaptive grid management system 430 for an extended period of time (e.g. hours, days).

An operating cell of the adaptive grid management system 430 may comprise an adaptive field agent device 450 executing a scout application. In some embodiments, the field agent device 450 may comprise a physical and/or a virtual device. The field agent device 450 may comprise a processor-based device having a control circuit executing computer-readable instructions stored on a memory storage device. The field agent device 450 may be assigned a role based on the executed scout application and perform tasks based on the directive of the scout application. The field agent device 450 may execute analytics, data services, semantic modeling, virtual sensing, and dynamic adaptation. In some embodiments, the security services may be configured to verify and validate scout applications before execution. In some embodiments, a field agent device 450 may be associated with and/or communicate with components of a power grid such as plants 461, controllers 462, sensors 463, devices 464, assets 465, and electric vehicles 466. In some embodiments, a field agent device 450 may interface with a power grid component to aggregate data, send commands, provide security services, or perform inspections. Generally, a field agent device executing a scout application is configured to perform one or more tasks based on the directives of the scout application as part of the formation plan of the adaptive grid management system 430. Generally, an adaptive grid management system 430 may have any number of distributed operating cells 440 and adaptive field agent devices 450 executing scout applications. A distributed operating cell 440 may also be configured to command and coordinate any number of adaptive field agent devices 450.

While a network of devices in a power grid is generally referenced in the description of FIGS. 1-4, the teachings of the present disclosure are also applicable to other types of device networks such as a communications network, a transportation network, an Internet of Things (IoT) network, an enterprise network, etc.

Figure 5:
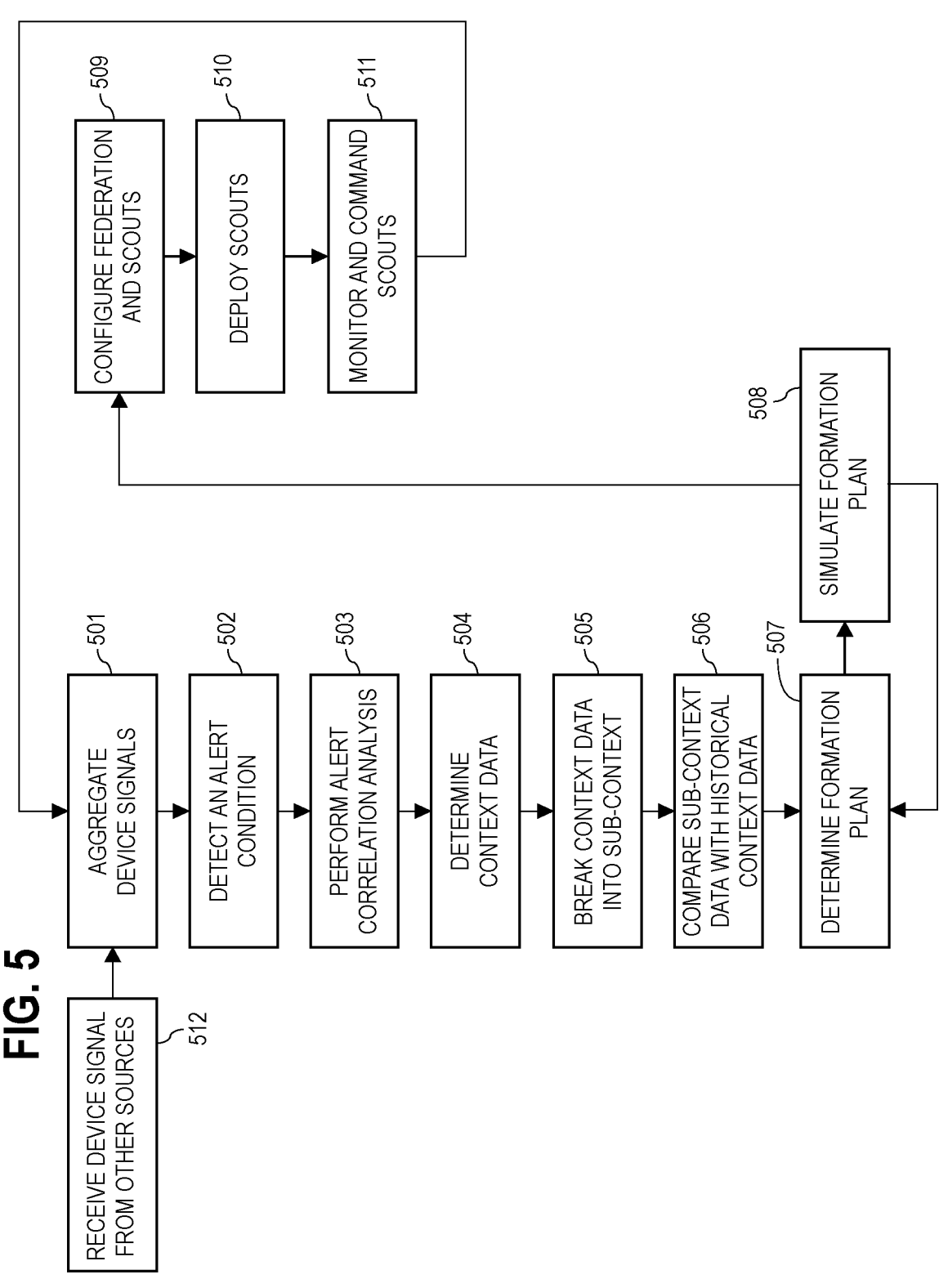
FIG. 5 comprises a flow diagram of a network management system in accordance with some embodiments.

Now referring to FIG. 5, a process for device network management is shown. In some embodiments, one or more steps of FIG. 5 may be performed by a processor-based device or system such as an adaptive grid management system described herein.

Prior to step 501, the system receives device signals from sources other than the devices executing scout applications in step 512. In some embodiments, the signals received in step 512 may comprise device status and system condition information provided by the devices or another system monitoring the network of devices. In some embodiments, the data received in step 512 may comprise other context data such as weather information, customer feedback information, incident reports, news services, web content, etc. In step 501, the system aggregates signals from devices in the network. In some embodiments, device signals may comprise status and alert data from various components of a network comprising information such as connectivity, throughput, response time, etc. In some embodiments, the signals may be ingested and processed through another system such as an operation center or an enterprise data center prior to step 501. In step 502, an alert condition is detected. In some embodiments, the system may be configured to detect alert conditions based on detecting for signals that are outside of the expected band. In some embodiments, the alert condition may be detected based on an alert signal from one or more of the network devices or the operation center. In some embodiments, for a power grid, an alert signal may correspond to an outage or loss of connection to a component or a condition that is likely to lead to an outage or loss of connection. In step 503, the system performs alert correlation analysis by comparing the detected device signals with historical device network data. In some embodiments, the system may first train a context model using historical device signals and historical context information associated with the network of devices. The current signals from the network of devices are then used as input of the context model to determine context data associated with the current state of the network of devices. In some embodiments, the alert condition may correspond to a current issue or a predicted future issue (e.g. outage, overload, component failure).

In step 504, context data is determined based on the alert correlation analysis. In some embodiments, context data may comprise vital attributes and severities associated with each vital attribute. In some embodiments, context data may further comprise a control area identifier, a timing identifier, and an alert condition identifier determined based on the signals from the devices. For example, context data may identify a geographic area associated with the devices that generated the signals that led to the detection of the alert condition. In step 505, the context data is separated into sub-context data, each associated with a separate issue in the device network. In step 506, each sub-context data is compared with a historical context data pattern from a historical context pattern database to determine a formation plan for affecting the grid formation in response to the alert in step 507. In some embodiments, each historical context pattern may identify a particular issue associated with the sub-context and a target grid formation or one or more tasks for affecting the network formation in response to the issue. In some embodiments, the formation plan may comprise tasks to be executed by a plurality of operating cells in the device network. In some embodiments, the system may determine a state machine comprising a list of steps and trigger conditions for each step determined based on the context information for reconfiguring the device network from the current state to the desired state in stages, and the formation plan may be determined based on states defined in the state machine. In some embodiments, the tasks may comprise one or more of a coordination task, a messenger task, an inspection task, or a guard task. In step 508, the system simulates the formation plan based on the updated signals from the network devices to verify that the execution of the formation plan would achieve the desired grid formation. If the formation plan passes simulation, the system configures scout federations and scout applications for incubation and deployment based on the formation plan and/or the state machine. In step 509, scout applications assigned to each operating cell may be configured based on the tasks and role of the operating cell assigned by the formation plan and characteristics of the operating cell such as device type, device capability, etc. In some embodiments, if the directives of the formation plan match a previously configured scout application, the previously configured scout application may be retrieved for deployment. In some embodiments, if no existing scout application matches the directive of the formation plan, the system may configure a new scout application based on stored application components (e.g. DNA). A newly formed scout application may be incubated and tested prior to deployment. In some embodiments, the system may further determine commands and/or reconfiguration of existing operating cells already executing a scout application based on the formation plan.

In step 510, the scout applications are deployed for execution at operating cells such as distributed control hubs and field agent devices. In some embodiments, scout applications may be deployed or triggered in phases based on the states of the state machine. In step 511, after the deployment of the scout applications, the system monitors for data from the operating cells executing the scout applications. In some embodiments, the system may further issue commands and instructions to the scout applications as needed based on updated data from the network of devices and/or the state machine. After the scout applications are deployed, the system continues to aggregate device signals to update the state machine and determine new formation plans in response to any remaining or new alert conditions. In some embodiments, a new formation plan may cause updates or terminations of deployed scout applications. In some embodiments, a scout application may be configured to cause an operating cell device to carry out tasks for an extended period of time in response to various trigger conditions without further commands or instructions from the network management system. Further details of an operating cell device executing a scout application are described with reference to FIG. 6 herein. In some embodiments, a new formation plan may be directed to a different set of operating cells and device network components to address a different alert condition. In some embodiments, after successful execution of a formation plan that removes the alert condition, the detected device signal and the formation plan may be used to train a machine-learning algorithm model for future context construction and/or formation plan determinations.

Figure 6:
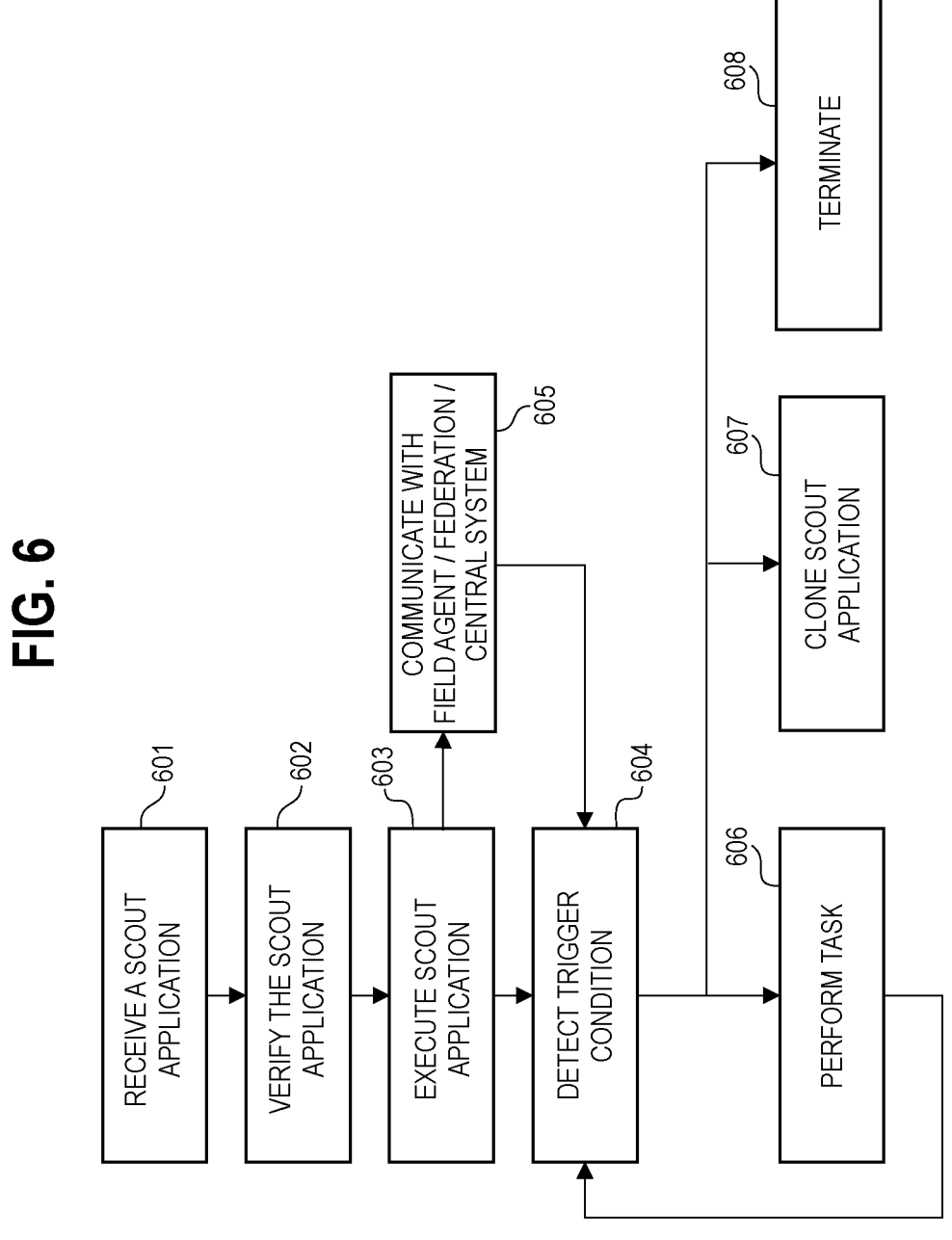
FIG. 6 comprises a flow diagram of an operating cell in accordance with some embodiments.

Now referring to FIG. 6, a process for device network management with an operating cell is shown. In some embodiments, one or more steps of FIG. 6 may be performed by a processor-based device or system in a network of devices such as a field agent device and a distributed control hub described herein.

In step 601, a device in a power grid receives a scout application from the network management system or another device in the network such as a field coordinator device or a field agent device. In step 602, the device verifies the received scout application for authenticity and timeliness. In some embodiments, the authentication may be based on an authentication key. In step 603, the device executes the scout application and begins to carry out the directive of a formation plan based on tasks defined in the scout application. In some embodiments, the device may assume a role (e.g. coordinator, messenger, inspector, guard) based on the role assigned to the scout application. In step 604, the device detects for trigger conditions associated with various tasks and actions. In step 605, the device may begin to communicate with other field agent devices, a device federation, and/or the central device management system based on the role assigned to the scout application. For example, the device may begin to accept tasks assigned by a master of the federation or begin to transmit specified data to the central device management system. In some embodiments, the scout application may specify trigger conditions associated with actions and tasks. For example, a data transmission task may be triggered by a timestamp or upon detection of an abnormal condition in the data. In step 606, the device performs the task which may be a coordinator task, a messenger task, an inspector task, or a guard task. In step 607, upon detection of a cloning trigger, the device may send a copy of the scout application to be executed by another device. In some embodiments, the device may further transfer authority and role to the other device in step 607. For example, if the device detects a stress condition (e.g. unstable power supply or data connection), the device may transfer its task and role to another device in the network that can complete the directive of the scout application. In step 608, upon detection of a termination trigger, the device may terminate the execution of the scout application. In some embodiments, the termination trigger may comprise the completion of one or more tasks or detection of a change in a specified condition. In some embodiments, the device may remove the scout application from its memory in step 608.

Figure 7:
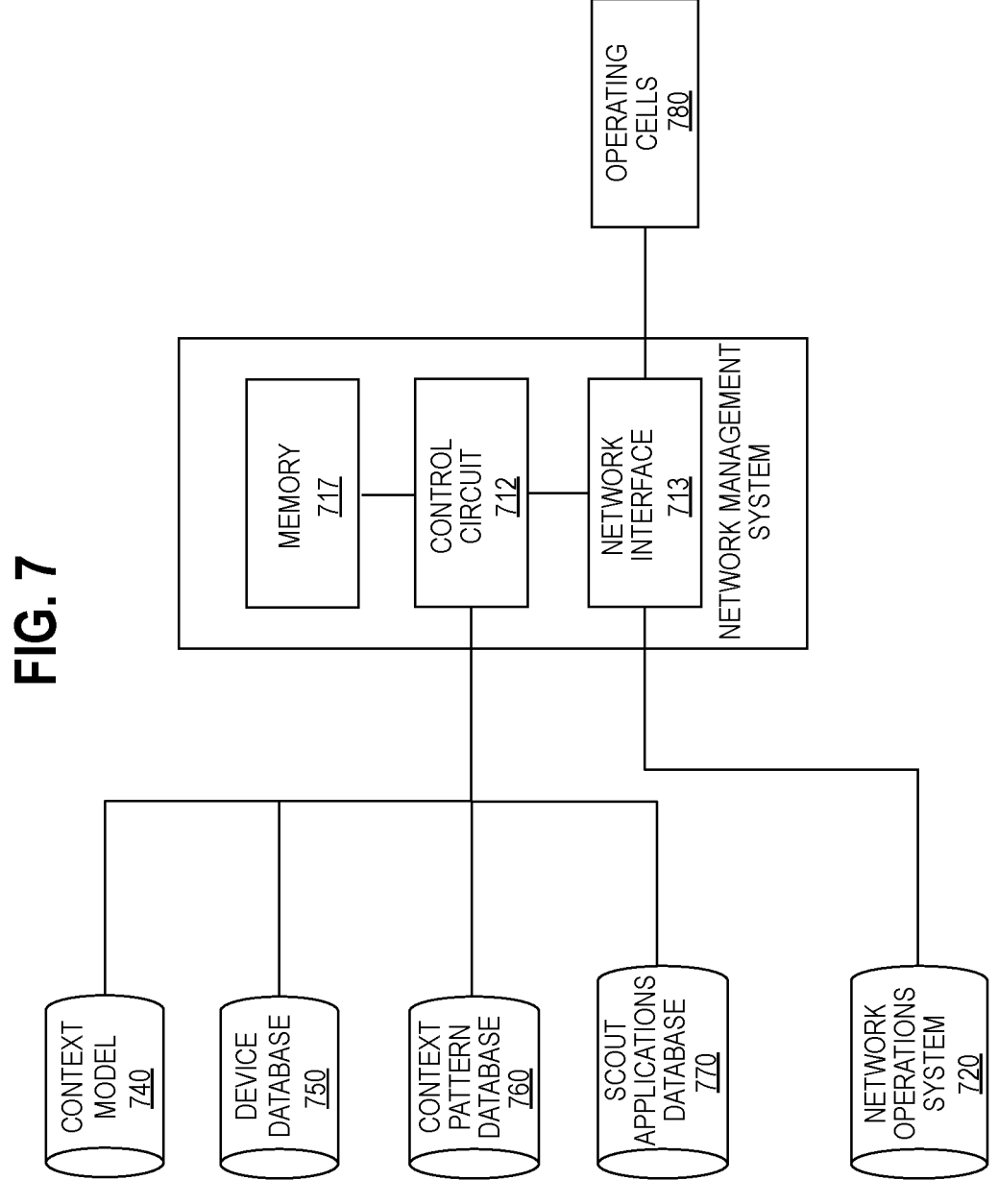
FIG. 7 comprises a block diagram of a network management system in accordance with some embodiments.

Next referring to FIG. 7, a network management system according to some embodiments is shown. The system comprises a network management system 710 accessing a context model 740, a device database 750, a context pattern database, a scout applications database 770, and a network operations system 720. The network management system 710 is further configured to communicate with a plurality of operating cell devices 780.

The network management system 710 comprises a control circuit 712, a memory 717, and a network interface device 713. The control circuit 712 may comprise one or more of a processor, a microprocessor, a central processing unit (CPU), a graphics processing unit (GPU), an application-specific integrated circuit (ASIC), and the like and may be configured to execute computer-readable instructions stored on a computer-readable storage memory 717. The computer-readable storage memory 717 may comprise volatile and/or non-volatile memory and have stored upon it, computer-readable instructions which, when executed by the control circuit 712, causes the control circuit 712 to detect for alert conditions in a network of devices, determine context data based on an ML trained model, determine a formation plan based on the context data, and cause a plurality of scout applications to carry out tasks at operating cells among the network of devices to affect a state of the network. In some embodiments, the network management system 710 may be implemented with a plurality of memory devices and/or processors at a central location or geographically distributed in multiple locations. In some embodiments, the computer-executable instructions may cause the control circuit 712 of the network management system 710 to execute one or more modules described with reference to FIGS. 2-4 herein and/or perform one or more steps described with reference to FIG. 5 herein.

The network interface device 713 may comprise a data port, a wired or wireless network adapter, and the like. In some embodiments, the network interface device 713 may communicate with the operating cell devices 780, and the network operations system 720 via a network such as a local network, a private network, or the Internet. In some embodiments, the network management system 710 may further access one or more of the context model 740, the device database 750, the context pattern database, and the scout applications database 770 via the network interface device 713.

An operating cell device 780 may comprise a processor-based device in the network of devices comprising a control circuit and a memory. The operating cell is generally configured to receive and execute one or more scout applications configured by the network management system 710 to carry out tasks specified by the network management system 710. In some embodiments, the tasks may cause the operating cell device 780 to collect data, send requests/instructions, or change a configuration of another component or subsystem of the network of devices. In some embodiments, the task may cause the operating cell to report collected data or other status information back to the network management system 710. In some embodiments, the task may cause the operating cell to form a federation with other cells and communicate with other operating cells based on roles associated with the executed scout application. In some embodiments, a control circuit executing a scout application stored on a computer-readable memory device may cause the operating cell device 780 to perform one or more steps described with reference to FIG. 6 herein. The network management system 710 is configured to communicate, directly or via another network device, with a plurality of devices in the network that may function as operating cell devices of the network management system 710.

The network operations system 720 may comprise an operations system of the network of devices that aggregate data from various sources and coordinate commands and requests with the network of devices under normal operation. In a power grid, for example, a network operations system 720 may comprise the grid operation data center 110 and enterprise data center 120 described with reference to FIG. 1. In some embodiments, the network operations system 720 may be an existing control system of a device network that the network management system 710 communicates with to provide added capability of automatic reconfiguration of the network of devices in response to alert conditions through tasks executed at operating cells. In some embodiments, the network management system 710 may further communicate with other cloud services or network data sources such as third-party data services for alert detection and context determination.

The context model 740 comprises a pattern recognition model trained based on an ML, learning algorithm such as a neural network algorithm. In some embodiments, the context model is trained using historical signals from devices in the network as input and historical context data as categorization. In some embodiments, the historical context data may be manually inputted, derived from device signals from an earlier or later point of time, or supplied from another data source such as outage reports, news services, etc. The network management system 710 may use the context model to determine context data associated with the current state of the network of devices.

The device database 750 comprises parameters and/or status information associated with the devices in the network. In some embodiments, the device database 750 may store information such as unique identifier, device type identifier, geographic location, IP address, memory capacity, processing capacity, bandwidth capacity, operating system, etc. associated with devices in the device network, including devices that can be used as an operating cell device of the network management system 710. In some embodiments, the network management system 710 may use the information stored in the device database 750 to select devices for executing particular tasks and scout applications. In some embodiments, the network management system 710 may further configure scout applications based on information associated with the device such that the scout applications are suited for execution at the selected devices.

The context pattern database 760 comprises context patterns each associated with a different problem domain. In some embodiments, each context pattern may be associated with one or more vital attributes and associated severity degree that may be matched to context data associated with a current network state. In some embodiments, context patterns may further be associated with a geographic region. In some embodiments, the context pattern may identify a target network state or a response associated with the problem domain. In some embodiments, the network management system 710 may use the context patterns in the context pattern database 760 to determine a formation plan and/or a state machine for affecting the state of the network of devices in response to the problem domain and/or alert condition associated with the context pattern.

The scout applications database 770 comprises scout applications and/or application components (e.g. application DNA). In some embodiments, a scout application may comprise codes for executing one or more tasks based on one or more trigger conditions. In some embodiments, a scout application may be configured based on a role assigned to the application and/or operating cell and the configurations and constraints of the operating cell. In some embodiments, the scout applications database 770 may store previously configured applications and the network management system 710 may retrieve an existing application for deployment at an operating cell based on a formation plan. In some embodiments, the network management system 710 may use the application components in the scout applications database 770 to configure new applications for deployment. In some embodiments, newly formed scout applications may first be tested in a simulation or incubation environment prior to deployment. In some embodiments, successfully simulated or executed scout applications may be stored in the scout applications database 770 for future use. In some embodiments, an operating cell may refer to a secure mission critical operating environment in a defined zone within the grid and may include a plurality of assets and resources. In some embodiments, an operating cell may comprise a microgrid or a substation.

In some embodiments, one or more of the context model 740, the device database 750, the context pattern database 760, and the scout applications database 770 may be implemented on the same one or more memory storage devices.

In some embodiments, one or more of the context model 740, the device database 750, the context pattern database 760, and the scout applications database 770 may be implemented on the memory 717 of the network management system 710 or be accessed through a network by the network management system 710. In some embodiments, one or more of the context model 740, the device database 750, the context pattern database 760, the scout applications database 770, network operations system 720 may be accessed and updated by a plurality of network management system 710, for example, distributed network management systems serving different geographic areas.

Figure 8:
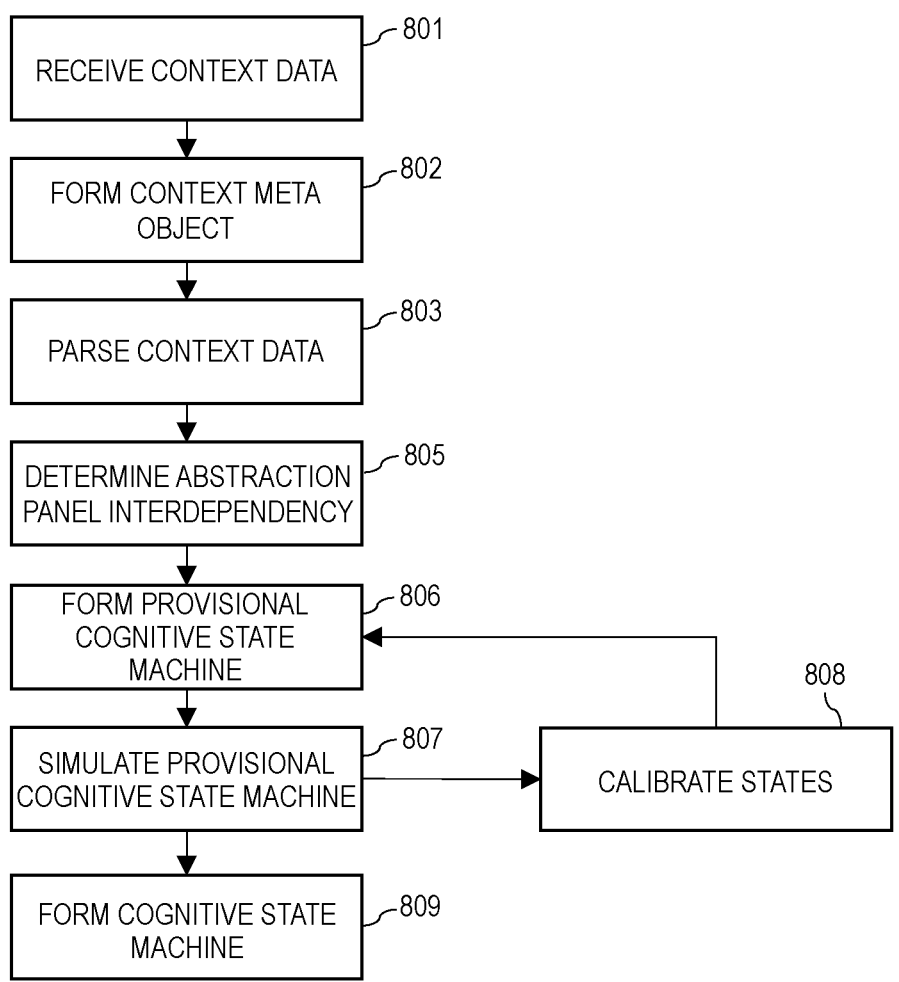
FIG. 8 comprises a block diagram of modules the adaptive grid management system and operating cells in accordance with some embodiments.

Now referring to FIG. 8, a flow diagram of an artificer module according to some embodiments is shown. In some embodiments, one or more steps of FIG. 8 may be performed by a processor-based device or system such as an adaptive grid management system described herein.

In step 801, the artificer module receives context data associated with an alert condition from a decision support module. The context data may be determined by the decision support module based on signals received from a plurality of devices on a network of devices. In step 802 the system forms a context meta object. In some embodiments, the context data comprise a plurality of vital attributes each associated with a severity degree and a time stamp. In some embodiments, the context meta object is determined based on a machine learning model trained on historical context data associated with devices on the network of devices. In some embodiments, the context meta object is determined based on a stress force evaluation module that determines possible underlaying causes based on a deterministic algorithm. In some embodiments, context meta object comprises a plurality of likely contexts ranked based on probability as determined by a machine learning model.

In step 803, the system determines a plurality of context abstraction panel based on parsing the context meta object into a plurality of context groups and assigning an abstraction problem domain to each context group based on a machine learning algorithm. In some embodiments, a contextual abstraction panel comprises panel positioning, operation classification, functional composition, and/or a severity index.

In step 805, the system determines the interdependency of one or more abstraction panels based on a machine learning model trained on contextual historical archive database, wherein the context meta object further comprises composite abstraction panel data with an associated relevancy index. In step 806, the system forms a provisional cognitive state machine and validates the provisional cognitive state machine with a simulation engine in step 807. Based on the result of the validation, one or more states of the provisional cognitive state machine may be calibrated in step 808. In step 809, the systems form a cognitive state machine based on the context meta object for execution by a cognitive state machine operator to affect operations of one or more devices on the network via the network adapter, the cognitive state machine comprises a plurality of states each defining at least a task for execution by at least one network device. In some embodiments, the cognitive state machine defines a number of states, initial states, trigger conditions for each state, a final state with corresponding performance index, and recalibration conditions for one or more states.

Now referring to FIGS. 9A, 9B, 10A, 10B, and 11, flow diagrams according to some embodiments are shown. In some embodiments, one or more steps of FIGS. 9A, 9B, 10A, 10B, and 11 may be performed by a processor-based device or system such as an adaptive grid management system described herein. The variables and abbreviations in the figures represent the following:

for-ID—frame of reference-ID $va_n$—Vital attributes ($va_{1\ to\ n}$)

$sd_n$—severity degree ($sd_{1,\ n}$)

$t_i$—time of recording of event ga—grid artificer ga-authenticationkey—grid artificer authentication key ca—context abstraction $ca\text{-}id_{1,n}$—context abstraction ID (1-to-n)

apd—abstraction problem domain $apd\text{-}id_n$—abstraction problem domain ID (1,n)

$C_n$—$context_{1,n}$ pd—panel domain hn—historical pattern $sc_{n,n}$—sub context (1, n)

$for\text{-}id_{h(1,n)}$—series if historical for-id (1,n) with similar context/variation in relation of for-id ppn—panel positioning in relation to other panels oc—operational classification associated to panel $fc_n$—function composition $pad_n$—panel abstraction domain $ri_{1,n}$—relevancy index Ccap—Composite contextual abstraction panel $s_n$—state (1,n)

$a_n$—action (1,n)

$t_n$—transition

Figure 9A:
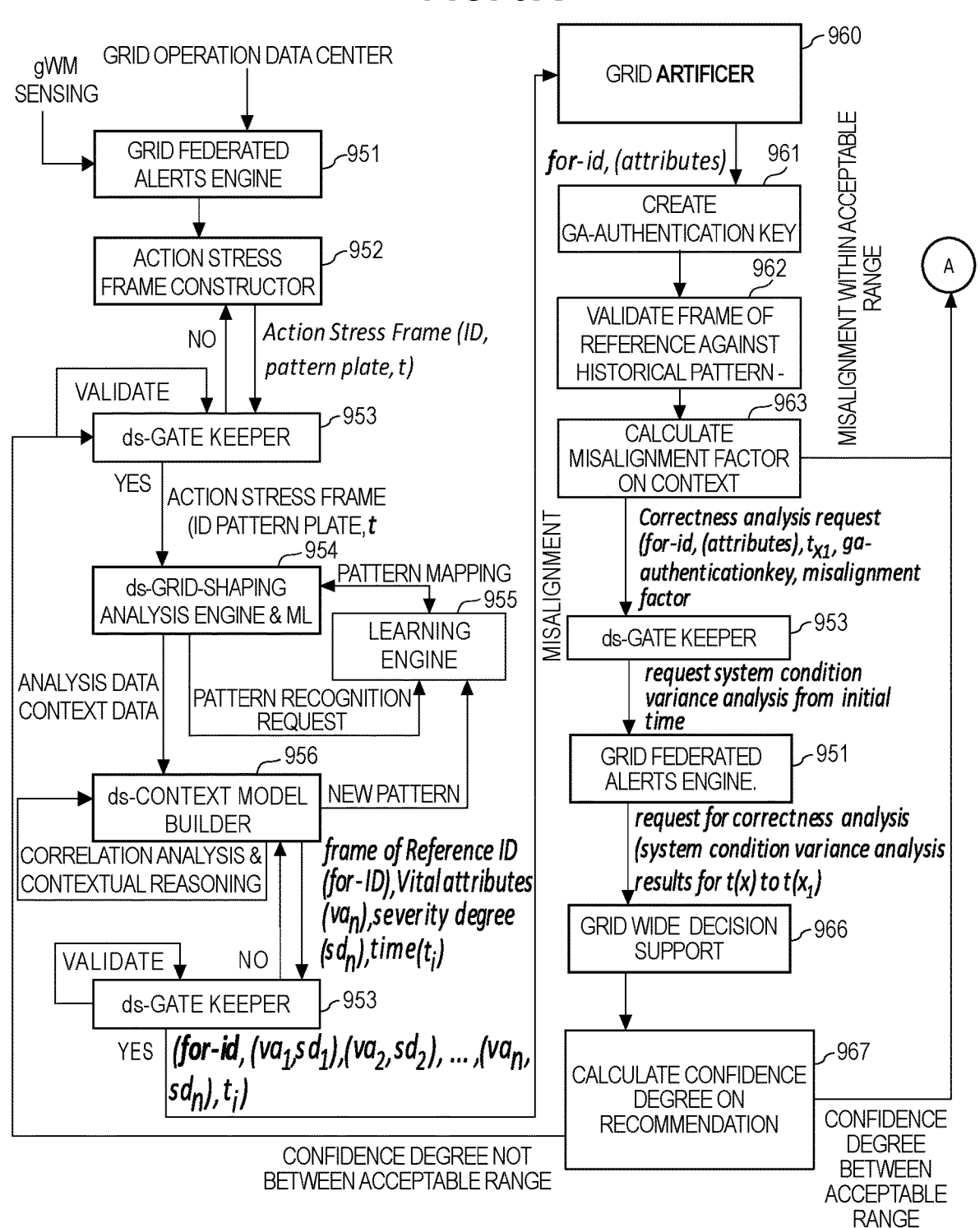
FIGS. 9A, 9B, 10A, 10B, and 11 comprises flow diagrams of modules of a network management system in accordance with some embodiments.
Figure 9B:
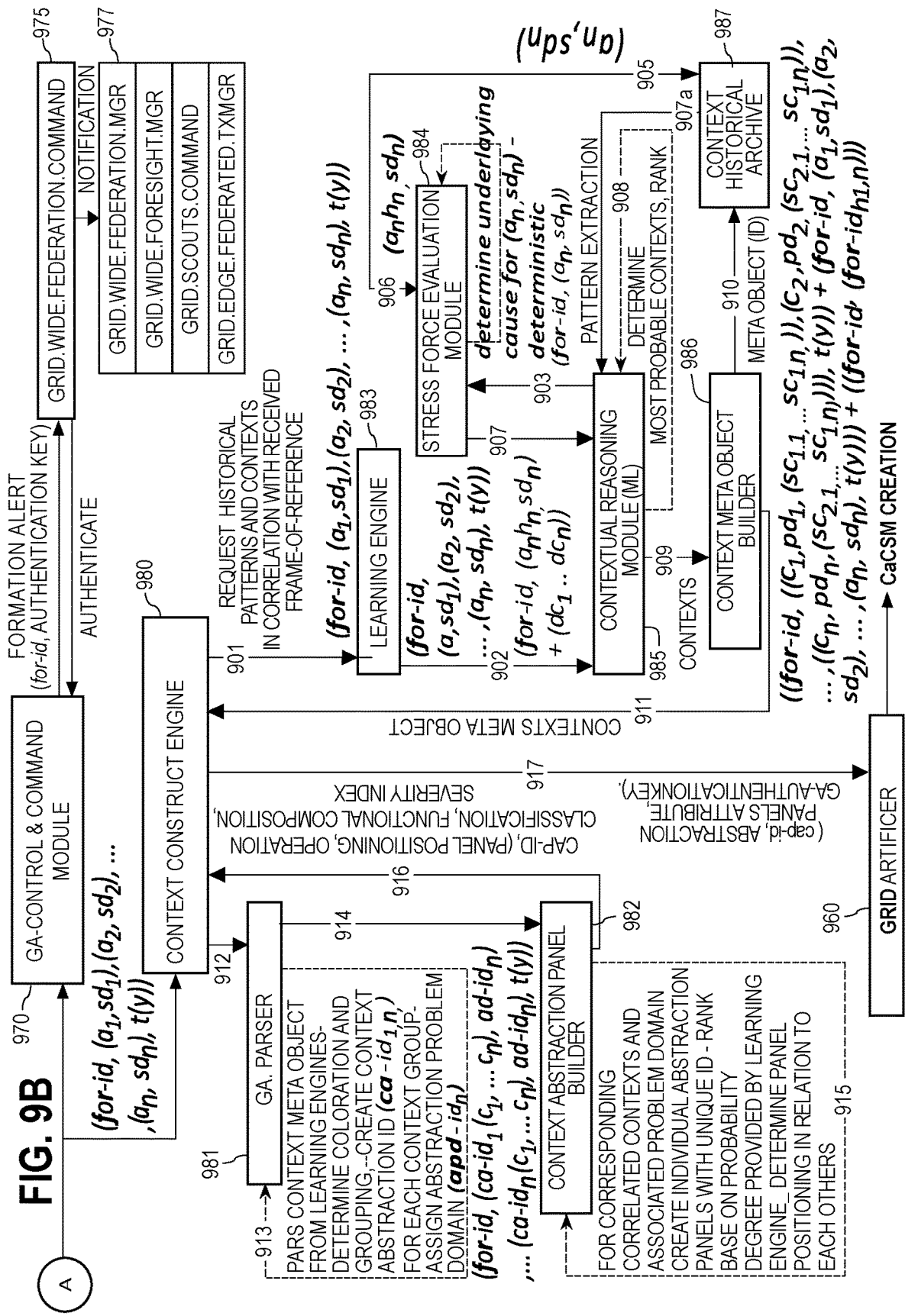

Sf (1,0)—self forming (1=on, 0=off)—state with self-forming $CaCSM_{bp}$—Contextual and Cognitive State Machine—base production $CaCSM_p$—Contextual and Cognitive State Machine—provisional Now referring to FIGS. 9A and 9B, a pre-formation workflow is shown. The grid federated alerts engine 951 detects for alert conditions based on data from a grid operation data center and a grid-wide-mind sensing system. An action stress frame constructor 952 then constructs an action stress frame (including an action stress frame ID, pattern plate, and time (t)) based on the network device data associated with the detected alert. The action stress frame is passed to a decision support (ds) gatekeeper 953 for validation. If the action stress frame passes validation, the action stress frame is passed to a ds grid shaping analysis and machine learning module 954. The ds grid shaping analysis and machine learning module 954 sends a pattern recognition request to a learning engine 955 trained on historical action stress frame data. The learning engine 955 is configured to output a pattern mapping to the ds grid shaping analysis engine and machine learning module 954 in response to the pattern recognition request. The ds grid shaping analysis engine and machine learning module 954 then provides the analysis data and context data to a ds context model builder 956. The ds context model builder 956 applies correlation analysis and contextual reasoning to the data received from the ds grid-shaping analysis engine and machine learning module 954 to determine context or frame of reference information, including a frame of reference ID (for-ID), vital attributes ($va_n$), severity degrees ($sd_n$), and time ($t_n$). The frame of reference data is passed to a ds gatekeeper 953 for validation. If the frame of reference information passes validation, the frame of reference data (e.g. for-id, $(va_1,sd_1)(va_2, sd_2)$, . . . $(va_n, sd_n)$, ti) are passed to a grid artificer module 960. In some embodiments, the grid artificer module 960 may comprise one or more of the grid artificer modules 210, 315, and 432 described herein.

In step 961, the grid artificer module 960 creates a grid artificer (ga) authentication key. In step 962, the grid artificer module 960 validates the frame of reference data against historical patterns. In step 963, the grid artificer module 960 calculates a misalignment factor on the context. If the misalignment is within an acceptable range (e.g. predetermined threshold), the output of the grid artificer module 960 is passed to a ga-control and command module 970 and a context construct engine 980. If misalignment exceeding a threshold is detected, a correctness analysis request is generated and sent to the ds gatekeeper 953, the correctness analysis request includes for-id, (attributes), $tx_1$, ga authentication key, and misalignment factor. The ds gatekeeper 953 then sends a request for system condition variance analysis from an initial time to the grid federated alerts engine 951 which in turn sends a request for correctness analysis including system condition variance analysis results for t(x) to t(x1) to the grid-wide decision support module 966. In step 966A, the system then calculates a confidence degree on the recommendation. If the confidence degree is not within an acceptable range (e.g. below a predetermined threshold), the process returns to ds gatekeeper 953 for validation. If the confidence degree is in an acceptable range (e.g. exceeds a predetermined threshold) the output of the grid artificer module 960 is passed to a ga-control and command module 970 and a context construct engine 980.

The ga control and command module 970 receives the output of the grid artificer module 960 (e.g. (for-id, $(a_1,sd_1)$ $(a_2, sd_2)$, . . . $(a_n, sd_n)$, t(y)) and sends a formation alert (for-id, authentication key) to a. In some embodiments, the grid-wide federation command module 975 may comprise one or more of the federation command module 230, 344, and 436. The federation command module 975 authenticates the information then sends a notification to the grid-wide federation manager, the grid-wide foresight manager, the grid scouts command, and the grid edge federated transaction manager 977.

The output of the grid artificer module 960 (e.g. (for-id, $(a_1,sd_1)(a_2, sd_2)$, . . . $(a_n, sd_n)$, t(y)) is also provide to a context construct engine 980. In some embodiments, the context construct engine 980 may comprise the context construct engine 211. In step 901, the context construct engine 980 sends a request for historical patterns and contexts in correlation with received frame of reference data (e.g. (for-id, $(a_1,sd_1)(a_2, sd_2)$, . . . $(a_n, sd_n)$, t(y))) to a learning engine 983. In step 902, the frame of reference data ((for-id, $(a_1,sd_1)(a_2, sd_2)$, . . . $(a_n, sd_n)$, t(y)) is sent to a contextual reasoning module 985 which utilizes machine learning. In step 903, for-id, $(a_n, sd_n)$ is sent to the stress force evaluation module 984 which, in step 904, determines underlaying cause for $(a_n,sd_n)$ based on a deterministic algorithm. In step 905, $(a_n,sd_n)$ is sent to the context historical archive 987 which provides $(a_n h_n, sd_n)$ in return in step 906. The stress force evaluation module 984 then provides (for-id, $(a_n h_n, sd_n)$+(dc$_1$ . . . dc$_n$)) to the contextual reasoning module 985 in step 907. The context historical archive 987 also provides pattern extraction to the contextual reasoning module 985 in step 907a. In step 908, the contextual reasoning module determines the most probable context and rank. In step 909, the contextual reasoning module 985 then output the contexts to the context meta object builder 986 which sends a context meta object ((for-id, $((c_1,pd_1, (sc_{1.1}, . . . sc_{1.n},))(c_2, pd_2, (sc_{2.1}, . . . sc_{1.n},))$, . . . , $((c_n, pd_n (sc_{2.1}, . . . sc_{1,n}))))$, t(y))+(for-id, $(a_1,sd_1)(a_2, sd_2)$, . . . $(a_n, sd_n)$, t(y)))+((for-id, $(for\text{-}id_{h1,n})))$ to the context construct engine 980 in step 911. The meta object (id) is also stored into the context historical archive 987 in step 910 for model training.

In step 912, the output of the grid artificer module 960 is sent to a grid artificer parser 981 which, in step 913, pars context meta object from the learning engine(s), determines coloration and grouping, creates context abstraction ID $(ca\text{-}id_{1,n})$ for each context group, and assigns abstraction problem domain ID $(apd\text{-}id_n)$. In step 914, the parsed data $((\text{for-id}, (ca\text{-}id_1\ (c_1,\ \ldots\ c_n), ad\text{-}id_n),\ \ldots\ (ca\text{-}id_n\ (c_1,\ \ldots\ c_n), ad\text{-}id_n), t(y))$ is passed to a context abstraction panel builder 982 which, for corresponding correlated contexts and associated problem domain, creates individual abstraction panels with unique ID, ranks the abstraction panels based on probability degree provided by learning engine, and determines panel positioning in relation to each other in step 915. In step 916, the context abstraction panel builder 982 then passes context abstraction panel data (e.g. cap-id, (panel positioning, operation classification, functional composition, severity index) to the context construct engine 980. In step 917, the cap-id, abstraction panels attribute, and ga-authentication key are sent from the context construct engine 980 to the grid artificer module 960 for CaCSM creation.

Figure 10A:
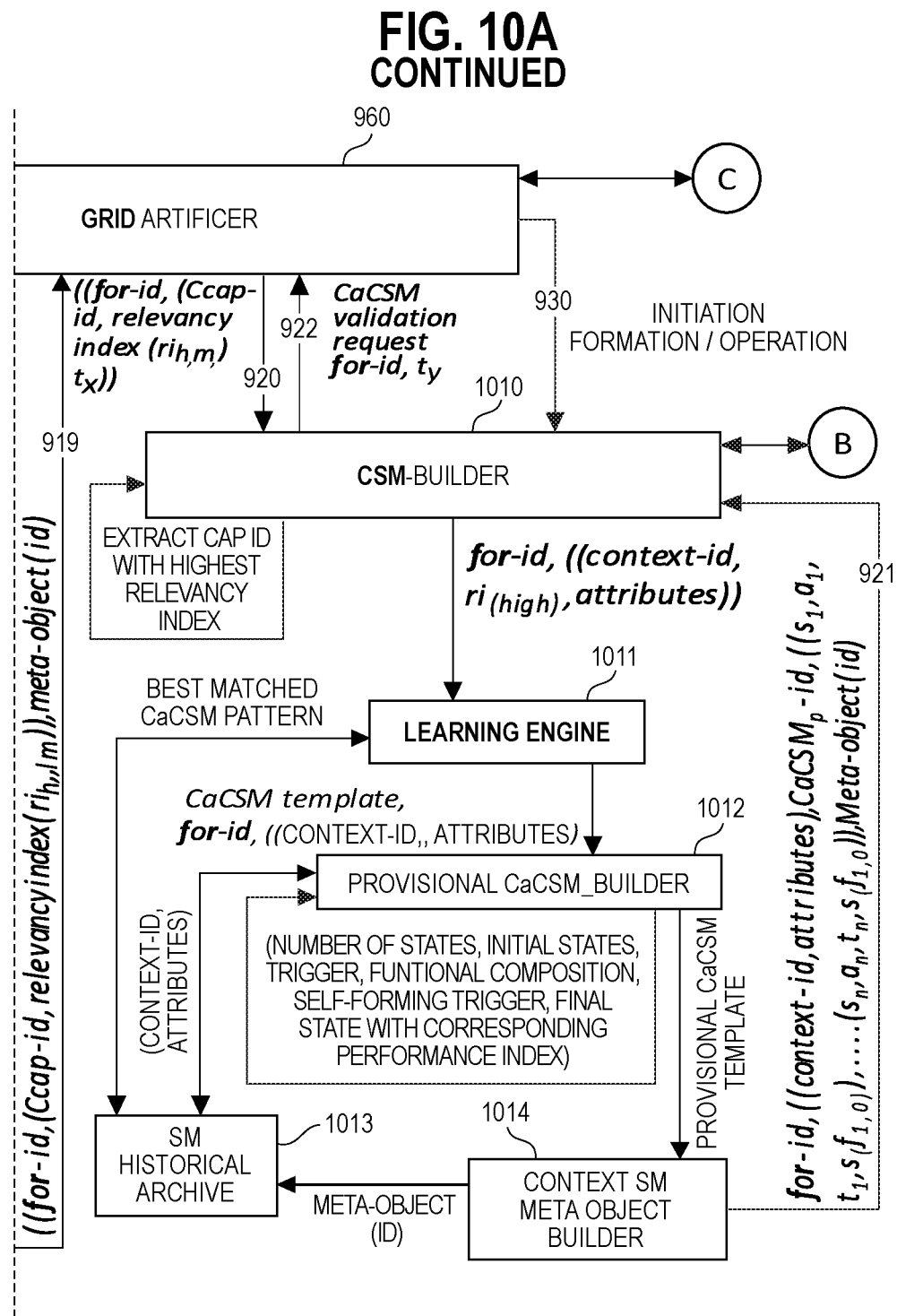
Figure 10B:
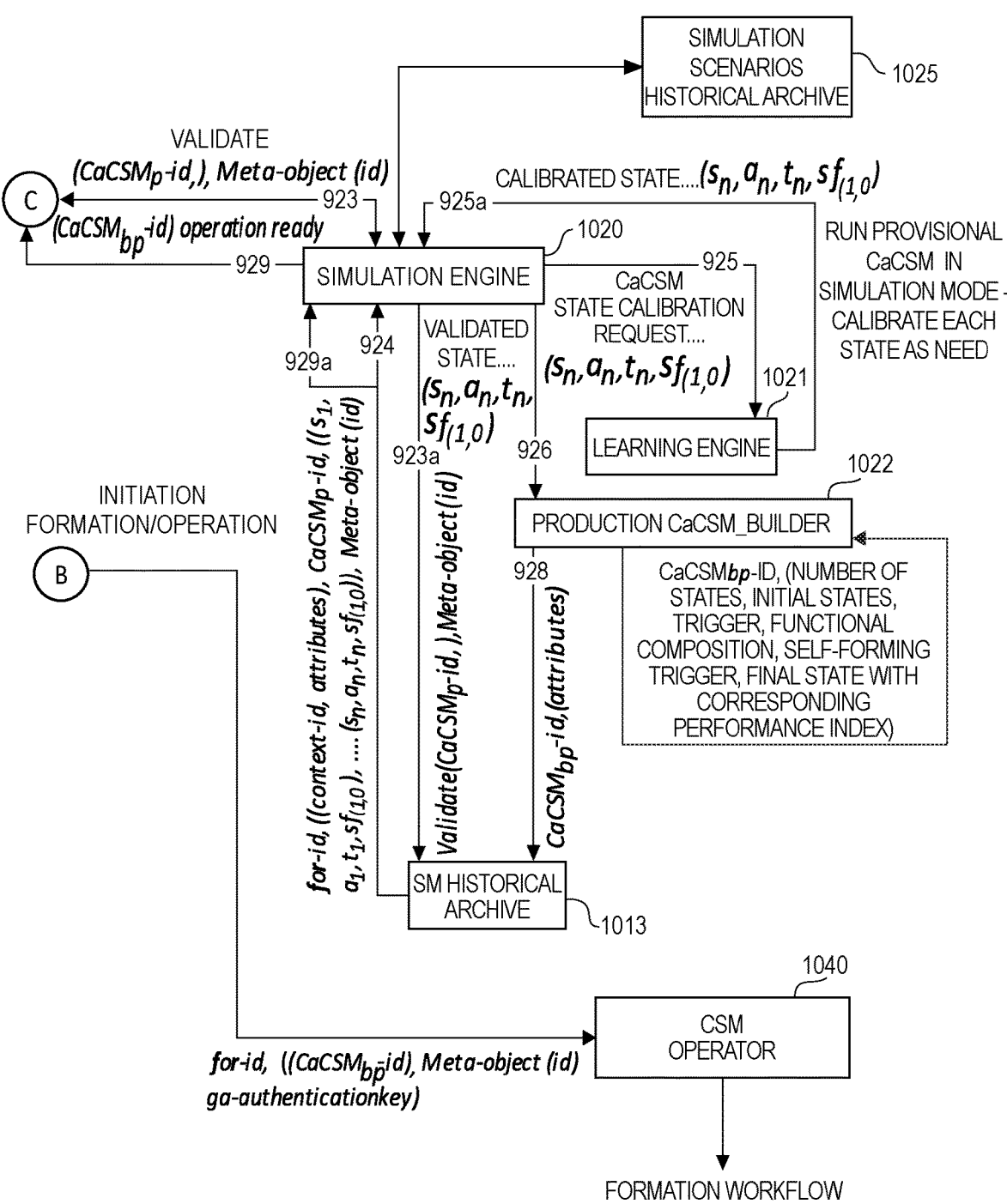

Now referring to FIGS. 10A and 10B, CaCSM creation stage of a formation workflow is shown. In step 917, the context construct engine 980 initiates CaCSM creation by sending for-id, $(cap\text{-}id_{1,n},$ (panel-positioning$(pp_n,)$, operation-classification $(oc_n)$, functional-composition $(fc_n)$, severity-degree $(sd_n)$, $pad_n$), ga-authenticationkey) to the grid artificer module 960. In step 917a, the ga gatekeeper 1003 authenticates (ga-authenticationkey). In step 917b, if the authentication is rejected, a rejection with cap-id, ga-authenticationkey are sent back to the context construct engine 980. If the authentication is accepted, the ga gatekeeper notifies the grid artificer module 960 in step 917c.

In step 918, the grid artificer module 960 establishes an abstraction panel (AP) interdependency based on an AP interdependency analyzer 1004 which maps abstraction panels, and associated context, determine level of contextual interdependency and associated index between abstraction panels. The $cap\text{-}id_{1,n}$, $((pp_n,)\ (oc_n)\ (fc_n)\ (sd_n), pad_n)$, and metaobject(id) outputted by the AP interdependency analyzer 1004 are sent to a ds correlator engine 1005 that verifies the relevancy of the correlation. The information are then sent to a learning engine 965 trained on data from context historical archive 987 to output contextual abstraction panel (cap) with high dependency $(cap\text{-}id_{1,n}$, relevancy index $(ri_{1,n}))$, metaobject(id)) to a composite cap builder 969. The composite cap builder 969 outputs composite-cap—(Ccap-id) and relevancy ind-x—$(rl_{h,m,i})$ to a context meta object builder 986 that builds meta objects (e.g. $((\text{for-id}, ((c_1,pd_1, (sc_{1.1},\ \ldots\ sc_{1,n}))(c_2,\ pd_2,\ (sc_{2.1},\ \ldots\ sc_{1,n})),\ \ldots,\ ((c_n, (sc_{2.1},\ \ldots\ sc_{1,n})), pd_n)), t(y))+(\text{for-id},\ (a_1, sd_1)(a_2,\ sd_2),\ \ldots\ (a_n,\ sd_n), t(y)))+((\text{for-id}, (\text{for-id}_{h1,n})))+$ composite-cap (Ccap-id, relevancy index $(ri_{h,m,i})$) and sends $((\text{for-id}, (\text{Ccap-id}, \text{relevancy index}\ (ri_{h,m,i})), \text{meta-object(id)}$ to the grid artificer module 960 in step 919.

In step 920, $((\text{for-id}, (\text{Ccap-id}, \text{relevancy index}\ (ri_{h,m,}\ tx))$ is passed to the CSM builder 1010 which extract cap id with highest relevancy index and forwards for-id, $((\text{context-id}, ri_{(high)}, \text{attributes}))$ to a learning engine 1011. In some embodiments, the CSM builder 1010 may comprise the CSM builder 214. The learning engine 1011 determines the best matched CaCSM pattern from the state machine historical archive 1013 and sends CaCSM template and for-id, $((\text{context-id}, \text{attributes})$ to a provisional CaCSM builder 1012 which determines parameters of the state machine such as the number of states, initial states, triggers, functional compositions, self-forming triggers, and final states with corresponding performance index based on the context ID and attributes stored in the state machine historical archive 1013. The provisional CaCSM template is then sent to the context state machine meta object builder 1014 and the meta object ID is stored into the state machine historical archive 1013 for use in training the learning engine 1011.

In step 921, the context state machine meta object builder 1014 sends for-id, $((\text{context-id}, \text{attributes})$, CaCSMp-id, $((s_1, a_1, t_1, sf_{(1,0)}),\ \ldots\ (s_n, a_n, t_n, sf_{(1,0)})$, Meta-object (id) to the CSM builder 1010. In step 922, the CSM builder 1010 sends a CaCSM validation request with for-id and $t_y$ to the grid artificer module 960 which sends Validate (CaCSM$_p$-id,), Meta-object (id) to the simulation engine 1020 in step 923. In some embodiments, the simulation engine 1020 may comprise the simulation engine 204. Simulation scenarios may be stored and retrieved from the simulation scenarios historical archive 1025. In step 923a, the simulation engine forwards Validate (CaCSMp-id,), Meta-object (id) to the SM historical archive 1013 as query. In step 924, for-id, $((\text{context-id}, \text{attributes})$, CaCSMp-id, $((s_1, a_1, t_1, sf_{(1,0)}),\ \ldots\ (s_n, a_n, t_n, sf_{(1,0)})$, Meta-object (id), are retrieved from the state machine historical archive 1013. In step 925, a CaCSM state calibration request including $(s_n, a_n, t_n, sf_{(1,0)})$ are sent to a learning engine 1021 and, in step 925a, calibrated state $(s_n, a_n, t_n, sf(1,0))$ are sent back to the simulation engine 204 to run the provisional CaCSM in simulation mode and calibrate each state as needed. In step 926, the simulation engine 1020 validates the states $(s_n, a_n, t_n, sf_{(1,0)})$ and forward the validated states to a production CaCSM builder 1022, which is configured to build, for each CaCSM$_{bp}$-ID, number of states, initial states, trigger, functional composition, self-forming trigger, and final state with corresponding performance index in step 927. In step 928, CaCSM$_{bp}$-id, (attributes) are stored in the state machine historical archive 1013. In step 929a, the calibrated for-id, $((\text{context-id}, \text{attributes})$, CaCSMp-id, $((s_1, a_1, t_1, sf_{(1,0)}),\ \ldots\ (s_n, a_n, t_n, sf_{(1,0)})$, Meta-object (id) are provided to the simulation engine 1020. In some embodiments, the simulation and calibration steps may be repeated on the provisional CaCSM. In step 929, the simulation engine 1020 sends a operation-ready notification with (CaCSM$_p$-id,) and Meta-object (id) to the grid artificer module 960. In step 930, the grid artificer module 960 signals the CSM builder 1010 for initiation of formation and operation. The initiation of formation and operation, including for-id, ((CaCSM$_{bp}$-id), Meta-object (id), ga-authenticationkey) are sent to a CSM operator 1040 to begin the operation stage of the formation workflow.

Figure 11:
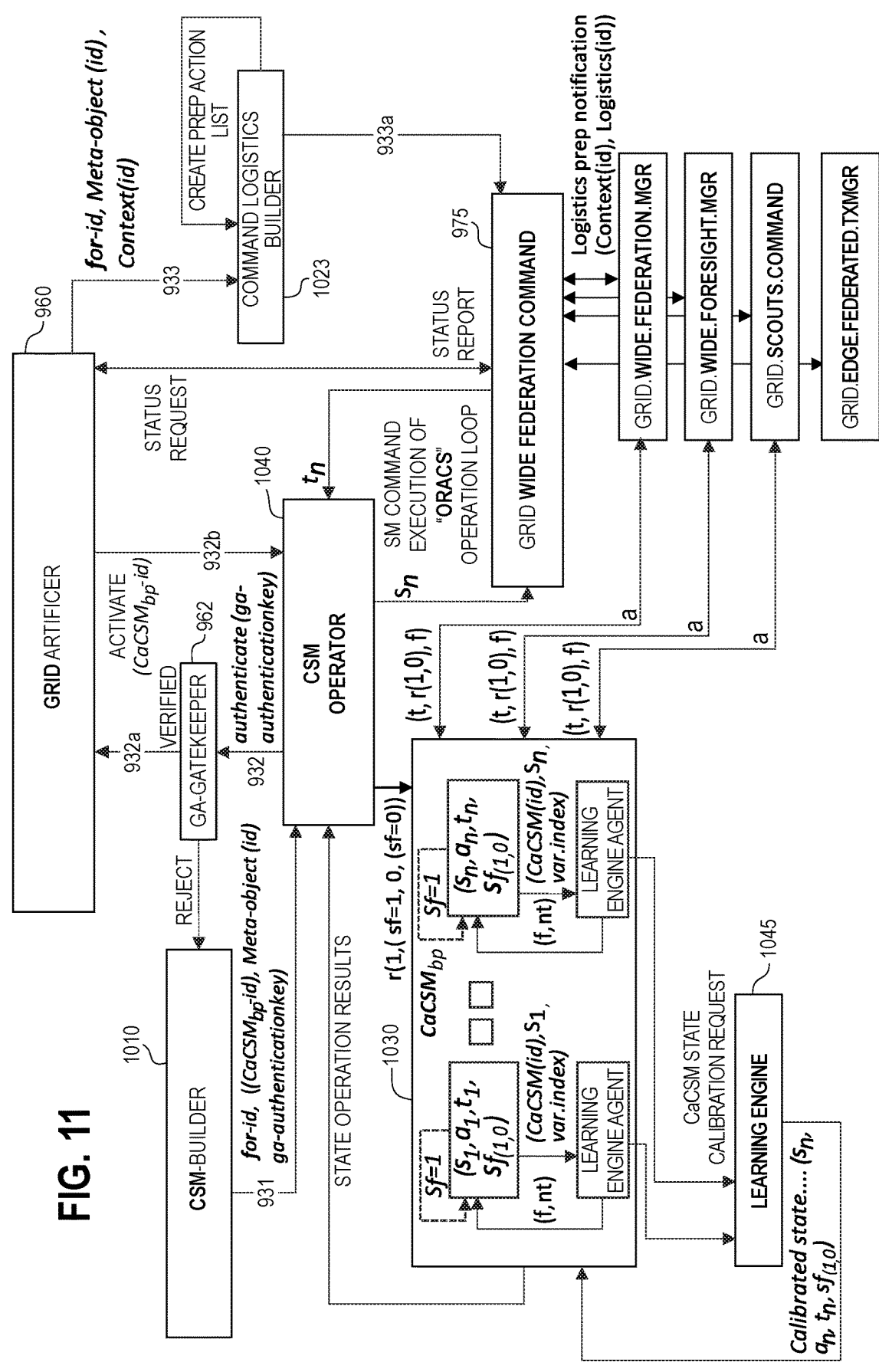

Now referring to FIG. 11 an operation stage of a formation workflow is shown. In step 931, the CSM builder 1010 sends for-id, ((CaCSM$_{bp}$-id), Meta-object (id), ga-authentication key) to a CSM operator 1040. In step 932, the CSM operator 1040 sends an authentication request (ga-authentication key) to a ga gatekeeper 1003 for verification. Verified for-ids are forward to the grid artificer module 960 in step 932A and rejected for-ids are sent back to the CSM builder 1010. In step 932B, the grid artificer module 960 activates CaCSM$_{bp}$-id and sends the data to the CSM operator 1040. In step 933, the grid artificer also sends for-id, Meta-object (id), Context(id) to a command logistic builder 1023 which creates a preparation action list and sends command logistic data to the grid-wide federation command module 975 in step 934.

The CaCSM 1030 receives r(1(sf=1, 0, (sf=0)) from the CSM operator and outputs the corresponding (t, r(1,0), f) in each state to the grid-wide federation manager, foresight manager, scouts command, and/or edge federated task manager. The CaCSM 1030 is further configured to send a CaCSM state calibration request to a learning engine 1045 to calibrate states ($s_n$, $a_n$, $t_n$, $sf_{(1,0)}$). The CaCSM 1030 also provides state operation results back to the CSM operator 1040.

The grid-wide federation command module 975 is configured to communicate with the CSM operator 1040 to perform state machine command executions in an operation loop. The grid-wide federation command module 975 communicates with the grid-wide federation manager, foresight manager, scouts command, and edge federate task manager based on logistics preparation notification (Context(id), Logistics(id)). The grid-wide federation command module 975 is further configured to communicate with the grid artificer module 960 to respond to status requests with status reports as a state machine is executed.

Now referring to FIGS. 12-19, flow diagrams according to some embodiments are shown. In some embodiments, one or more steps of FIGS. 12-19 may be performed by one or more modules of a processor-based device or system such as an adaptive grid management system described herein. The variables and abbreviations in the figures represent the following:

cApps($id_{1,n}$)—Computing Apps
sApps($id_{1,n}$)—Security Apps
cAsset($id_{1,n}$)—comms asset
sAsset—soft asset
Oz(id)—operation zone
gWFCll(id)—gridWideFederationCommandLogistic list
hAsset($id_{1,n}$)—hard assets
CaCSMp—CaCSM provisional
Sfvr—Situational.Frame.view.request
fl—frame level
gWF-DA&P—gWF Data Acquisition & Processing
gWFC—grid-wide Federation Command
gweye—gridwideeye
LP(id)—Scouts Launch Plan (id)
gwfm.MO—grid-wide federation mgr. Meta Object
at.p—Alert type.prep notification
cll-id—command logistic list
ga—grid apparatus
ied—intelligent electronic device
cr—computing resource
sr—security resource
ra—radio
sen—sensing
der—distributed energy resource
pv—solar
es—energy storage
ri—risk index
ev—electric vehicle
OS—operating system
gwapd—grid-wide Asset profile database
ca—critical attributes
gWFCll(id)$_p$—gridWideFederationCommand Logistics List$_{provisional}$
gWFClf(id)$_p$—gridWideFederationCommand Logistics File$_{provisional}$
gWFCllTemplate(id)—gridWideFederationCommand template
or—operation ready
Clf—context logistic file
cT—contextType
if—logistic file
ver—version
mo—model
aa—asset attributes
ac—asset class
ca—critical attributes ga—grid asset
ied—intelligent electronic device
cr—computing resource
sr—security resource
ra—radio
sen—sensing
der—distributed energy resource
pv—solar
es—energy storage
ev—electric vehicle
os—operating system
hw—Hardware
uf—utilization factor
af—asset function
aft—asset function type
$aft_{m\&d}$—monitoring & diagnostics
$aft_{apm}$—asst performance mgmt.
$aft_{ana}$—analytics
$aft_s$—security
$aft_{comp}$—computing
$aft_{comm}$—communication
$aft_{aa}$—adaptation
$aft_{con}$—control
$aft_{aa}$—adaptation
$aft_{avm}$—device mgmt.
$aft_{opt}$—optimization
$aft_{atw}$—digital twin
amn—asset model #
avn—asset version #
ol—operation loop
ol(fid)—operation loop federation id
oft—operation formation type
$oft.ioc_{cc}$—independent operating cell—supporting central command
$oft.ioc_{sc}$—independent operating cell autonomous
$oft.ioc_{coc}$—operating cell—member of coop neighboring cells
ahi—asset health index
$oft.ioc_{fm}$—operating cell member of sub federation
$oft.ioc_f$—sub federation operating cell
$Op.l_{h,m,l}$—operativity level (high, medium, low)
cor—correlation %
Oint—ORACS resource interdependency
ORACS—Observability, Reachability, Adaptability, Controllability, Security
Oc-Meta-object—oracs construct meta object
iO-DNA.Mf—inter-ORACS DNA map file
iO-DNA.Mf.g—int er-oracs DNA map file—gaps
iOC—inter ORACS Context
DNA.role($s_c$, $s_m$, $s_i$, $s_g$)—scout role(Coordinator, messenger, inspector, guard)
re-gen ($s_{col}$, $s_{sf}$)—cloning, self-forming
PoVf.id—point of view frame id
UI/UX—User Interface/User Experience
TXmgr—Transaction Manager
scouts.roster(id)$_h$—scouts.roster(id)$_{host}$
scouts.roster(id)$_p$—scouts.roster(id)$_{participants}$
PoVf.id—Point of View frame.id In FIG. 12, the grid artificer module 960 sends a preparation alert to the grid-wide federation command module 975 in step 933A, the alert includes for-id, Meta-object (id), Context(id), and ga-authenticationkey. In step 933B, the grid-wide federation command module 975 requests for authentication by sending ga-authenticationkey to the ga gatekeeper 960A. The grid artificer module 960 is configured to notify the grid artificer module 960 of rejected authentication attempts in step 933C and notify the grid-wide federation command module 975 of verified successful authentication in step 933D. In step 933E, the grid-wide federation command module 975 sends a request to a grid-wide logistician module 1023A, the request including for-id, Meta-object (id), Context(id), and gWFClogistic-request(id). In some embodiments, steps 933A-F of FIG. 12 corresponds to step 933 in FIG. 11.

In step 933F, the grid-wide logistician module 1023A sends a logistics list to the command logistic builder 1023, the logistics list identifying cll-id for for-(id). Generally, a logistic list includes an initial list of potential resources that may be needed. In step 945B, the grid-wide logistician module 1023A sends logistic list (id), for-(id) for-id, request-id, gWFClf(id)p to the grid-wide federation command module 975 which is configured to prepare alerts for the grid-wide federal manager 1210, grid-wide foresight manager 1220, grid-wide scouts command 1230, and federated trans-action manager 1240. In some embodiments, step 945B corresponds to step 934 in FIG. 11. In steps 935A, 935B, 935C, and 935D, an alert including for-id, alert (at.p), and ga-authenticationkey are provided to the grid-wide federal manager 1210, the grid-wide foresight manager 1220, and the grid-wide scouts command 1230, and grid edge feder-ated transaction manager 1240. The transaction manager 1240 is configured to manage the federated database to ensure data correctness and referential integrity across a federation.

Figure 13A:
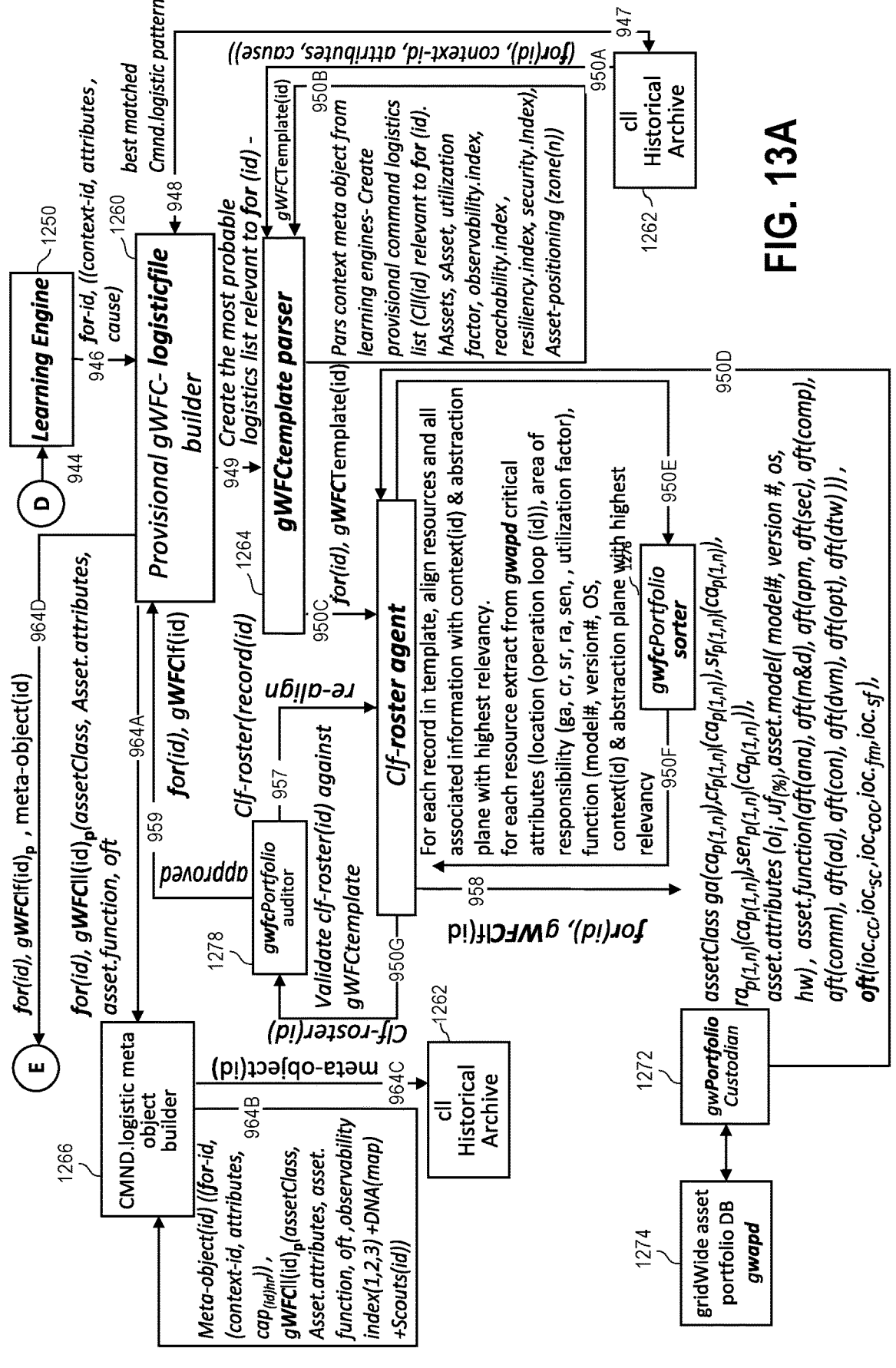

In step 941, the command logistic builder 1023 extracts context and sends Meta-object (id) and Context(id) to a context meta-object extractor 1023B, which parses the con-text historical archive 987 for-id, Meta-object (id), Context (id) to extract context attributes associated with id from the meta-object and extract most relevant causes in steps 942 and 943. In step 944, a request for logistic lists of similar context (context(id), cause, attributes) is sent to a learning engine 1250 as shown in FIG. 13A. The learning engine 1250 may be trained on historical contexts and logistic lists.

In FIG. 13A, the learning engine 1250 sends for-id, ((context-id, attributes, cause) to a provisional logistic file builder 1260 in step 946. The provisional logistic file builder 1260 forwards (for(id), context-id, attributes, cause)) to a command logistics list historical archive 1262 in step 947 to receive a best matched Command logistic pattern in step 948. In step 949, the provisional logistic file builder 1260 creates the most probably logistics list relevant to the frame of reference ID based on the best-matched command logistic pattern and, in step 949, sends the probably logistic list to a template parser 1264. The template parser 1264 retrieves gWFClfTemplate(id) from the historical archive 1262 in step 950A and pars context meta object from learning engines to create a provisional command logistics file Tem-plate(id) relevant to for (id), including hAssets, sAsset, utilization factor, observability. index, reachability.index, resiliency.index, security.Index, and Asset-positioning (zone (n)) in step 950B. In step 950C, for(id) and gWFCTemplate (id) are forwarded to a context logistics file roster agent 1270. Generally, a logistics file includes required resources relevant to for (id) and includes all the attributes and resource characteristics that is needed to form the ORACS operation loop. As used herein, ORACS or oracs may be used as a short hand to refer to an ORACS operation loop. In some embodiments, a ORACS operation loop refers to an operation cell with a series of built-in capability including the ability to observe, reach, adapt, control, and secure. An operation loop has observability when there is complete observability of all assets within the operation loop. An operation loop has reachability when all the assets are reachable through secure communication to operate on command. An operation loop has dynamic adaptability when assets in the operation loop may be precured from an ecosystem of vendors at different time and assets commands can be dynamically adapted for assets communicating with different languages and protocols. An operation loop has controllability when assets in the operation loop can be controlled to, for example, turn on, turn off, dispatch, disable, demise, etc. An operation loop is secure when communication, control, and admin functions within the loop are secure.

In step 958, the context logistics file roster agent 1270 sends for(id) and gWFClf(id) to a portfolio custodian 1272 which uses information stored in an asset portfolio database 1274 to generate asset classes, attributes, and functions for the frame of reference, including assetClass ga($ca_{p(1,n)}$), $cr_{p(1,n)}(ca_{p(1,n)})$, $sr_{p(1,n)}(ca_{p(1,n)})$, $ra_{p(1,n)}(ca_{p(1,n)})$, $sen_{p(1,n)}$ ($ca_{p(1,n)}$)), asset.attributes ($oh_i$,$uf_{(\%)}$,asset.model(model #, version #, os, hw), asset.function(aft(ana), aft(m&d), aft (apm, aft(sec), aft(comp), aft(comm), aft(ad), aft(con), aft (dvm), aft(opt), aft(dtw))), oft($ioc._{cc}$,$ioc._{sc}$,$ioc._{coc}$,$ioc._{fm}$,i-oc.$_{sf}$) in step 950D. In steps 950E and 950F, the context logistics file roster agent 1270 uses a portfolio sorter 1276 to align resources and all associated information with context (id) and abstraction plane with the highest relevancy for each record in the template and for each resource extract from gwapd critical attributes (location (operation loop (id)), area of responsibility (ga, cr, sr, ra, sen, utilization factor), function (model #, version #, OS, context(id), and abstrac-tion plane with highest relevancy. Generally, asset may refer to hardware and/or software components of a grid infra-structure such as radio, devices, sensors, transformer, break-ers, etc. A resource generally refers to a utilized asset for performing a particular task or function. Additionally, an resource can also take the shape of a function performed by one more assets, such as database, security function, opti-mization function, adaptors, etc.

In step 950G, the context logistics file roster agent 1270 sends clf-roster(id) to the gwfc portfolio auditor 1278 which validates the clf-roster (id) against the gWFCtemplate. If realignment is required, in step 957, Clf-roster(record(id) is returned to context logistics file roster agent 1270 which may repeat steps 958, 950D, 950F, and 950E with updated information from the grid-wide asset portfolio database 1274 and the grid-wide asset portfolio custodian 1272.

Figure 12:
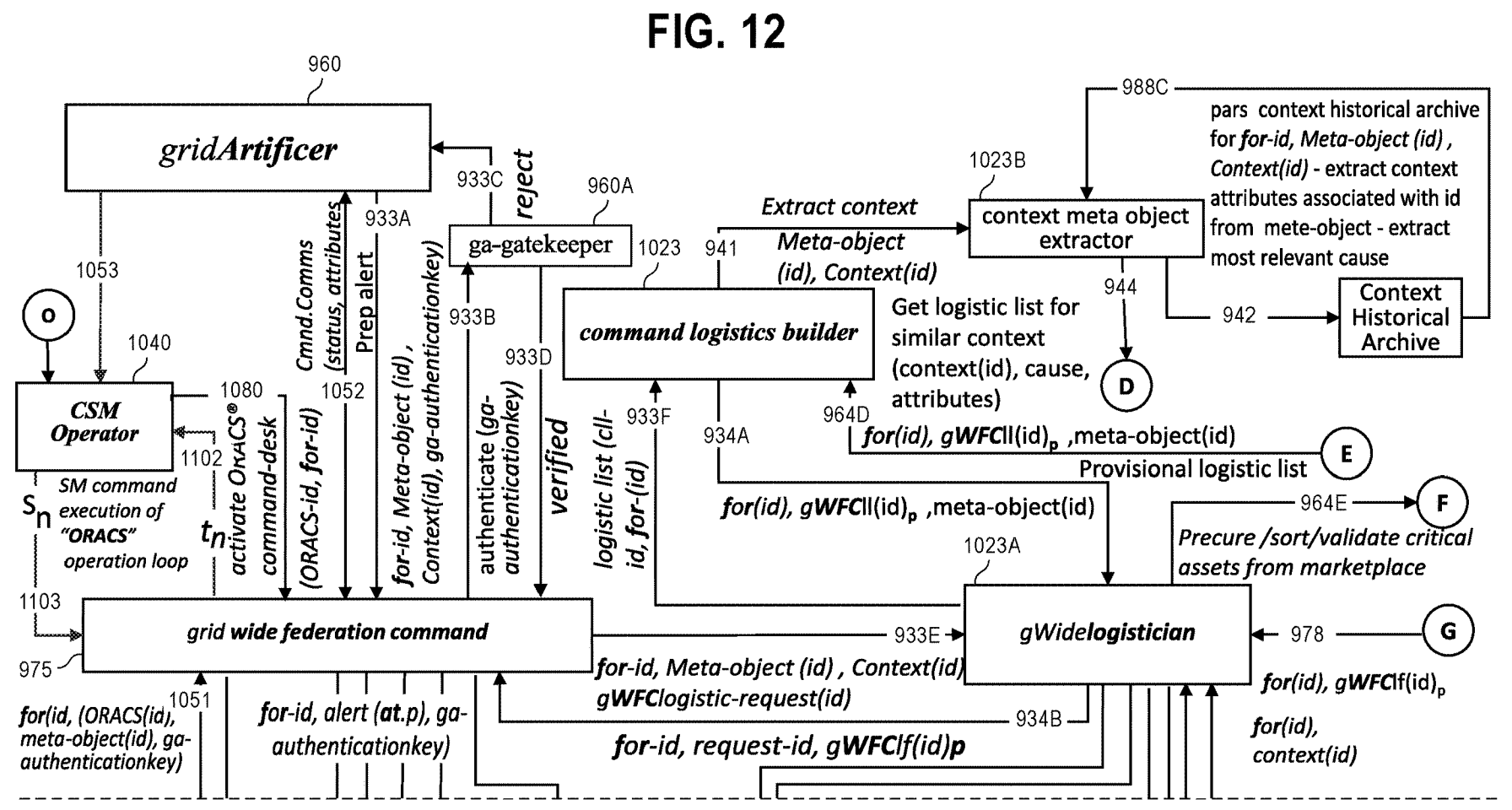

If the gwfc portfolio auditor 1278 approves the roster, in step 959, the provisional logistic file builder 1260 is notified of the approval and for(id) and gWFClf(id) are sent to the provisional logistic file builder 1260. The provisional logis-tic file builder 1260 forwards for(id), gWFCll(id)$_p$(asset-Class, Asset.attributes, asset.function, and oft) to the com-mand logistic meta object builder 1266 in step 964A, which determines the metadata object comprising Meta-object(id) ((for-id, (context-id, attributes, cap$_{(id)hr}$)), gWFCll(id)$_p$(as-setClass, Asset.attributes, asset. function, oft, observability index(1,2,3)+DNA(map)+Scouts(id)) in step 964B and stores the meta object in the historical archive 1262 in step 964C for subsequent use by the provisional logistic file builder 1260 and template parser 1264. The provisional logistic file builder 1260 also sends a provisional logistic list including for(id), gWFClf(id)$_p$, and meta-object(id) to the command logistic builder 1023 in step 964D as shown in FIG. 12. In step 964D1, the command logistic builder 1023 provides a provisional logistics list including for(id), gWFCll(id)$_p$, and meta-object(id) back to the grid-wide logistician module 1023A.

Figure 13B:
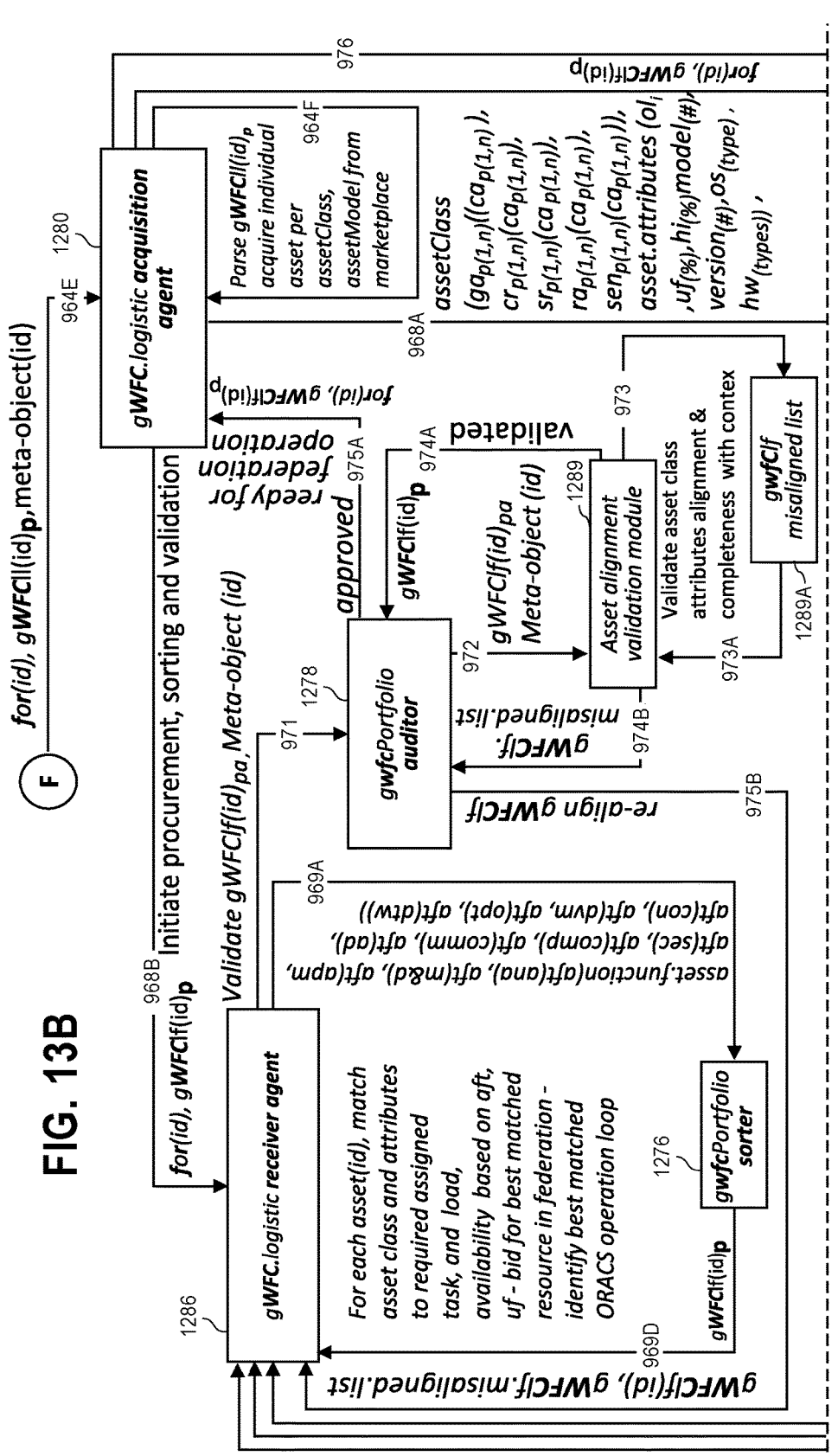
Figure 14:
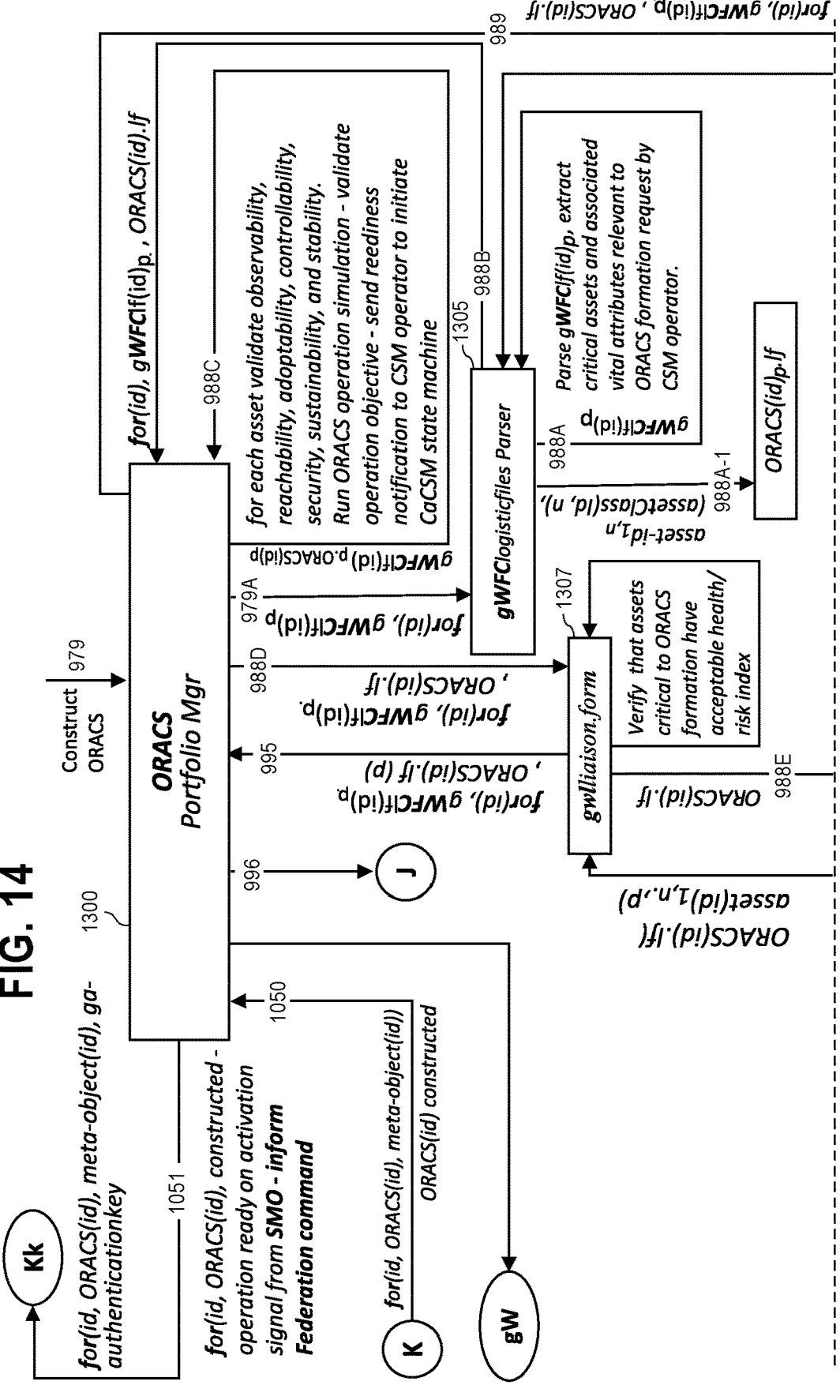
Figure 14:
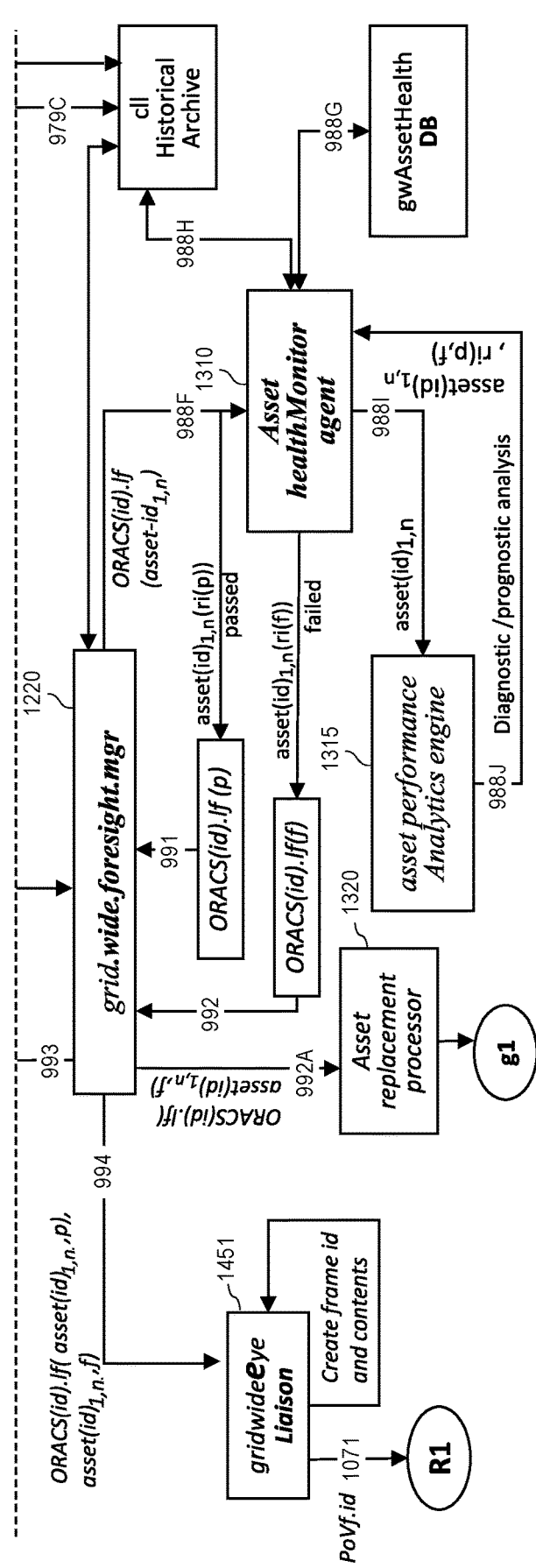

In step 964E, the grid-wide logistician module 1023A sends a request to procure, sort, and validate critical assets from a marketplace to a grid-wide federation command logistic acquisition agent 1280 as shown in FIG. 13B, the request includes for(id), gWFCll(id)$_p$, and meta-object(id). In step 964F, the grid-wide federation command logistic acquisition agent 1280 parses gWFCll(id)$_p$ to acquire individual assets per asset class and asset model from the marketplace. In step 968A, the grid-wide federation command logistic acquisition agent 1280 sends asset class and attributes in an asset acquisition request to the marketplace operator 1282.

In step 967B, the marketplace operator 1282 retrieves information from an ORACS-id portfolio database 1284 via an ORACS-id portfolio manager 1283. In step 967A, the marketplace operator 1282 retrieves information from the asset portfolio database 1274 via the portfolio custodian 1272. In step 968C, the marketplace operator 1282 provides gWFCll(id)$_p$(asset-id (assetClass(Id, n), asset.attributes(ol (id), mo(#), ver(#), os(types), and hw(types)) to the logistic receiver agent 1286.

In step 968B, the grid-wide federation command logistic acquisition agent 1280 initiates procurement, sorting, and validation at the logistic receiver agent 1286. The logistic receiver agent 1286 retrieves asset data from the marketplace operator 1282 in step 968C, the portfolio custodian 1272 in step 969B, and a clf historical archive 1288 in step 969C. For each asset(id), the logistic receiver agent 1286 matches asset class and attributes to the required assigned task, and load, availability based on aft, -f—bid for best-matched resource in the federation and identify best matched ORACS operation loop. In some embodiments, an ORACS operation loop may be defined by level of operability/functionalities (observability, device/DER Reachability, adaptability to legacy devices, controllability/dispatchability of DERs/microgrid, and security inside the operation loop. In step 969A, the logistic receiver agent 1286 sends the asset function to a portfolio sorter 1276, which sorts the assets into a gWFClf(id)$_p$ sent back to the logistic receiver agent 1286 in step 969D.

The logistic receiver agent 1286 then sends the gWFClf (id)$_{pa}$ and, Meta-object (id) to the portfolio auditor 1278 for validation in step 971. The gwfc portfolio auditor 1278 sends the gWFClf(id)$_{pa}$ and, Meta-object (id) to an asset alignment validation module 1289 in step 972, which validates asset class attributes alignment and completeness with context based on a clf misaligned list 1289A in steps 973 and 973A. If validation is unsuccessful, in step 974B, gWFClf misaligned list is sent to the gwfc portfolio auditor 1278. The gwfc portfolio auditor 1278 then sends a realignment request to the logistic receiver agent 1286 in step 975B, the request includes gWFClf(id) and gWFClf.misaligned.list. Upon receiving a misalignment notification, the logistic receiver agent 1286 repeats steps 969A and 969D with updated information from one or more of the marketplace operator 1282, the portfolio custodian 1272, and clf historical archive 1288 and re-requests validations in step 971 with an updated gWFClf(id)$_{pa}$.

If the validation of gWFClf(id)$_{pa}$ is successful, in step 974A, the asset alignment validation module 1289 returns gWFClf(id)$_p$ to the gwfc portfolio auditor 1278, which in turn sent an approval message to the grid-wide federation command logistic acquisition agent 1280 in step 975A, indicating that the clf is ready for federation operation, the approval message includes for(id) and gWFClf(id)$_p$.

In step 976, the grid-wide federation command logistic acquisition agent 1280 stores the validated for(id) and gWFClf(id)$_p$ in the clf historical archive 1288 for future use by the logistic receiver agent 1286. In step 978, for(id) and gWFClf(id)$_p$ are sent to the grid-wide logistician module 1023A as shown in FIG. 12.

The grid-wide logistician module 1023A further communicates with ORACS portfolio manager 1300 to construct an ORACS in step 979. The ORACS portfolio manager 1300 is configured to manage the availability and operational readiness of resources for performance of operation loop per assigned operational DNA. Further operations of ORACS portfolio manager 1300 are described with reference to FIG. 14.

In step 979A, the ORACS portfolio manager 1300 forwards for(id), gWFClf(id)$_p$ to a logistics files parser 1305 which retrieves information from the historical archive 1262 in step 979C and parses gWFClf(id)p to extract critical assets and associated vital attributes relevant to ORACS formation request by CSM operator in step 988A. In step 988A-1, asset-id$_{1,n}$ (assetClass(Id, n) are stored in ORACS (id)$_p$.lf. In step 988B, for(id), gWFClf(id)$_p$., and ORACS (id).lf are sent back to the ORACS portfolio manager 1300. In step 988C, the ORACS portfolio manager 1300 validates observability, reachability, adaptability, controllability, security, sustainability, and stability for each asset. The ORACS portfolio manager 1300 further runs ORACS operation simulation which validates operation objectives. After validation, ORACS portfolio manager 1300 sends a readiness notification to the CSM operator 1040 to initiate the CaCSM state machine.

In step 988D, the ORACS portfolio manager 1300 sends for(id), gWFClf(id)p, and ORACS(id).lf to a foresight manager liaison module 1307 which verifies that the assets critical to the ORACS formation have acceptable health and risk index. In step 988E ORACS(id).lf is sent to a grid-wide foresight manager 1220 which communicates ORACS(id).lf to an asset health monitor agent 1310 in step 988F. The asset health monitor agent 1310 is configured to retrieve asset information from the historical archive 1262 in step 988H and an asset health database 1312 in step 988G. The asset health monitor agent 1310 further sends asset information including asset(id)$_{1,n}$ to an asset performance analytics engine 1315 in step 988I which performs diagnostic and prognostic analysis to return pass/fail (asset(id)$_{1,n}$, ri(p,f)) to the asset health monitor agent 1310 in step 988J.

If an asset fails a health and performance check, in step 992, the grid-wide foresight manager 1220 is notified and, in step 992A, ORACS(id).lf(asset(id)$_{1,n}$,f) is sent to an asset replacement processor 1320 which sends an asset replacement request back to the grid-wide logistician module 1023A, the request includes for(id), gWFCll(id)$_p$ ORACS (id).lf(asset(id)$_{1,n}$,f).

If all asset passes the health and performance check, in step 991, the grid-wide foresight manager 1220 is notified, and ORACS(id).lf(asset(id)$_{1,n}$,p) is forwarded to foresight manager liaison module 1307 which sends for(id), gWFClf (id)$_p$., ORACS(id).lf (p) to the ORACS portfolio manager 1300.

In step 993, ORACS(id).lf(asset(id)$_{1,n}$,p) is sent from the grid-wide foresight manager 1220 to the foresight manager liaison module 1307 and forwarded to ORACS portfolio manager 1300 at step 995. In step 989, the ORACS portfolio manager 1300 stores for(id), gWFClf(id)$_p$., ORACS(id).lf in the historical archive 1262 for future use. In step 994, ORACS(id).lf(asset(id)$_{1,n}$,p), asset(id)$_{l,n}$,f) is sent to the grid-wide eye liaison module 1451 to create frame id and contents.

Figure 15:
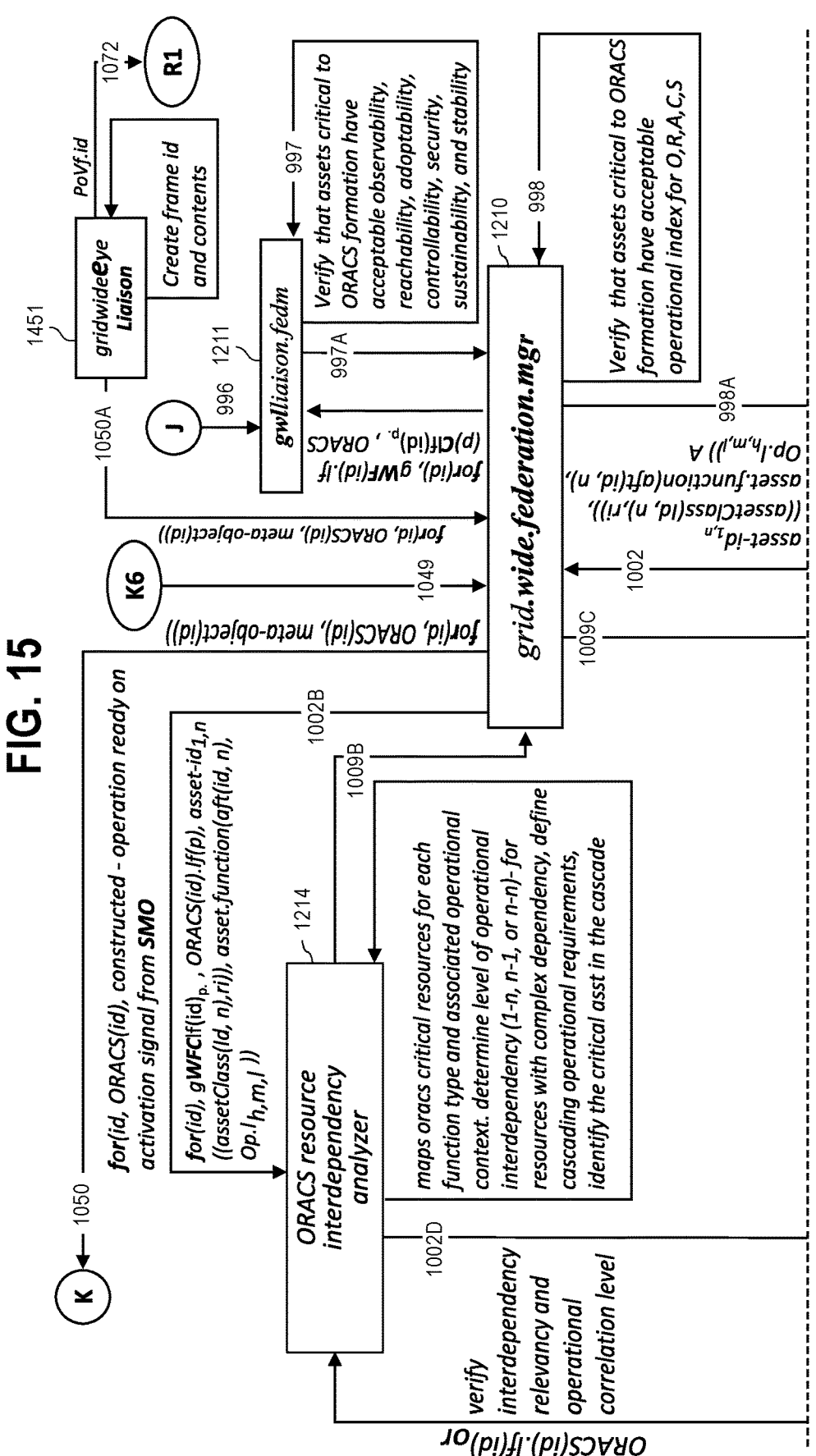

In step 996, shown in FIG. 15, the ORACS portfolio manager 1300 sends the constructed ORACS to a federation manager liaison module 1211 which is configured to verify that assets critical to ORACS formation have acceptable observability, reachability, adaptability, controllability, security, sustainability, and stability in step 997. The federation manager liaison module 1211 is configured to use information from the ORACS portfolio manager 1300 received in step 996 for verification. Upon verification, the ORACS is forwarded to the grid-wide federation manager 1210 in step 997*a*. The grid-wide federation manager 1210 is configured to verify that assets critical to ORACS formation have an acceptable operational index for observability, reachability, adaptability, controllability, security, sustainability, and stability in step 998.

In step 998A, the constructed ORACS formation is passed to the asset formation processor 1212 which is configured to query the historical archive 1288 for for(id), gWFClf(id)$_{p.}$, ORACS(id).lf in steps 999 and 1000 and parse gWFClf(id)$_p$, extract critical assets and associated asset function types and associated asset type attributes in relation ORACS operation in step 1001. The asset formation processor 1212 is further configured to update the historical archive 1288 with ORACS(id)$_p$.lf(id) in steps 1001A.

In step 1002, asset formation processor 1212 returns asset-id$_{1,n}$((assetClass(Id, n),ri)), asset.function(aft(id, n), Op.l$_{h,m,l}$)) to the grid-wide federal manager 1210. In step 1002B, for(id), gWFClf(id)p., ORACS(id).lf(p), asset-id1,n ((assetClass(Id, n),ri)), asset.function(aft(id, n), Op.lh,m,l)) are passed to an ORACS resource interdependency analyzer 1214 which is configured to map ORACS critical resources for each function type and associated operational context, determine a level of operational interdependency (1-n, n-1, or n-n)—for resources with complex dependency, define cascading operational requirements, and identify the critical asset in the cascade.

In step 1002D, the ORACS resource interdependency analyzer 1214 uses a simulation engine 1215 to verify interdependency relevancy and operational correlation level. In step 1002C, a learning engine 1216 calibrates ORACS interdependency and uses the ORACS(id)$_p$.lf(id)$_{or}$ to query the historical archive 1288 in steps 1006 and 1007. In step 1002C-1 the simulation engine 1215 runs a provisional ORACS operation loop in simulation mode using the learning engine 1216 to validate ORACS operability based on the validated state ORACS received in step 1007A, historical ORACS(id)$_p$.lf(id)$_{or}$ retrieved from the clf historical archive 1288 in step 1008, and simulation scenarios retrieved from the historical archive 1025 in step 1002E. Upon verifying the interdependency relevancy and operational correlation level, in step 1009A, ORACS(id).lf(id)$_{or}$ is returned to ORACS resource interdependency analyzer 1214. In step 1009B, the result of the interdependency analyzer is provided to the grid-wide federal manager 1210.

Figure 16:
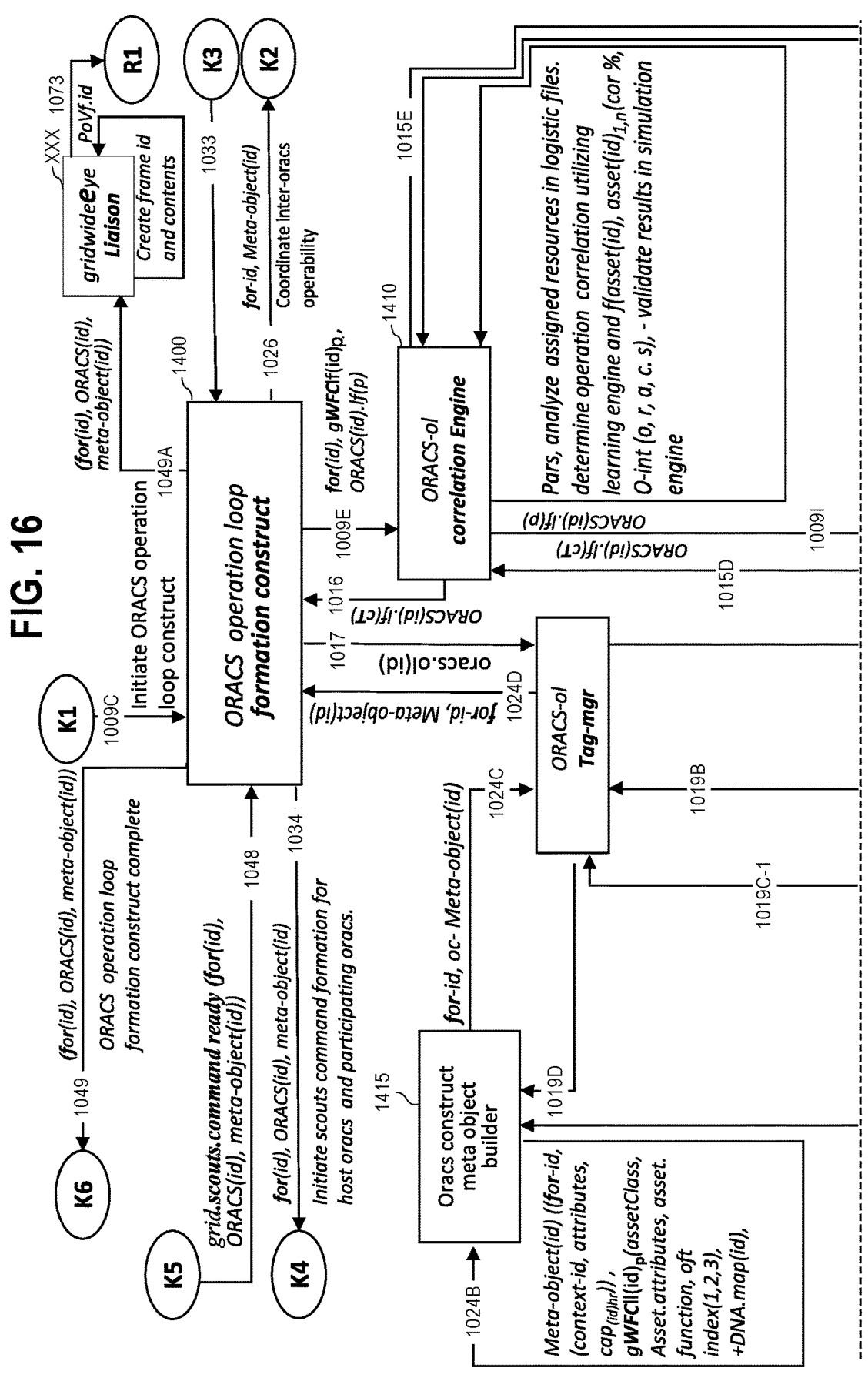
Figure 16:
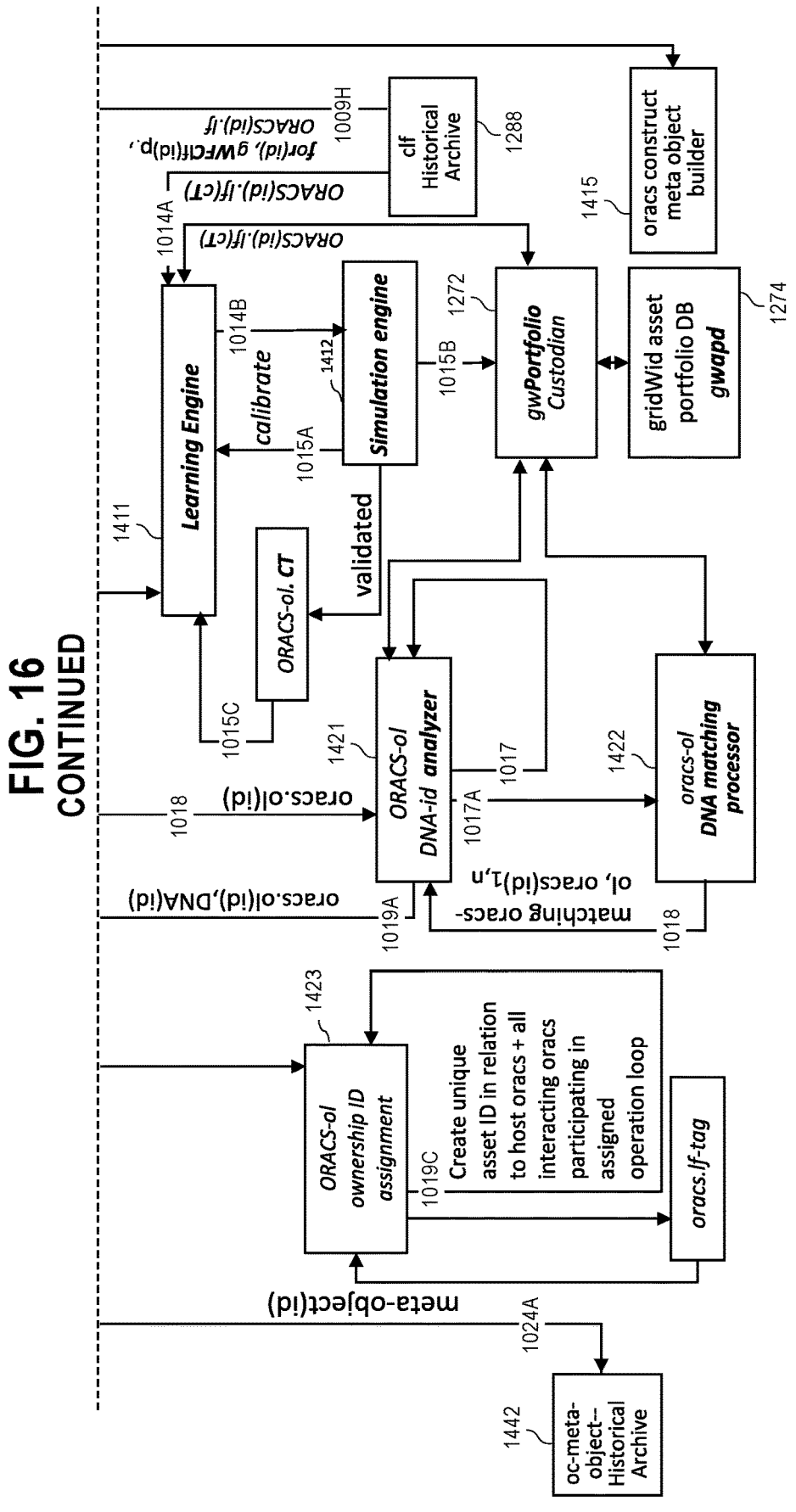

In step 1009C, the grid-wide federal manager 1210 send for(id), gWFClf(id)$_{p.}$, ORACS(id).lf(p) to an ORACS operation formation construct module 1400 to initiate ORACS operation loop construct as shown in FIG. 16.

In step 1009E, for(id), gWFClf(id)$_{p.}$, ORACS(id).lf(p) is sent to an operation loop correlation engine 1410 configured to parse, analyze, and assigned resources in logistic files. The operation loop correlation engine 1410 further determines operation correlation utilizing a learning engine and f(asset(id), asset(id)$_{1,n}$(cor %, O-int (o, r, a, c. s), to validate results in a simulation engine.

In step 1009H, operation loop correlation engine 1410 retrieves for(id), WFClf(id)$_{p.}$, ORACS(id).lf from the historical archive 1288. In step 10091, ORACS(id).lf(p) is provided to a learning engine 1411 which initiates simulation at the simulation engine 1412 in step 1014B. The simulation engine 1412 is configured to perform calibration and validation and provides calibration and validation results ORACS-ol.CT to the learning engine 1411 in steps 1015A and 1015C. The simulation engine 1412 further provides the simulation result to the portfolio custodian 1272 in step 1015B, which stores and retrieves asset information from the asset portfolio database 1274. The learning engine 1411 uses ORACS(id).lf(cT) received from the portfolio custodian 1272 and/or historical archive 1288 in step 1014A and the calibration and validation results from the simulation engine 1412 to provide ORACS(id).lf(cT) to the operation loop correlation engine 1410 in step 1015D. Upon validation, an ORACS construct meta object builder 1415 is notified in step 1015E and the validated ORACS(id).lf(cT) is sent to the ORACS operation loop formation construct module 1400 in step 1016.

In step 1017, ORACS operation loop formation construct module 1400 sends oracs.ol(id) to an ORACS operation loop tag manager 1420 in step 1017. The ORACS operation loop tag manager 1420 forwards oracs.ol(id) to a DNA-id analyzer 1421 which is configured to parse, analyze ORACS logistic file—extract context type in step 1017A. In step 1017C the DNA-id analyzer 1421 uses a DNA matching processor 1422 and information from the portfolio custodian 1272 to determine matching oracs-ol, oracs(id)$_{1,n}$. in step 1019A, the DNA-id analyzer 1421 provides oracs.ol(id), DNA(id) to the ORACS operation loop tag manager 1420. In some embodiments, DNA as used herein may also be referred to as a schema which refers to the organization of operation cell, Apps or Scout's that include a unique organized structure that defines the cognitive processing, and behavior of responding to dynamic situational and operational condition. In some embodiments, schema may comprise ((ORACS formation (independent operation cell or part of federation), internal structure composition mapping ((assetClass, Asset.attributes, asset. function, oft), asset interdependency and correlation index, Observability index, DNA.map(id), IO operation logistics, IO operation logistics gaps, scouts-incubation-roster(id), and scouts-launch-plan (id).

In step 1019B, the ORACS operation loop tag manager 1420 sends the ORACS operation loop information to an ownership ID assignment module 1423 configured to create a unique asset ID in relation to host oracs and all interacting oracs participating in an assigned operation loop in step 1019C. The ownership ID assignment module 1423 generates oracs.lf-tag and sends the assigned asset IDs to the ORACS operation loop tag manager 1420.

In step 1019D, ORACS operation loop tag manager 1420 initiates the building of the ORACS construct meta object at the ORACS construct meta object builder 1415. The ORACS construct meta object builder 1415 is configured to generate Meta-object(id) ((for-id, (context-id, attributes, cap$_{(id)hr}$)), gWFCll(id)$_p$ (assetClass, Asset.attributes, asset. function, oft index(1,2,3), +DNA.map(id) in step 1024B. The ORACS construct meta object builder 1415 may construct the meta-object based on historical meta object data stored in the OC meta-object historical archive 1442 and/or may store generated meta object into the OC meta-object historical archive 1442 in step 1024A.

The meta-object is then sent to ORACS operation loop tag manager 1420 in step 1024C. In step 1024C, for-id, oc-Meta-object(id) is sent from an ORACS construct meta-object builder 1415 to the ORACS operation loop tag manager 1420. In step 1024D, for-id and meta-object(id) are sent from ORACS operation loop tag manager 1420 to a formation construct module 1400.

Figure 17:
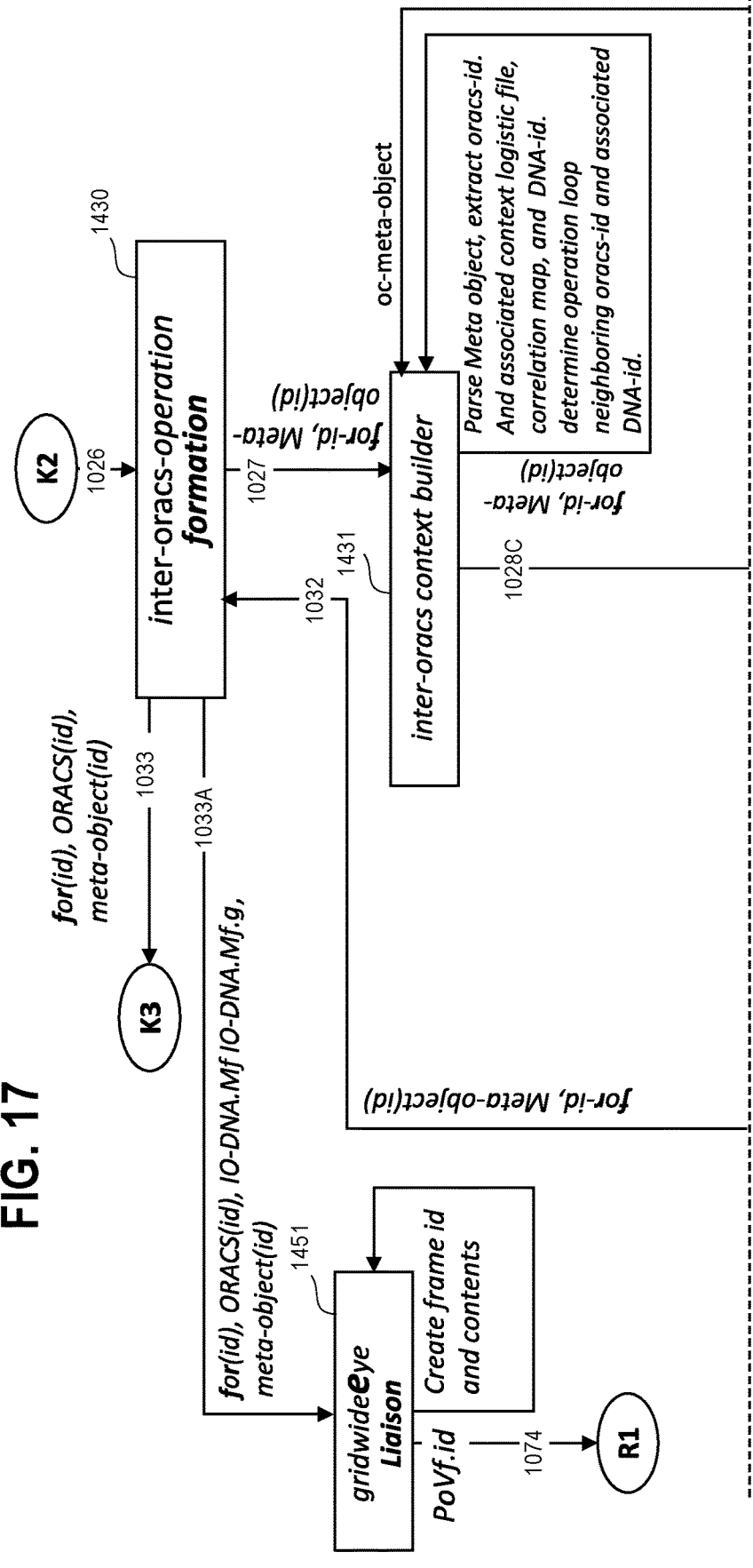
Figure 17:
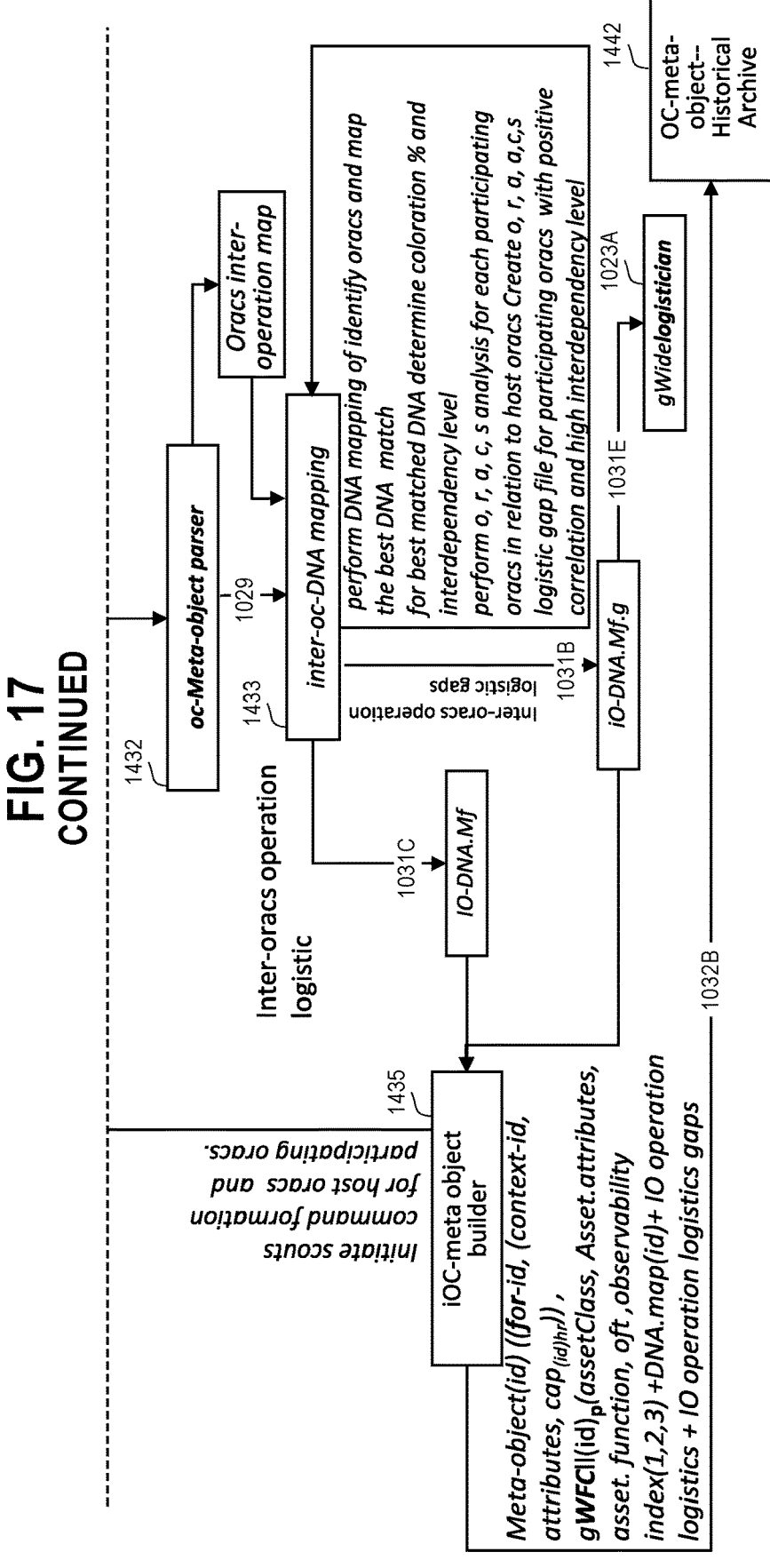
Figure 18:
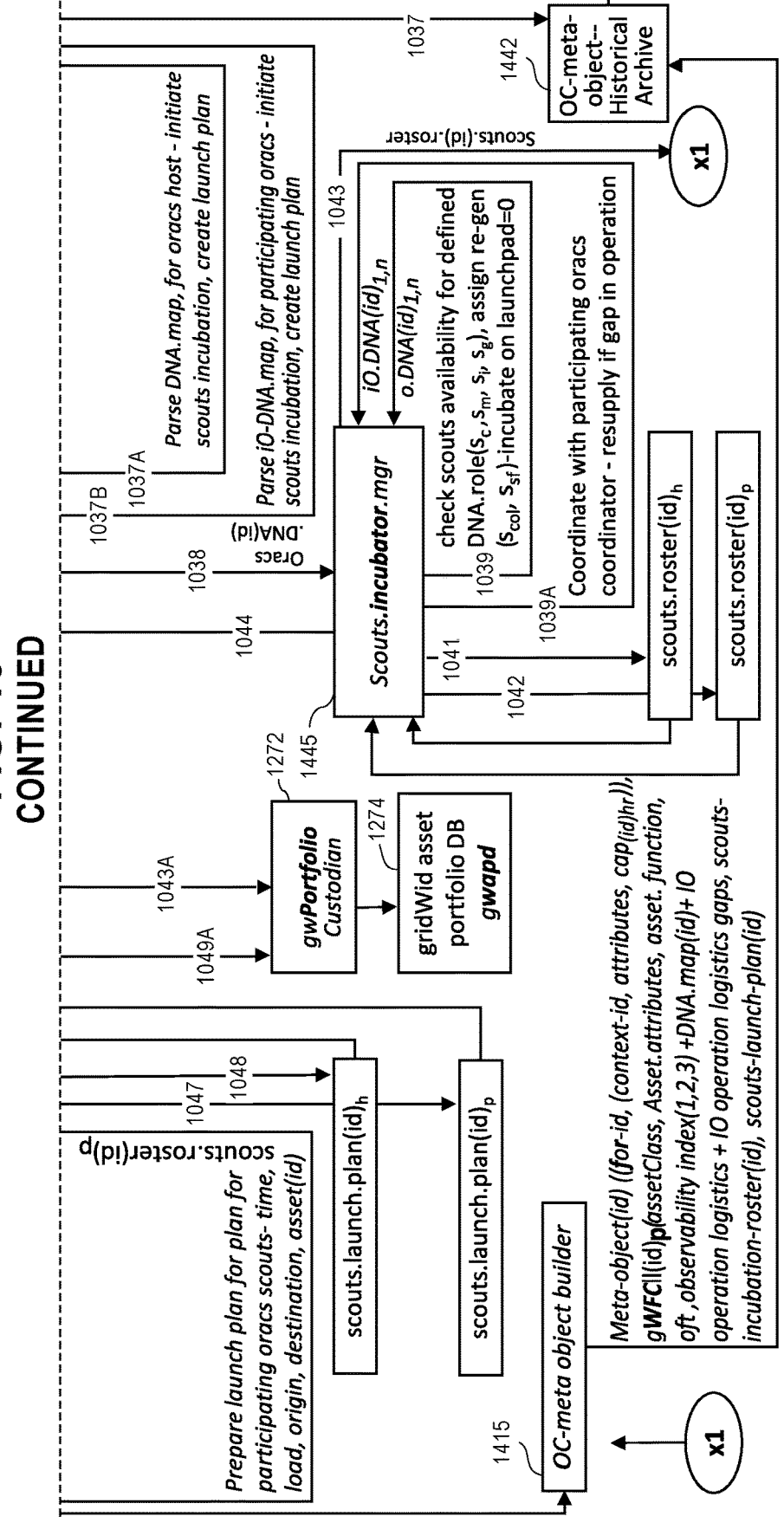
Figure 19:
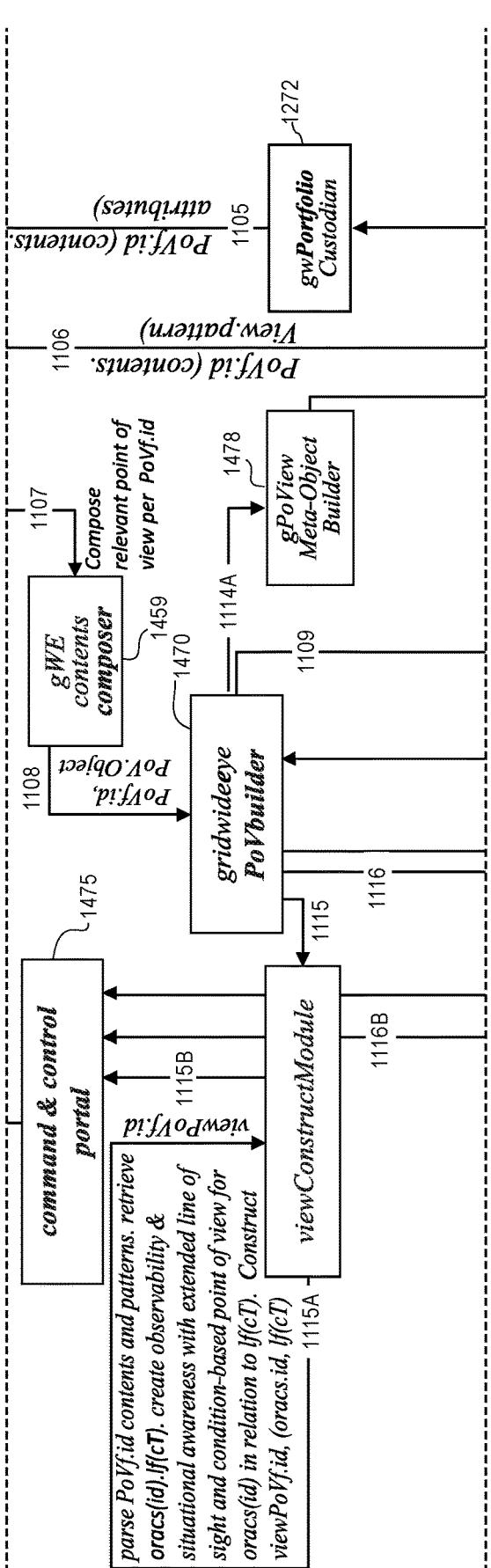

In step 1026, for-id, Meta-object(id) are provided to inter-ORACS operation formation module 1430 to coordinate inter-ORACS operability as shown in FIG. 17. In step 1027, for-id, Meta-object(id) are sent to an inter-ORACS context builder 1431 configured to parse Meta object, extract oracs-id, associated context logistic file, correlation map, and DNA-id, and determine operation loop neighboring oracs-id and associated DNA-id based on for-id, Meta-object(id) in step 1028A. In step 1028C, for-id, oc-meta-object(id) is provided to a meta-object parser 1432 that, in step 1029, uses a DNA mapping module 1433 to perform DNA mapping of the ORACS and map the best DNA match based on an ORACS inter-operation map. DNA.map(id), IO operation logistics, IO operation logistics gaps, scouts-incubation-roster(id), and scouts-launch-plan (id) may be compared to identify a matching DNA file. For best-matched DNA, the DNA mapping module 1433 determines coloration % and interdependency level perform o, r, a, c, s analysis for each participating oracs in relation to host oracs. The DNA mapping module 1433 further creates o, r, a, c, s logistic gap file for participating ORACS with positive correlation and high interdependency level. In steps 1031C and 1031B, Inter-ORACS operation logistic IO-DNA.Mf and Inter-oracs operation logistic gaps iO-DNA.Mf.g are provided to an iOC meta object builder 1435. iO-DNA.Mf.g is further provided to a grid-wide logistician module 1023A in step 1031E.

The iOC meta object builder is configured to builder 1435 build a meta object including Meta-object(id) ((for-id, (context-id, attributes, $cap_{(id)hr}$), gWFCll(id)$_p$(assetClass, Asset. attributes, asset. function, oft, observability index(1,2,3)+ DNA.map(id)+IO operation logistics+IO operation logistics gaps. The iOC meta object builder 1435 then sends for-id and Meta-object(id) to the inter-ORACS operation formation module 1430 to initiate scouts command formation for host oracs and participating ORACS in step 1032. The meta-object is also stored in an OC meta object historical archive, which is used by the inter-ORACS context builder 1431 in step 1032B for future context building.

In step 1033a, inter-ORACS operation formation module 1430 provides for(id), ORACS(id), IO-DNA.Mf IO-DNA.Mf.g, meta-object(id) to a grid-wide eye liaison module 1451 configured to create frame id and contents and provide a PoVf.id to a grid-wide eye module 1450. In step 1033, for(id), ORACS(id), meta-object(id) are provided from inter-ORACS operation formation module 1430 to the operation loop formation construct module 1400.

In step 1034, the operation loop formation construct module 1400 sends for(id), ORACS(id), meta-object(id) to a scout command liaison 1441 to initiate scouts command formation for host ORACS and participating ORACS. In step 1035, the scout command liaison 1441 initiates scout command formation at the scouts command 1230. The grid-wide scouts command 1230 is configured to retrieve OC-meta-object(id)) for for(id) and extract oracs(id), DNA.map(id) for host oracs and participating inter-oracs operation in step 1036. In step 1036A, the grid-wide scouts command 1230 retrieves OC meta object from an OC meta object historical archive 1442. In step 1036B, oracs(id) and DNA.map(id) are provided to a scout formation processor 1444. Generally, a scout is a complex meta-object encapsulated with a required operation module and configured to perform specific function in a particular operating cell as defined by the federation and/or scout manager.

The scout formation processor 1444 is configured to parse DNA.map for the ORACS host to initiate scout incubation and create a launch plan in step 1037A and parse iO-DNA.map, for ORACS host to initiate scout incubation and create a launch plan in step 1037B based on oracs(id), DNA.map(id). iO-DNA.map from the historical archive 1442. The scout formation processor 1444 is further configured to store oracs(id), DNA.map(id). iO-DNA.map to a meta-object historical archive 1442 in step 1037. The scout formation processor 1444 is further configured to retrieve and store asset portfolio data to an asset portfolio database 1274 via the portfolio custodian 1272 in steps 1039B and 1043A.

In step 1038, ORACS DNA(id) is provided to a scout incubator manager 1445 to initiate incubation. In some embodiments, ORACS DNS(id) defines ORACS unique identify and may comprise ORACS-id and associated DNA file(map) ((ORACS formation (independent operation cell or part of federation), internal structure composition mapping ((assetClass, Asset.attributes, asset. function, oft), and asset interdependency and correlation index+Observability index+Scouts(id)). The scout incubator manager 1445 is configured to check scout availability for defined DNA.role ($s_c$, $s_m$, $s_i$, $s_g$) and assign re-gen ($s_{col}$, $s_{sf}$), incubate on launchpad—in step 1039 and coordinate with participating ORACS coordinator and resupply if there is a gap in the operation in step 1039A. In steps 1041 and 1042, the scout incubator manager 1445 generates scouts.roster(id)$_h$ and scouts.roster(id)$_p$. In step 1043, scouts.(id).roster is sent to an ORACS construct meta object builder 1415. In step 1044 the scout roster is provided to the scout formation processor 1444.

In steps 1044A and 1044B, scouts.roster(id)$_h$ and scout-s.roster(id)$_p$ are sent to a scout launch manager 1447. The scout launch manager 1447 is configured to prepare a launch plan for host oracs scouts, including time, load, origin, destination, and asset(id) in step 1046 and prepare a launch plan for participating ORACS scouts, including time, load, origin, destination, asset(id) in step 1046A based on information stored in the asset portfolio database 1274 via the portfolio custodian 1272 retrieved in step 1046B. The scout launch manager 1447 generates scouts.launch.plan(id)$_h$ for a host and scouts.launch.plan(id)$_p$ for participating scouts in steps 1047 and 1048. In step 1049A the launch plans are stored in the asset portfolio database 1274. In step 1046 oracs.scouts.launch.plan(id) is sent to scout formation processor 1444. The launch plan is further sent to the ORACS construct meta object builder 1415 which stores Meta-object (id) ((for-id, (context-id, attributes, $cap_{(id)hr}$)), gWFCll(id)$_p$ (assetClass, Asset.attributes, asset. function, oft, observability index(1,2,3)+DNA.map(id)+IO operation logistics+IO operation logistics gaps, scouts-incubation-roster(id), scouts-launch-plan(id) in the historical archive 1442 for future use, including machine learning and simulation.

In response to receiving the launch plan from the scout launch manager 1447 in step 1046, in step 1048A, the scout formation processor 1444 sends ORACS. Scouts.roster(id), and launch.plan(id) to the grid-wide scouts command 1230. The grid-wide scouts command 1230 sends gsPoV ((for(id), ORACS(id), meta-object(id)) to grid-wide eye liaison module 1451 to create frame ID and contents. In step 1048, a scouts command ready message, including grid.scouts.command ready (for(id), ORACS(id), meta-object(id)) is sent to the operation loop formation construct module 1400 in step 1048 as shown in FIG. 16.

In step 1049, an ORACS operation loop formation construct complete message, including (for(id), ORACS(id), meta-object(id)) is sent from the operation loop formation construct module 1400 to the grid-wide federal manager 1210 as shown on FIG. 15. In step 1050, for(id, ORACS(id), meta-object(id)) is provided to grid-wide eye liaison module 1451. The grid-wide federal manager 1210 also receives for(id, ORACS(id), meta-object(id)) from the grid-wide eye liaison module 1451 in step 1050A.

In step 1051, the federation command module 975 is informed that for(id, ORACS(id) is constructed and operation is ready on activation signal from SMO. In step 1052, Cmnd.Comms (status, attributes) is exchanged between the grid artificer module 960 and the grid artificer module 960. In step 1053, the grid artificer module 960 further initiates state machine operation at the CSM operator 1040.

In steps 1071, 1072, 1073, 1074, and 1075, PoVf.id from various modules are sent via a grid-wide eye liaison module 1451. The grid-wide eye liaison module 1451 forwards PoVf.id to the grid-wide eye module 1450 with a ga-authenticationkey in step 1100. In step 1100A, the grid-wide eye module 1450 authenticates the ga-authenticationkey via a grid-wide eye gatekeeper 1452. The grid-wide eye gatekeeper 1452 is configured to notify the grid-wide eye module 1450 of a successful verification in step 1100B and notify the grid-wide eye liaison module 1451 of a failed notification in step 1100C.

In step 1101, the grid-wide eye module 1450 forwards the PoVf.id to a gird wide eye agent 1453 configured to retrieve gWE meta-object(id)) based on PoVf.id from a gwe meta-object historical archive 1460 in steps 1001 and 1102, and extract frame ID and content associated with the PoVF.id in step 1103. In step 1104, gird wide eye agent 1453 sends for (Id), PoVfid (contents) to a grid-wide-eye collector module 1458. In step 1105, the grid-wide-eye collector module 1458 retrieves PoVf.id (contents. attributes) from the asset portfolio database 1274 via a portfolio custodian 1272. In step 1106, the 1458 retrieves PoVf.id (contents.View.pattern) from the gwe meta-object historical archive 1460. In step 1107, the grid-wide-eye collector module 1458 initiates a gwe contents composer 1459 to compose the relevant point of view for the PoVf.id.

In step 1108, the composer 1459 send PoVf.id and PoV-.Object to a gwe PoV builder 1470. In step 1109, the PoVf.id is sent to a learning engine 1472 configured to retrieve the most relevant pattern associated with PoVf.id in step 1110. The learning engine 1472 then retrieves the matched pattern from the gwe meta-object historical archive 1460 via a UI/UX pattens archive 1465 in steps 1112, 1113, and 1113a. In step 1114, PoVf.id (View.pattern) is sent to the gwe PoV builder 1470. The gwe PoV builder 1470 then forms and/or verifies the for (Id), PoVf.id frame via a view construct module, a control construct module, an admin construct module, and a command and control portal 1475 in steps 1115, 1115A, 1115, B, 1116, 1116A, 1116B, 1117, 1117A, and 1117B. The view construct module is configured to parse PoVf.id contents and patterns, retrieve oracs(id).lf (cT), and create observability and situational awareness with extended line of sight and condition-based point of view for oracs(id) in relation to lf(cT) to construct viewPoVf.id, (oracs.id, lf(cT)). The control construct module is configured to parse PoVf.id contents and patterns, retrieve oracs (id) aft to create operation action list within oracs(id) operation in relation to oracs(id).aft, and construct control-PoVf.id, (oracs.id, aft). The admin construct module is configured to parse and analyze PoVf.id contents, identify participating apps within PoVf to create contextual collaboration links among apps (collab.l(id)(Apps1,n)) and construct adminPoVf (id), (collab.l(id)(Apps1,n)).

In step 1118, the command and control portal 1475 sends a for (Id), PoVf.id frame ready message to the grid-wide eye module 1450. In step 1118A, the frame ready message is forward to grid-wide eye liaison module 1451 and may then be used by other components of the system. The gwe PoV builder 1470 further provides PoV data to a PoV meta-object builder 1478 in step 1114A, which builds a PoV meta object and stores the meta object in the gwe meta-object historical archive 1460 in step 1114B for future use.

In step 1080, (ORACS-id, for-id) is sent to the CSM operator 1040 to activate ORACS command-desk. In step 1081, (ORACS-id, for-(id),DNA(id) are forwarded to the grid-wide federal manager 1210. The CSM operator 1040 performs SM command execution of "ORACS" operation loop, receives ta from grid-wide federation command module 975 in step 1102, and returns $s_n$ to the grid-wide federation command module 975 in step 1103.

FIG. 20 is a flowchart of an example method for adaptive power grid management with a logistician module At step 2010, the system determines, at a processor executing a logistician module and coupled to an asset database and a network of devices, a federation command template for a formation plan based on a context meta object for the formation plan, wherein the federation command template comprises a plurality of tasks and class requirements associated with the tasks. At step 2020, the system selects at least one asset class from the asset database for each task of the plurality of tasks based on comparing asset class attributes associated with a plurality of asset classes and the class requirements associated with the tasks. At step 2030, for each selected asset class, the system selects at least one asset based on asset statuses associated with the plurality of assets. At step 2040, the system assigns a task of the formation plan to the at least one asset. At step 2050, the system generates a provisional logistics list comprising selected assets for the plurality of tasks of the formation plan. At step 2060, the system causes the selected assets of the plurality of network of devices to execute the formation plan.

FIG. 21 is a flowchart of an example method for managing a power grid with a portfolio manager module. At step 2110, the system stores asset attributes of assets on a network of devices in an asset database. At step 2120, the system identifies, with a processor executing a portfolio manager module and coupled to the asset database and a network of devices, a plurality of assets from a provisional logistics list listing assets assigned to one or more tasks of a formation plan having a plurality of states. At step 2130, the system determines operation objectives for the formation plan. At step 2140, the system determines operational index requirements for each of the plurality of assets based on the formation plan and verify the plurality of assets have acceptable operation indexes based on the operational index requirements and asset data in the asset database. At step 2150, the system generates a logistics list comprising verified assets for the plurality of tasks for the formation plan. At step 2160, the system causes the formation plan to be executed by the verified assets of the network devices.

FIG. 22 is a flowchart of an example method for adaptive power grid management with a formation construct module. At step 2210, the system stores a plurality of historical meta objects in a historical meta object database, where each meta object is configured to cause an asset in a network of devices to execute a task. At step 2220, the system receives, at a processor executing a formation construct module, a formation plan and a logistics list comprising a plurality of assets for executing an operation loop in the formation plan. At step 2230, for the operation loop, the system retrieves a matching schema based on comparing the tasks of the operation loop and the logistics list with the plurality of meta objects in the historical meta object database. At step 2240, the system constructs meta objects for plurality of assets based on the matching schema and the formation plan. At step 2250, the system causes the plurality of the network of devices to execute the formation plan based on meta objects assigned to the plurality of assets of the network of devices]

FIG. 23 is a flowchart of an example method for managing an adaptive power grid with a scout command module. At step 2310, the system stores asset data associated with devices on a network of devices in an asset database. At step 2320, the system receives a scout command module executed on a processor coupled to an asset database and a network of devices, a formation plan and a logistics list comprising a plurality of assets for executing tasks in the formation plan. At step 2330, the system identifies an operation loop of the formation plan having a host asset and a plurality of participant assets. At step 2340, the system determines assigned roles for each of the plurality of participant assets in the operation loop. At step 2350, the system verifies availabilities of each of the plurality of participant assets based on the assigned roles and the asset data stored in the asset database. At step 2360, the system determines a launch plan for the operation loop for the host asset and the plurality of participant assets. At step 2370, the system causes the plurality of the network devices to execute the formation plan based on the launch plan.

FIG. 24 is a flowchart of an example method for adaptive power grid management with a data management module. In some embodiments, the data management module may be referred to as the grid-wide-eye module herein. At step 2410, the system communicates with the devices on the network of devices to aggregate device data in the asset database. At step 2420, the system receives a point of view (pov) file request from one of the modules in the power grid management system. At step 2430, the system retrieves asset data from the asset database based on the pov file request. At step 2440, the system selects a view pattern from the patterns database based on the pov file request. At step 2450, the system forms a pov file based on the asset data and the view pattern. At step 2460, the system sends the pov file to the module that requested the pov file.

Further aspects of the disclosure are provided by the subject matter of the following clauses:

In some aspects, the techniques described herein relate to an adaptive power grid management system, the system includes: an asset database storing asset attributes of assets on a network of devices; and a processor coupled to the asset database and the network of devices, the processor being configured to execute a logistician module which causes the processor to: determine a federation command template for a formation plan based on a context meta object for the formation plan, the federation command template includes a plurality of tasks and class requirements associated with the tasks; select at least one asset class from the asset database for each task of the plurality of tasks based on comparing asset class attributes associated with a plurality of asset classes and the class requirements associated with the tasks; for each selected asset class, select at least one asset based on asset statuses associated with the plurality of assets; assign a task of the formation plan to the at least one asset; generate a provisional logistics list including selected assets for the plurality of tasks of the formation plan; and cause the selected assets of the plurality of network devices to execute the formation plan.

The system of any of the preceding clauses, wherein the federation command template is determined based on retrieving the federation command template from a logistics list historical archive by matching the context meta object of the formation plan with historical context meta objects stored in a meta objects database.

The system of any of the preceding clauses, wherein the class requirements associated with the tasks include asset location, asset area of responsibility, and/or asset function.

The system of any of the preceding clauses, wherein the class requirements associated with the task include requirements for asset functions including monitoring, diagnostics, performance management, analytics, security, computing, communication, adaptation, device management, optimization, and/or digital twin capabilities.

The system of any of the preceding clauses, wherein the class requirements include observability index, reachability index, resiliency index, and security index requirements.

The system of any of the preceding clauses, wherein the asset class attributes include computing resources, security resources, radio capabilities, and/or sensing capabilities.

The system of any of the preceding clauses, wherein the asset class attributes are determined based on asset model identifiers, version identifiers, and operating systems associated with each of the plurality of assets.

The system of any of the preceding clauses, wherein the processor is further configured to audit the provisional logistics list by comparing the selected asset classes with the combined requirements of tasks in the federation command template.

The system of any of the preceding clauses, wherein the asset statuses include assigned task, load, and availability.

The system of any of the preceding clauses, wherein the asset database stores real-time asset status information updated via communications with the plurality of assets on the network of devices.

The system of any of the preceding clauses, wherein the at least one asset is assigned two or more tasks of the plurality of tasks based on availability.

The system of any of the preceding clauses, wherein the processor is further configured to verify asset health of the at least one asset based on real-time health monitoring prior to causing the at least one asset to execute the task.

The system of any of the preceding clauses, wherein the processor is further configured to initiate an asset replacement process in the event that an assets fails health assessment.

The system of any of the preceding clauses, wherein the plurality of assets includes field agent devices associated with one or more of a power grid controller, a power grid substation, a microgrid controller, a power plant, a solar farm, a windfarm, and an electric vehicle charging station.

The method of any of the preceding clauses for adaptive power grid management, the method including: determining, at a processor executing a logistician module and coupled to an asset database and a network of devices, a federation command template for a formation plan based on a context meta object for the formation plan, wherein the federation command template includes a plurality of tasks and class requirements associated with the tasks; selecting at least one asset class from the asset database for each task of the plurality of tasks based on comparing asset class attributes associated with a plurality of asset classes and the class requirements associated with the tasks; for each selected asset class, selecting at least one asset based on asset statuses associated with the plurality of assets; assigning a task of the formation plan to the at least one asset; generating a provisional logistics list including selected assets for the plurality of tasks of the formation plan; and causing the selected assets of the plurality of network devices to execute the formation plan.

The method of any of the preceding clauses, further including determining the federation command template by retrieving the federation command template from a logistics list historical archive by matching the context meta object of the formation plan with historical context meta objects stored in a meta objects database.

The method of any of the preceding clauses, wherein the class requirements associated with the tasks include asset location, asset area of responsibility, and/or asset function.

The method of any of the preceding clauses, wherein the class requirements associated with the task include requirements for asset functions including monitoring, diagnostics, performance management, analytics, security, computing, communication, adaptation, device management, optimization, and/or digital twin capabilities.

The method of any of the preceding clauses, wherein the class requirements include observability index, reachability index, resiliency index, and security index requirements.

The method of any of the preceding clauses, wherein the asset class attributes include computing resources, security resources, radio capabilities, and/or sensing capabilities.

The method of any of the preceding clauses, wherein the asset class attributes are determined based on asset model identifiers, version identifiers, and operating systems associated with each of the plurality of assets.

The method of any of the preceding clauses, further including auditing the provisional logistics list by comparing the selected asset classes with the combined requirements of tasks in the federation command template.

The method of any of the preceding clauses, wherein the asset statuses include assigned task, load, and availability.

The method of any of the preceding clauses, wherein the asset database stores real-time asset status information updated via communications with the plurality of assets on the network of devices.

The method of any of the preceding clauses, further including assigning two or more tasks of the plurality of tasks to the at least one asset based on availability.

The method of any of the preceding clauses, further including verifying asset health of the at least one asset based on real-time health monitoring prior to causing the at least one asset to execute the task.

The method of any of the preceding clauses, further including initiating an asset replacement process in the event that an asset fails assessment of the asset health.

In some aspects, the techniques described herein relate to an adaptive power grid management system, the system includes: an asset database storing asset attributes of assets on a network of devices; and a processor coupled to the asset database and the network of devices, the processor being configured to execute a portfolio manager module which causes the processor to: identify a plurality of assets from a provisional logistics list listing assets assigned to one or more tasks of a formation plan having a plurality of states; determine operation objectives for the formation plan; determine operational index requirements for each of the plurality of assets based on the formation plan; verify the plurality of assets have acceptable operation indexes based on the operational index requirements and asset data in the asset database; and generate a logistics list including verified assets for the plurality of tasks for the formation plan; and cause the plurality of network devices to execute the formation plan.

The system of any of the preceding clauses, wherein operational indexes include observability, reachability, adaptability, controllability, security, sustainability, and stability indexes.

The system of any of the preceding clauses, wherein the operational index requirements are determined based on vital attributes associated with the formation plan.

The system of any of the preceding clauses, wherein the processor is further configured to execute a resource dependency analyzer module that causes the processor to: determine operational interdependencies between assets based on performing a simulation, with a simulation engine, of the plurality of states of the formation plan; wherein the operational index requirements are determined based at least in part on an operational interdependency level of each of the plurality of assets.

The system of any of the preceding clauses, wherein the operational index requirements include cascading operational requirements determined based on the operational interdependencies.

The system of any of the preceding clauses, wherein the simulation is performed based on simulation scenarios stored in a historical scenarios database storing historical scenarios associated with a plurality of devices on the network of devices.

The system of any of the preceding clauses, the simulation engine utilizes a learning engine to execute an operation loop of the formation plan to calibrate asset interdependency, the learning engine being trained on historical logistic files and asset interdependency data.

The system of any of the preceding clauses, wherein operational indexes of each of the plurality of assets are determined based on an asset identifier, an asset function type, and associated asset type attribute.

The system of any of the preceding clauses, wherein the processor is further configured to: determine a risk index and/or a health index for each of the plurality of assets in the provisional logistics list; and initiate an asset replacement process in the event that the risk index and/or the health index of an asset is below a predetermined threshold.

The system of any of the preceding clauses, wherein health indexes of the plurality of assets are determined based on performing asset health analysis based on asset status information stored in an asset health database and updated via network connections to the plurality of assets on the network of devices.

The method of any of the preceding clauses for managing a power grid, including: storing asset attributes of assets on a network of devices in an asset database; identifying, with a processor executing a portfolio manager module and coupled to the asset database and a network of devices, a plurality of assets from a provisional logistics list listing assets assigned to one or more tasks of a formation plan having a plurality of states; determining operation objectives for the formation plan; determining operational index requirements for each of the plurality of assets based on the formation plan; verifying the plurality of assets have acceptable operation indexes based on the operational index requirements and asset data in the asset database; generating a logistics list including verified assets for the plurality of tasks for the formation plan; and causing the formation plan to be executed on the plurality of network devices.

The method of any of the preceding clauses, wherein the operational indexes include observability, reachability, adaptability, controllability, security, sustainability, and stability indexes.

The method of any of the preceding clauses, wherein the operational index requirements are determined based on vital attributes associated with the formation plan.

The method of any of the preceding clauses, further including executing a resource dependency analyzer module on the processor, the resource dependency analyzer module causing the processor to: determine operational interdependencies between assets based on performing a simulation, with a simulation engine, of the plurality of states of the formation plan; and b. determine the operational index requirements based at least in part on an operational interdependency level of each of the plurality of assets.

The method of any of the preceding clauses, wherein the operational index requirements include cascading operational requirements determined based on the operational interdependencies.

The method of any of the preceding clauses, wherein the simulation is performed based on simulation scenarios stored in a historical scenarios database storing historical scenarios associated with a plurality of devices on the network of devices, and the simulation engine utilizes a learning engine to execute an operation loop of the formation plan to calibrate asset interdependency, the learning engine being trained on historical logistic files and asset interdependency data.

The method of any of the preceding clauses, wherein operational indexes of each of the plurality of assets is determined based on an asset identifier, an asset function type, and associated asset type attribute.

The method of any of the preceding clauses, further including: determining a risk index and/or a health index for each of the plurality of assets in the provisional logistics list, and initiating an asset replacement process in the event that the risk index and/or the health index of an asset is below a predetermined threshold.

The method of any of the preceding clauses, wherein health indexes of the plurality of assets are determined based on performing asset health analysis based on asset status information stored in an asset health database and updated via network connections to the plurality of assets on the network of devices.

In some aspects, the techniques described herein relate to an adaptive power grid management system, the system includes: a historical meta object database storing a plurality of historical meta objects configured to cause an asset in a network of devices to execute a task; and a processor coupled to the historical meta object database and the network of devices, the processor being configured to execute a formation construct module which causes the processor to: receive a formation plan and a logistics list including a plurality of assets for executing an operation loop in the formation plan; for the operation loop, retrieve a matching schema based on comparing the tasks of the operation loop and the logistics list with the plurality of meta objects in the historical meta object database; construct meta objects for plurality of assets based on the matching schema and the formation plan; and cause the plurality of the network of devices to execute the formation plan based on meta objects assigned to the plurality of assets of the network of devices.

The system of any of the preceding clauses, wherein the matching schema is identified based on the assigned task, a context of the formation plan, asset function, and/or asset attributes.

The system of any of the preceding clauses wherein the processor is further configured to: determine operation correlations of the plurality of assets based on the formation plan and the logistics list, wherein the matching schema is retrieved further based on an operation correlation associated with the asset.

The system of any of the preceding clauses, wherein the operation correlations of assets are determined by using a learning engine that simulates the formation plan using asset data stored in an asset portfolio database and historical logistic files stored in a logistics file historical archive database.

The system of any of the preceding clauses, wherein the processor is further configured to identify operation loops in the formation plan with two or more participating assets, wherein the matching schema is retrieved further based on roles of the assets in the operation loop.

The system of any of the preceding clauses, wherein the two or more participating assets include a host asset of an operation loop of the formation plan and the meta object identifies the host asset of the operation loop.

The system of any of the preceding clauses, wherein the processor is further configured to: determine a correlation and interdependency level of one or more assets in the operation loop; perform operational index analysis of one or more assets and the matching schema in relation to a host asset of the operation loop based on the correlation and interdependency level; and determine a logistic gap file based on the operational index analysis.

The system of any of the preceding clauses, wherein the processor is further configured to: validate the operation loop of the formation plan based on logistic gap files associated with participating assets of the operation loop.

The system of any of the preceding clauses, wherein the operational index analysis verifies operational indexes including observability, reachability, adaptability, controllability, security, sustainability, and stability indexes.

The system of any of the preceding clauses, wherein the processor is further configured to: validate meta objects associated with assets in the logistics list based on tasks in the formation plan prior to causing the execution of the formation plan by the network of devices.

The method of any of the preceding clauses for adaptive power grid management including: storing a plurality of historical meta objects in a historical meta object database, where each meta object is configured to cause an asset in a network of devices to execute a task; receiving, at a processor executing a formation construct module, a formation plan and a logistics list including a plurality of assets for executing an operation loop in the formation plan; for the operation loop, retrieving a matching schema based on comparing the tasks of the operation loop and the logistics list with the plurality of meta objects in the historical meta object database; constructing meta objects for plurality of assets based on the matching schema and the formation plan; and causing the plurality of the network of devices to execute the formation plan based on meta objects assigned to the plurality of assets of the network of devices.

The method of any of the preceding clauses, wherein the matching schema is identified based on the assigned task, a context of the formation plan, asset function, and/or asset attributes.

The method of any of the preceding clauses, further including: determining operation correlations of assets based on the formation plan and the logistics list; and retrieving the matching schema based on the operation correlation associated with the asset.

The method of any of the preceding clauses, wherein the operation correlations of assets are determined by using a learning engine that simulates the formation plan using asset data stored in an asset portfolio database and historical logistic files stored in a logistics file historical archive database.

The method of any of the preceding clauses, further including identifying operation loops in the formation plan with two or more participating assets and retrieving the matching schema based on the role of the asset in the operation loop.

The method of any of the preceding clauses, wherein the two or more participating assets include a host asset of an operation loop of the formation plan, and the meta object identifies the host asset of the operation loop.

The method of any of the preceding clauses, further including: determining a correlation and interdependency level of the asset in an operation loop; performing operational index analysis of the asset and the matching schema in relation to a host asset of the operation loop based on the correlation and interdependency level; and determining a logistic gap file based on the operational index analysis.

The method of any of the preceding clauses, further including validating the operation loop of the formation plan based on logistic gap files associated with participating assets of the operation loop.

The method of any of the preceding clauses, wherein the operational index analysis verifies operational indexes including observability, reachability, adaptability, controllability, security, sustainability, and stability indexes.

The method of any of the preceding clauses, further including validating meta objects associated with assets in the logistics list based on tasks in the formation plan prior to causing the execution of the formation plan by the network of devices.

In some aspects, the techniques described herein relate to an adaptive power grid management system, the system includes: an asset database storing asset data associated with devices on a network of devices; and a processor coupled to the asset database and the network of devices, the processor being configured to execute a scout command module which causes the processor to: receive a formation plan and a logistics list including a plurality of assets for executing tasks in the formation plan; identify an operation loop of the formation plan having a host asset and a plurality of participant assets; determine assigned roles for each of the plurality of participant assets in the operation loop; verify availabilities of each of the plurality of participant assets based on the assigned roles and the asset data stored in the asset database; determine a launch plan for the operation loop for the host asset and the plurality of participant assets; and cause the plurality of the network devices to execute the formation plan based on the launch plan.

The system of any of the preceding clauses, wherein the assigned roles include a coordinator role, a messenger role, an inspector rule, and/or a guard role.

The system of any of the preceding clauses, wherein the processor further verifies the availability of each of the plurality of participant assets based on asset cloning and self-forming capabilities.

The system of any of the preceding clauses, wherein the processor is further configured to: initiate an asset replacement in the event that a participant asset is unavailable.

The system of any of the preceding clauses, wherein the launch plan includes a launch time, a load, an origin, a destination, and an asset identifier.

The system of any of the preceding clauses, wherein launch plan is configured to cause a participant asset to accept instructions from the host asset after launch.

The system of any of the preceding clauses, wherein the launch plan is configured to cause a participant asset to report specified data back to the host asset.

The system of any of the preceding clauses, wherein the processor is configured to update the launch plan in response to device data received from the network of devices.

The system of any of the preceding clauses, wherein a meta object for execution by a participant asset is transmitted from the processor to the participant asset via the host asset or another participant asset.

The system of any of the preceding clauses, wherein the launch plan is configured to cause the host asset or a participant asset to selectively perform a plurality of functions in response to real-time conditions after launch.

The method of any of the preceding clauses for managing an adaptive power grid, the method including: storing asset data associated with devices on a network of devices in an asset database; receiving, at a scout command module executed on a processor coupled to an asset database and a network of devices, a formation plan and a logistics list including a plurality of assets for executing tasks in the formation plan; identifying, by the processor, an operation loop of the formation plan having a host asset and a plurality of participant assets; determining assigned roles for each of the plurality of participant assets in the operation loop; verifying availabilities of each of the plurality of participant assets based on the assigned roles and the asset data stored in the asset database; determining a launch plan for the operation loop for the host asset and the plurality of participant assets; and causing the plurality of the network devices to execute the formation plan based on the launch plan.

The method of any of the preceding clauses, wherein the assigned roles include a coordinator role, a messenger role, an inspector rule, and/or a guard role.

The method of any of the preceding clauses, further including: verifying the availability of each of the plurality of participant assets based on asset cloning and self-forming capabilities.

The method of any of the preceding clauses, further including: initiating an asset replacement in the event that a participant asset is unavailable.

The method of any of the preceding clauses, wherein the launch plan includes a launch time, a load, an origin, a destination, and an asset identifier.

The method of any of the preceding clauses, wherein the launch plan is configured to cause a participant asset to accept instructions from the host asset after launch.

The method of any of the preceding clauses, wherein the launch plan is configured to cause a participant asset to report specified data back to the host asset.

The method of any of the preceding clauses, further including: updating the launch plan in response to device data received from the network of devices.

The method of any of the preceding clauses, further including: transmitting a meta object for execution by a participant asset from the processor to the participant asset via the host asset or another participant asset.

The method of any of the preceding clauses, wherein the launch plan is configured to cause the host asset or a participant asset to selectively perform a plurality of functions in response to real-time conditions after launch.

In some aspects, the techniques described herein relate to an adaptive power grid management system, the system includes: a patterns database storing point of view (pov) pattern data; an asset database storing asset data associated with devices on a network of devices; and a processor coupled to the patterns database, the asset database, and the network of devices, the processor being configured to execute a data management module which causes the processor to: communicate with one or more devices on the network of devices to aggregate device data from the network of devices in the asset database; receive a pov file request from one of a plurality of modules in the power grid management system; retrieve asset data from the asset database based on a content of the pov file request; select a view pattern from the patterns database based on the pov file request; form a pov file based on the asset data and the view pattern; and send the pov file to the one of the plurality of modules.

The system of any of the preceding clauses, wherein the processor is further configured to authenticate the pov file request based on an authentication key prior to responding to the pov file request.

The system of any of the preceding clauses, wherein the plurality of devices includes assets currently executing a formation plan including a plurality of tasks determined by the processor.

The system of any of the preceding clauses, wherein the view pattern is selected using a learning engine trained on historical pov file requests and historical patterns stored in the patterns database.

The system of any of the preceding clauses, wherein the pov file includes view pov formed by a view construct module configured to parse asset data and create a condition-based pov for an operation loop based on a logistic file associated with the operation loop.

The system of any of the preceding clauses, wherein the pov file includes control pov form by a control construct module configured to parse asset data to create an operation action list for an operation loop based on asset function types associated with assets of the operation loop.

The system of any of the preceding clauses, wherein the pov file includes administration pov formed by an administration construct module configured to parse the asset data to identifying participating applications and contextual collaboration links among the participating applications.

The system of any of the preceding clauses, wherein the plurality of modules of the power grid management system includes a grid artificer module, a logistician module, a federation manager module, an operation formation module, and/or a scout command module.

The method of any of the preceding clauses for adaptive power grid management, the method includes: communicating with the devices on the network of devices to aggregate device data in the asset database; receiving a point of view (pov) file request from one of the modules in the power grid management system; retrieving asset data from the asset database based on the pov file request; selecting a view pattern from the patterns database based on the pov file request; forming a pov file based on the asset data and the view pattern; and sending the pov file to the module that requested it.

The method of any of the preceding clauses, further including authenticating the pov file request based on an authentication key prior to responding to the pov file request.

The method of any of the preceding clauses, wherein the plurality of devices includes assets currently executing a formation plan that includes multiple tasks determined by the processor.

The method of any of the preceding clauses, wherein the view pattern is selected using a learning engine trained on historical pov file requests and historical patterns stored in the patterns database.

The method of any of the preceding clauses, wherein the pov file includes view pov formed by a view construct module configured to parse asset data and create a condition-based pov for an operation loop based on a logistic file associated with the operation loop.

The method of any of the preceding clauses, wherein the pov file includes control pov formed by a control construct module configured to parse asset data to create an operation action list for an operation loop based on asset function types associated with assets of the operation loop.

The method of any of the preceding clauses, wherein the pov file includes administration pov formed by an administration construct module configured to parse the asset data to identify participating applications and contextual collaboration links among the participating applications.

The method of any of the preceding clauses, wherein the plurality of modules of the power grid management system includes a grid artificer module, a logistician module, a federation manager module, an operation formation module, and/or a scout command module.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. An adaptive power grid management system, the system comprises:
   a historical meta object database storing a plurality of historical meta objects configured to cause an asset in a network of devices to execute a task; and
   a processor coupled to the historical meta object database and the network of devices, the processor being configured to execute a formation construct module which causes the processor to:
   receive a formation plan and a logistics list comprising a plurality of assets for executing an operation loop in the formation plan;
   for the operation loop, retrieve a matching schema based on comparing tasks of the operation loop and the logistics list with the plurality of meta objects in the historical meta object database;
   construct meta objects for the plurality of assets based on the matching schema and the formation plan; and
   cause the plurality of the network of devices to execute the formation plan based on meta objects assigned to the plurality of assets of the network of devices.

2. The system of claim 1, wherein the matching schema is identified based on the assigned task, a context of the formation plan, asset function, and/or asset attributes.

3. The system of claim 1 wherein the processor is further configured to:
   determine operation correlations of the plurality of assets based on the formation plan and the logistics list, wherein the matching schema is retrieved further based on an operation correlation associated with the asset.

4. The system of claim 3, wherein the operation correlations of assets are determined by using a learning engine that simulates the formation plan using asset data stored in an asset portfolio database and historical logistic files stored in a logistics file historical archive database.

5. The system of claim 1, wherein the processor is further configured to identify operation loops in the formation plan with two or more participating assets, wherein the matching schema is retrieved further based on roles of the assets in the operation loop.

6. The system of claim 5, wherein the two or more participating assets comprise a host asset of an operation loop of the formation plan and the meta objects identifies the host asset of the operation loop.

7. The system of claim 1, wherein the processor is further configured to:

determine a correlation and interdependency level of one or more assets in the operation loop;

perform operational index analysis of the one or more assets and the matching schema in relation to a host asset of the operation loop based on the correlation and interdependency level; and determine a logistic gap file based on the operational index analysis.

8. The system of claim 7, wherein the processor is further configured to:

validate the operation loop of the formation plan based on logistic gap files associated with participating assets of the operation loop.

9. The system of claim 7, wherein the operational index analysis verifies operational indexes comprising observability, reachability, adaptability, controllability, security, sustainability, and stability indexes.

10. The system of claim 1, wherein the processor is further configured to:

validate meta objects associated with assets in the logistics list based on tasks in the formation plan prior to causing the execution of the formation plan by the network of devices.

11. A method for adaptive power grid management comprising:

storing a plurality of historical meta objects in a historical meta object database, where each meta object is configured to cause an asset in a network of devices to execute a task;

receiving, at a processor executing a formation construct module, a formation plan and a logistics list comprising a plurality of assets for executing an operation loop in the formation plan;

for the operation loop, retrieving a matching schema based on comparing tasks of the operation loop and the logistics list with the plurality of meta objects in the historical meta object database;

constructing meta objects for the plurality of assets based on the matching schema and the formation plan; and causing the plurality of the network of devices to execute the formation plan based on meta objects assigned to the plurality of assets of the network of devices.

12. The method of claim 11, wherein the matching schema is identified based on the assigned task, a context of the formation plan, asset function, and/or asset attributes.

13. The method of claim 11, further comprising:

determining operation correlations of assets based on the formation plan and the logistics list; and retrieving the matching schema based on the operation correlation associated with the asset.

14. The method of claim 13, wherein the operation correlations of the assets are determined by using a learning engine that simulates the formation plan using asset data stored in an asset portfolio database and historical logistic files stored in a logistics file historical archive database.

15. The method of claim 11, further comprising identifying operation loops in the formation plan with two or more participating assets and retrieving the matching schema based on a role of the asset in the operation loop.

16. The method of claim 15, wherein the two or more participating assets comprise a host asset of an operation loop of the formation plan, and the meta objects identify the host asset of the operation loop.

17. The method of claim 11, further comprising:

determining a correlation and interdependency level of the asset in the operation loop;

performing operational index analysis of the asset and the matching schema in relation to a host asset of the operation loop based on the correlation and interdependency level; and determining a logistic gap file based on the operational index analysis.

18. The method of claim 17, further comprising validating the operation loop of the formation plan based on logistic gap files associated with participating assets of the operation loop.

19. The method of claim 17, wherein the operational index analysis verifies operational indexes comprising observability, reachability, adaptability, controllability, security, sustainability, and stability indexes.

20. The method of claim 11, further comprising validating meta objects associated with assets in the logistics list based on tasks in the formation plan prior to causing the execution of the formation plan by the network of devices.

* * * * *